US012677737B2

(12) United States Patent
Feldkamp et al.

(10) Patent No.:  US 12,677,737 B2
(45) Date of Patent:  Jul. 14, 2026

(54) LAWNMOWERS

(71) Applicant: TECHTRONIC CORDLESS GP, Anderson, SC (US)

(72) Inventors: Jonathan Feldkamp, Anderson, SC (US); Shuai Shao, Simpsonville, SC (US); Nikolas Mika, Anderson, SC (US); Stephen Frost, Williamston, SC (US); Denis Ogiyenko, Greenville, SC (US); Grzegorz Kondro, Piedmont, SC (US); Matt Lambert, Seneca, SC (US); Joseph Aydt, Anderson, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 1113 days.

(21) Appl. No.: 17/670,890

(22) Filed: Feb. 14, 2022

(65) Prior Publication Data

US 2022/0287233 A1     Sep. 15, 2022

Related U.S. Application Data

(60) Provisional application No. 63/288,958, filed on Dec. 13, 2021, provisional application No. 63/159,256, filed on Mar. 10, 2021.

(51) Int. Cl.
A01D 34/68        (2006.01)
A01D 101/00        (2006.01)

(52) U.S. Cl.
CPC ...... A01D 34/68 (2013.01); *A01D 2034/6843* (2013.01); *A01D 2101/00* (2013.01)

(58) Field of Classification Search
CPC ............ A01D 34/68; A01D 2034/6843; A01D 2101/00; A01D 34/66; A01D 34/824; A01D 43/0636; A01D 34/006; A01D 69/02; G05G 9/047
See application file for complete search history.

(56) References Cited

U.S. PATENT DOCUMENTS

| | | | |
|---|---|---|---|
| 923,312 | A | 6/1909 | Alexanderson |
| 2,511,124 | A | 6/1950 | Phelps |
| 2,539,779 | A | 1/1951 | Grosso |
| 2,701,942 | A | 2/1955 | Caldwell, Jr. et al. |
| 2,751,030 | A | 6/1956 | Null |
| 2,914,902 | A | 12/1959 | Beymer |
| 3,057,140 | A | 10/1962 | Ridenour et al. |

(Continued)

FOREIGN PATENT DOCUMENTS

| | | |
|---|---|---|
| AU | 2006100911 A4 | 11/2006 |
| AU | 2011239326 A1 | 11/2011 |

(Continued)

OTHER PUBLICATIONS

US 8,272,092 B2, 09/2012, Schnittman et al. (withdrawn)

(Continued)

*Primary Examiner* — Jason D Shanske
*Assistant Examiner* — Shams Dhanani
(74) *Attorney, Agent, or Firm* — Dority & Manning, P.A.

(57)        ABSTRACT

Lawnmowers are provided. A lawnmower includes a frame; a walking element coupled to the frame; a motor selectively powering the walking element; and a user interface comprising a joystick configured to control a direction of travel, a speed of travel, or both of the lawnmower.

20 Claims, 22 Drawing Sheets

(56) References Cited

U.S. PATENT DOCUMENTS

| | | | |
|---|---|---|---|
| 3,147,662 A | 9/1964 | Snook | |
| 3,311,738 A | 3/1967 | Makow | |
| 3,393,598 A | 7/1968 | Bettinger | |
| 3,500,622 A | 3/1970 | Bowen | |
| 3,570,227 A | 3/1971 | Bellinger | |
| 3,612,574 A | 10/1971 | Klopfer et al. | |
| 3,680,295 A | 8/1972 | Rutherford | |
| 3,705,519 A * | 12/1972 | Sjoo | G05G 9/047 |
| | | | 74/471 XY |
| 3,763,952 A | 10/1973 | Erdman | |
| 3,766,722 A * | 10/1973 | Kamlukin | A01D 69/00 |
| | | | 56/11.6 |
| 3,776,327 A | 12/1973 | Klopfer et al. | |
| 3,779,095 A * | 12/1973 | Audet | G05G 9/047 |
| | | | 74/471 XY |
| 3,954,146 A | 5/1976 | Smemo | |
| 4,015,406 A | 4/1977 | Witt et al. | |
| 4,041,976 A * | 8/1977 | Brownell | E02F 9/2004 |
| | | | 74/471 XY |
| 4,065,913 A | 1/1978 | Fisher et al. | |
| 4,126,990 A | 11/1978 | Fisher et al. | |
| 4,126,991 A | 11/1978 | Gobin et al. | |
| 4,156,337 A | 5/1979 | Knudson | |
| 4,165,597 A | 8/1979 | Scanland et al. | |
| 4,205,510 A | 6/1980 | Raniero | |
| 4,268,964 A | 5/1981 | Moore | |
| 4,306,375 A | 12/1981 | Goldfarb et al. | |
| 4,333,202 A | 6/1982 | Block | |
| 4,351,132 A | 9/1982 | Molin | |
| 4,393,645 A | 7/1983 | Moore | |
| 4,468,884 A | 9/1984 | Goldfarb et al. | |
| 4,492,058 A | 1/1985 | Goldfarb et al. | |
| 4,511,343 A | 4/1985 | Goldfarb et al. | |
| 4,522,606 A | 6/1985 | Goldfarb et al. | |
| 4,547,166 A | 10/1985 | Goldfarb et al. | |
| 4,550,553 A | 11/1985 | Gaither | |
| 4,591,347 A | 5/1986 | Goldfarb et al. | |
| 4,596,412 A | 6/1986 | Everett et al. | |
| 4,627,563 A | 12/1986 | Meyer | |
| 4,652,247 A | 3/1987 | Goldfarb et al. | |
| 4,673,370 A | 6/1987 | Goldfarb et al. | |
| 4,693,656 A | 9/1987 | Guthrie | |
| 4,709,541 A | 12/1987 | Broman | |
| 4,782,650 A * | 11/1988 | Walker | A01D 43/063 |
| | | | 56/16.6 |
| 4,787,794 A | 11/1988 | Guthrie | |
| 4,826,066 A | 5/1989 | Koester et al. | |
| 4,843,817 A | 7/1989 | Shivvers | |
| 4,845,949 A | 7/1989 | Shivvers | |
| 4,896,506 A | 1/1990 | Shivvers | |
| 4,902,260 A | 2/1990 | Im | |
| 4,916,813 A | 4/1990 | Elia | |
| 4,920,733 A | 5/1990 | Berrios | |
| 4,951,985 A | 8/1990 | Pong et al. | |
| 4,958,068 A | 9/1990 | Pong et al. | |
| 4,962,453 A | 10/1990 | Pong et al. | |
| 4,964,265 A | 10/1990 | Young | |
| 4,968,878 A | 11/1990 | Pong et al. | |
| 5,024,728 A | 6/1991 | Morita et al. | |
| 5,025,969 A | 6/1991 | Koester et al. | |
| 5,131,483 A | 7/1992 | Parkes | |
| 5,323,593 A | 6/1994 | Cline et al. | |
| 5,363,633 A | 11/1994 | Masaru | |
| 5,375,674 A | 12/1994 | Peter | |
| 5,402,110 A | 3/1995 | Oliver et al. | |
| 5,406,778 A | 4/1995 | Lamb et al. | |
| 5,507,137 A | 4/1996 | Norris | |
| 5,509,258 A | 4/1996 | Thier | |
| 5,515,669 A * | 5/1996 | Schick | A01D 34/64 |
| | | | 56/DIG. 14 |
| 5,540,037 A | 7/1996 | Lamb et al. | |
| 5,548,278 A | 8/1996 | Oliver et al. | |
| 5,553,445 A | 9/1996 | Lamb et al. | |
| 5,561,972 A | 10/1996 | Rolfe | |
| 5,572,856 A | 11/1996 | Ku | |
| 5,577,868 A | 11/1996 | Chen | |
| 5,669,841 A | 9/1997 | Schick | |
| 5,673,544 A | 10/1997 | Voigt | |
| 5,703,569 A | 12/1997 | Oliver et al. | |
| D390,237 S | 2/1998 | Smith | |
| 5,785,480 A | 7/1998 | Difeo | |
| 5,813,202 A | 9/1998 | Goman | |
| 5,816,035 A | 10/1998 | Schick | |
| 5,821,731 A | 10/1998 | Kuki et al. | |
| 5,848,520 A | 12/1998 | Arfstrom | |
| 5,850,135 A | 12/1998 | Kuki et al. | |
| 5,865,016 A | 2/1999 | Toman | |
| D409,208 S | 5/1999 | Eavenson | |
| 5,916,111 A | 6/1999 | Colens | |
| 5,918,694 A | 7/1999 | Miller | |
| 5,942,869 A | 8/1999 | Katou et al. | |
| 5,983,612 A | 11/1999 | Bauswell | |
| 6,056,074 A | 5/2000 | Heal | |
| 6,076,025 A | 6/2000 | Ueno et al. | |
| 6,079,193 A | 6/2000 | O'Neil | |
| 6,101,795 A | 8/2000 | Diekhans | |
| 6,212,917 B1 | 4/2001 | Rathbun | |
| 6,215,472 B1 * | 4/2001 | Chen | G05G 9/047 |
| | | | 345/157 |
| 6,255,793 B1 | 7/2001 | Peless et al. | |
| 6,300,737 B1 | 10/2001 | Bergvall et al. | |
| 6,301,864 B1 | 10/2001 | Damie | |
| 6,321,515 B1 | 11/2001 | Colens | |
| D451,931 S | 12/2001 | Abramson et al. | |
| 6,338,013 B1 | 1/2002 | Ruffner | |
| 6,339,735 B1 | 1/2002 | Peless et al. | |
| 6,417,641 B2 | 7/2002 | Peless et al. | |
| 6,442,845 B2 | 9/2002 | Wheeler et al. | |
| 6,443,509 B1 | 9/2002 | Levin et al. | |
| 6,460,253 B1 | 10/2002 | Wheeler et al. | |
| 6,465,982 B1 | 10/2002 | Bergvall et al. | |
| 6,481,515 B1 | 11/2002 | Kirkpatrick et al. | |
| 6,493,613 B2 | 12/2002 | Peless et al. | |
| 6,502,017 B2 | 12/2002 | Ruffner | |
| 6,525,509 B1 | 2/2003 | Petersson et al. | |
| 6,581,704 B2 | 6/2003 | Law | |
| 6,586,908 B2 | 7/2003 | Petersson et al. | |
| 6,594,844 B2 | 7/2003 | Jones | |
| 6,598,935 B2 | 7/2003 | Colliar | |
| 6,600,981 B2 | 7/2003 | Ruffner | |
| 6,604,348 B2 | 8/2003 | Hunt | |
| 6,611,738 B2 | 8/2003 | Ruffner | |
| 6,615,108 B1 | 9/2003 | Peless et al. | |
| 6,636,847 B1 | 10/2003 | Spires | |
| 6,650,975 B2 | 11/2003 | Ruffner | |
| 6,662,889 B2 | 12/2003 | De Fazio et al. | |
| 6,681,880 B2 | 1/2004 | Bernhardt | |
| 6,698,173 B2 | 3/2004 | Joseph | |
| 6,728,607 B1 | 4/2004 | Anderson | |
| 6,729,115 B2 | 5/2004 | Bartel | |
| 6,739,116 B2 | 5/2004 | Stover | |
| 6,763,282 B2 | 7/2004 | Glenn et al. | |
| 6,766,706 B2 | 7/2004 | Easton | |
| 6,779,217 B2 | 8/2004 | Fisher | |
| 6,782,964 B1 | 8/2004 | Korthals | |
| 6,809,490 B2 | 10/2004 | Jones et al. | |
| 6,813,557 B2 | 11/2004 | Schmidt et al. | |
| 6,837,032 B1 | 1/2005 | Swartzendruber | |
| 6,848,532 B2 | 2/2005 | Korthals | |
| 6,850,024 B2 | 2/2005 | Peless et al. | |
| 6,857,253 B2 | 2/2005 | Reimers | |
| 6,868,657 B2 | 3/2005 | Bauer | |
| 6,870,792 B2 | 3/2005 | Chiappetta | |
| 6,879,878 B2 | 4/2005 | Glenn et al. | |
| 6,885,912 B2 | 4/2005 | Peless et al. | |
| 6,907,336 B2 | 6/2005 | Gray et al. | |
| 6,912,831 B2 | 7/2005 | Velke | |
| 6,934,615 B2 | 8/2005 | Flann et al. | |
| 6,935,106 B2 | 8/2005 | Korthals | |
| 6,938,400 B2 | 9/2005 | Fillman | |
| 6,984,952 B2 | 1/2006 | Peless et al. | |
| 6,988,351 B2 | 1/2006 | Schick | |
| 6,990,400 B2 | 1/2006 | Kilworth | |

(56) References Cited

U.S. PATENT DOCUMENTS

| | | | |
|---|---|---|---|
| 7,010,425 B2 | 3/2006 | Gray et al. |
| 7,024,842 B2 | 4/2006 | Hunt et al. |
| 7,024,843 B2 | 4/2006 | Hunt et al. |
| 7,028,456 B2 | 4/2006 | Thatcher |
| 7,036,248 B2 | 5/2006 | Meyeres |
| 7,047,712 B1 | 5/2006 | Hunt et al. |
| 7,053,580 B2 | 5/2006 | Aldred |
| 7,069,111 B2 | 6/2006 | Glenn et al. |
| 7,076,348 B2 | 7/2006 | Bucher et al. |
| 7,079,923 B2 | 7/2006 | Abramson et al. |
| 7,079,943 B2 | 7/2006 | Flann et al. |
| 7,085,624 B2 | 8/2006 | Aldred et al. |
| 7,103,457 B2 | 9/2006 | Dean |
| 7,110,881 B2 | 9/2006 | Gray et al. |
| 7,114,318 B2 | 10/2006 | Poulson et al. |
| 7,117,660 B1 | 10/2006 | Colens |
| 7,133,746 B2 | 11/2006 | Abramson et al. |
| 7,146,786 B2 | 12/2006 | Brandon |
| 7,155,308 B2 | 12/2006 | Jones |
| 7,155,309 B2 | 12/2006 | Peless et al. |
| 7,166,983 B2 | 1/2007 | Jung |
| 7,167,775 B2 | 1/2007 | Abramson et al. |
| 7,172,041 B2 | 2/2007 | Wuertz |
| 7,173,391 B2 | 2/2007 | Jones et al. |
| 7,174,157 B2 | 2/2007 | Gassho et al. |
| 7,211,980 B1 | 5/2007 | Bruemmer et al. |
| 7,216,033 B2 | 5/2007 | Flann et al. |
| 7,227,334 B2 | 6/2007 | Yang et al. |
| 7,228,214 B2 | 6/2007 | Flann et al. |
| 7,233,683 B2 | 6/2007 | Han et al. |
| 7,242,791 B2 | 7/2007 | Han et al. |
| 7,286,902 B2 | 10/2007 | Kim et al. |
| D559,867 S | 1/2008 | Abramson |
| 7,332,890 B2 | 2/2008 | Cohen et al. |
| 7,349,759 B2 | 3/2008 | Peless et al. |
| 7,353,651 B2 | 4/2008 | Adkins |
| 7,363,994 B1 | 4/2008 | DeFazio et al. |
| 7,369,460 B2 | 5/2008 | Chiappetta et al. |
| 7,369,924 B2 | 5/2008 | Han et al. |
| 7,388,343 B2 | 6/2008 | Jones et al. |
| D573,610 S | 7/2008 | Abramson |
| 7,393,304 B2 | 7/2008 | Wilde |
| 7,395,648 B1 | 7/2008 | Silbernagel et al. |
| 7,401,456 B2 | 7/2008 | Korthals |
| 7,418,328 B2 | 8/2008 | Romig |
| 7,429,843 B2 | 9/2008 | Jones et al. |
| 7,430,455 B2 | 9/2008 | Casey et al. |
| 7,430,847 B2 | 10/2008 | Hoffman |
| 7,444,214 B2 | 10/2008 | Cho et al. |
| 7,451,865 B2 | 11/2008 | Eavenson, Sr. |
| 7,458,432 B2 | 12/2008 | Mayer |
| 7,469,525 B2 | 12/2008 | Zeigler et al. |
| 7,474,941 B2 | 1/2009 | Kim et al. |
| 7,480,958 B2 | 1/2009 | Song et al. |
| 7,480,960 B2 | 1/2009 | Kim |
| 7,497,053 B2 | 3/2009 | Nicolet |
| 7,499,774 B2 | 3/2009 | Barrett et al. |
| 7,499,775 B2 | 3/2009 | Filippov et al. |
| 7,499,776 B2 | 3/2009 | Allard et al. |
| 7,499,804 B2 | 3/2009 | Svendsen et al. |
| 7,505,848 B2 | 3/2009 | Flann et al. |
| 7,513,113 B1 | 4/2009 | Holder |
| 7,539,557 B2 | 5/2009 | Yamauchi |
| 7,544,147 B2 | 6/2009 | Strosser |
| 7,555,887 B2 | 7/2009 | Schick |
| 7,568,873 B1 | 8/2009 | Rambo |
| 7,574,282 B2 | 8/2009 | Petersson et al. |
| 7,574,850 B1 | 8/2009 | Nunez |
| 7,577,499 B2 | 8/2009 | Sun et al. |
| 7,578,116 B1 | 8/2009 | Howell |
| 7,587,260 B2 | 9/2009 | Bruemmer et al. |
| 7,590,413 B2 | 9/2009 | May |
| 7,596,934 B2 | 10/2009 | Waesche et al. |
| 7,610,122 B2 | 10/2009 | Anderson |
| 7,610,123 B2 | 10/2009 | Han et al. |
| 7,613,543 B2 | 11/2009 | Petersson et al. |
| 7,614,835 B2 | 11/2009 | Kitamura |
| 7,617,890 B2 | 11/2009 | Romig |
| 7,634,953 B2 | 12/2009 | Hoffman |
| 7,641,019 B2 | 1/2010 | Pline |
| 7,647,144 B2 | 1/2010 | Haegermarck |
| D610,072 S | 2/2010 | Wallet et al. |
| 7,663,333 B2 | 2/2010 | Jones et al. |
| 7,677,371 B2 | 3/2010 | Dong |
| 7,686,108 B2 | 3/2010 | Piontek |
| 7,688,676 B2 | 3/2010 | Chiappetta et al. |
| 7,690,066 B2 | 4/2010 | Stoltz et al. |
| D615,920 S | 5/2010 | Kline et al. |
| 7,707,812 B2 | 5/2010 | Cheung |
| 7,717,219 B2 | 5/2010 | David |
| 7,720,572 B2 | 5/2010 | Ziegler et al. |
| 7,729,801 B2 | 6/2010 | Abramson |
| 7,730,705 B2 | 6/2010 | Kubinski |
| 7,748,480 B2 | 7/2010 | Loxterkamp |
| 7,769,490 B2 | 8/2010 | Abramson et al. |
| 7,787,989 B2 | 8/2010 | Colens |
| 7,788,888 B2 | 9/2010 | Avalle |
| 7,792,607 B2 | 9/2010 | Han et al. |
| 7,801,645 B2 | 9/2010 | Taylor et al. |
| 7,805,220 B2 | 9/2010 | Taylor et al. |
| 7,805,676 B2 | 9/2010 | Schemers et al. |
| 7,805,918 B2 | 10/2010 | Silbernagel et al. |
| D628,145 S | 11/2010 | Vaidya |
| 7,823,685 B2 | 11/2010 | Blind |
| 7,840,210 B2 | 11/2010 | May |
| 7,843,431 B2 | 11/2010 | Robbins et al. |
| 7,844,396 B2 | 11/2010 | Zeitzew |
| 7,853,373 B2 | 12/2010 | Traster et al. |
| 7,876,927 B2 | 1/2011 | Han et al. |
| 7,885,738 B2 | 2/2011 | Park et al. |
| 7,908,834 B2 | 3/2011 | Keski-Luopa |
| 7,913,800 B2 | 3/2011 | Graeve |
| 7,918,303 B2 | 4/2011 | Klas |
| 7,929,504 B2 | 4/2011 | Wentink et al. |
| 7,953,526 B2 | 5/2011 | Durkos et al. |
| 7,957,837 B2 | 6/2011 | Ziegler et al. |
| 7,957,850 B2 | 6/2011 | Anderson |
| 7,958,709 B2 | 6/2011 | Coleman et al. |
| 7,958,712 B2 | 6/2011 | Cheung |
| 7,979,175 B2 | 7/2011 | Allard et al. |
| 7,992,251 B2 | 8/2011 | Chung et al. |
| 8,020,657 B2 | 9/2011 | Allard et al. |
| 8,022,667 B2 | 9/2011 | Anderson |
| 8,031,086 B2 | 10/2011 | Thacher et al. |
| 8,046,103 B2 | 10/2011 | Abramson et al. |
| 8,065,866 B2 | 11/2011 | Tamas et al. |
| 8,078,338 B2 | 12/2011 | Pack et al. |
| 8,079,433 B2 | 12/2011 | Teague et al. |
| D652,431 S | 1/2012 | Näslund |
| 8,087,481 B2 | 1/2012 | Trefz |
| 8,091,105 B2 | 1/2012 | Lee |
| 8,096,374 B1 | 1/2012 | Papke |
| 8,106,626 B2 | 1/2012 | Li et al. |
| 8,107,318 B2 | 1/2012 | Chiappetta et al. |
| 8,108,092 B2 | 1/2012 | Phillips et al. |
| 8,121,730 B2 | 2/2012 | Sung et al. |
| D656,163 S | 3/2012 | Johansson et al. |
| 8,127,876 B2 | 3/2012 | Phillips |
| 8,135,498 B2 | 3/2012 | Hyung et al. |
| 8,150,574 B2 | 4/2012 | Han et al. |
| 8,186,136 B2 | 5/2012 | Eick |
| 8,195,333 B2 | 6/2012 | Ziegler et al. |
| 8,195,342 B2 | 6/2012 | Anderson |
| 8,195,358 B2 | 6/2012 | Anderson |
| 8,199,109 B2 | 6/2012 | Robbins et al. |
| 8,200,428 B2 | 6/2012 | Anderson |
| 8,208,907 B2 | 6/2012 | May |
| 8,209,053 B2 | 6/2012 | Kim et al. |
| 8,224,500 B2 | 7/2012 | Anderson |
| 8,224,516 B2 | 7/2012 | Anderson |
| 8,229,618 B2 | 7/2012 | Tolstedt et al. |
| 8,230,757 B2 | 7/2012 | Nocko |
| 8,234,010 B2 | 7/2012 | Thompson et al. |
| 8,234,848 B2 | 8/2012 | Messina et al. |

(56) References Cited

U.S. PATENT DOCUMENTS

| | | | |
|---|---|---|---|
| 8,235,151 B2 | 8/2012 | Nunez |
| 8,237,389 B2 | 8/2012 | Fitch et al. |
| 8,239,992 B2 | 8/2012 | Schnittman et al. |
| 8,240,420 B1 | 8/2012 | Bartel |
| 8,255,092 B2 | 8/2012 | Phillips et al. |
| 8,271,132 B2 | 9/2012 | Nielsen et al. |
| 8,292,007 B2 | 10/2012 | DeFazio et al. |
| 8,295,125 B2 | 10/2012 | Chiappetta et al. |
| 8,295,979 B2 | 10/2012 | Thacher et al. |
| 8,297,032 B2 | 10/2012 | Ninomiya et al. |
| 8,297,903 B2 | 10/2012 | Hohmann et al. |
| 8,306,659 B2 | 11/2012 | Abramson et al. |
| 8,311,674 B2 | 11/2012 | Abramson |
| 8,326,469 B2 | 12/2012 | Phillips et al. |
| 8,336,282 B2 | 12/2012 | Messina et al. |
| 8,340,438 B2 | 12/2012 | Anderson |
| 8,347,444 B2 | 1/2013 | Schnittman et al. |
| 8,350,810 B2 | 1/2013 | Robbins et al. |
| 8,352,113 B2 | 1/2013 | Johnson et al. |
| 8,370,985 B2 | 2/2013 | Schnittman et al. |
| 8,390,251 B2 | 3/2013 | Cohen et al. |
| 8,392,044 B2 | 3/2013 | Thompson et al. |
| 8,392,065 B2 | 3/2013 | Tolstedt et al. |
| 8,396,592 B2 | 3/2013 | Jones et al. |
| 8,396,597 B2 | 3/2013 | Anderson |
| 8,396,611 B2 | 3/2013 | Phillips et al. |
| D679,294 S | 4/2013 | Tajik et al. |
| D679,295 S | 4/2013 | Tajik et al. |
| 8,407,976 B2 | 4/2013 | Percy |
| 8,412,377 B2 | 4/2013 | Casey et al. |
| 8,428,776 B2 | 4/2013 | Letsky |
| 8,433,468 B2 | 4/2013 | Johnson et al. |
| 8,438,695 B2 | 5/2013 | Gilbert, Jr. et al. |
| 8,442,700 B2 | 5/2013 | Anderson |
| 8,447,440 B2 | 5/2013 | Phillips et al. |
| 8,447,454 B2 | 5/2013 | Biber et al. |
| D684,596 S | 6/2013 | Dwyer |
| 8,461,803 B2 | 6/2013 | Cohen et al. |
| 8,463,438 B2 | 6/2013 | Jones et al. |
| 8,467,928 B2 | 6/2013 | Anderson |
| 8,471,133 B1 | 6/2013 | Lin |
| 8,473,187 B2 | 6/2013 | Kammel et al. |
| 8,476,867 B2 | 7/2013 | Li et al. |
| 8,478,442 B2 | 7/2013 | Casey et al. |
| 8,498,788 B2 | 7/2013 | Kondekar |
| D688,276 S | 8/2013 | Näslund |
| 8,508,329 B2 | 8/2013 | Veenstra |
| 8,521,329 B2 | 8/2013 | Park et al. |
| 8,532,821 B2 | 9/2013 | Ko |
| 8,532,822 B2 | 9/2013 | Abramson et al. |
| 8,560,145 B2 | 10/2013 | Anderson |
| 8,565,920 B2 | 10/2013 | Casey et al. |
| 8,572,266 B2 | 10/2013 | Larocca |
| 8,577,517 B2 | 11/2013 | Phillips et al. |
| 8,577,538 B2 | 11/2013 | Lenser et al. |
| 8,578,687 B2 | 11/2013 | Ebihara |
| 8,594,842 B2 | 11/2013 | Abramson |
| 8,599,645 B2 | 12/2013 | Chiappetta et al. |
| 8,619,141 B2 | 12/2013 | Anderson |
| 8,634,960 B2 | 1/2014 | Sandin et al. |
| 8,635,015 B2 | 1/2014 | Anderson |
| 8,651,589 B2 | 2/2014 | Ishikawa |
| 8,653,786 B2 | 2/2014 | Baetica |
| 8,655,539 B2 | 2/2014 | Yoo et al. |
| 8,660,879 B2 | 2/2014 | Machtelinck |
| 8,666,550 B2 | 3/2014 | Anderson et al. |
| 8,666,554 B2 | 3/2014 | Anderson |
| 8,666,587 B2 | 3/2014 | Anderson |
| 8,671,656 B2 | 3/2014 | Paden |
| 8,676,378 B2 | 3/2014 | Tian et al. |
| 8,706,339 B2 | 4/2014 | Thompson et al. |
| 8,712,623 B2 | 4/2014 | Sato et al. |
| 8,725,316 B2 | 5/2014 | Thompson et al. |
| 8,726,454 B2 | 5/2014 | Gilbert, Jr. et al. |
| 8,731,295 B2 | 5/2014 | Schepelmann et al. |
| 8,739,057 B2 | 5/2014 | Cheong et al. |
| 8,744,626 B2 | 6/2014 | Johnson et al. |
| 8,744,663 B2 | 6/2014 | Sato et al. |
| 8,749,196 B2 | 6/2014 | Cohen et al. |
| 8,757,315 B1 | 6/2014 | Wuisan |
| 8,760,397 B2 | 6/2014 | Robbins et al. |
| 8,761,935 B2 | 6/2014 | Casey et al. |
| 8,769,917 B1 | 7/2014 | Howell |
| 8,781,627 B2 | 7/2014 | Sandin et al. |
| 8,788,092 B2 | 7/2014 | Casey et al. |
| 8,800,677 B2 | 8/2014 | Georgoulias |
| 8,818,567 B2 | 8/2014 | Anderson |
| 8,818,602 B2 | 8/2014 | Yamamura et al. |
| 8,838,274 B2 | 9/2014 | Jones et al. |
| 8,838,291 B2 | 9/2014 | Jägenstedt et al. |
| 8,839,477 B2 | 9/2014 | Schnittman et al. |
| 8,843,244 B2 | 9/2014 | Phillips et al. |
| 8,844,645 B2 | 9/2014 | Hall |
| 8,854,001 B2 | 10/2014 | Cohen et al. |
| 8,856,150 B2 | 10/2014 | Machtelinck |
| 8,857,558 B2 | 10/2014 | Poe |
| 8,868,237 B2 | 10/2014 | Sandin et al. |
| 8,869,337 B2 | 10/2014 | Sumonthee |
| 8,869,369 B1 | 10/2014 | Roach |
| 8,874,269 B2 | 10/2014 | Biber et al. |
| 8,874,300 B2 | 10/2014 | Allard et al. |
| D718,339 S | 11/2014 | Damshak et al. |
| D718,340 S | 11/2014 | Damshak et al. |
| D718,341 S | 11/2014 | Gur et al. |
| 8,887,840 B2 | 11/2014 | Poe |
| 8,892,352 B2 | 11/2014 | Petereit et al. |
| D718,793 S | 12/2014 | Gur et al. |
| 8,911,192 B2 | 12/2014 | Hohmann et al. |
| 8,918,241 B2 | 12/2014 | Chen et al. |
| 8,925,667 B2 | 1/2015 | Chen |
| 8,930,023 B2 | 1/2015 | Gutmann et al. |
| 8,930,024 B2 | 1/2015 | Abramson |
| 8,938,318 B2 | 1/2015 | Bergström et al. |
| 8,942,862 B2 | 1/2015 | Markusson et al. |
| 8,954,193 B2 | 2/2015 | Sandin et al. |
| 8,958,911 B2 | 2/2015 | Wong et al. |
| 8,958,939 B2 | 2/2015 | Einecke et al. |
| 8,965,578 B2 | 2/2015 | Versteeg et al. |
| 8,989,946 B2 | 3/2015 | Anderson |
| 8,989,972 B2 | 3/2015 | Anderson |
| 8,996,171 B2 | 3/2015 | Anderson et al. |
| 8,996,177 B2 | 3/2015 | Coenen |
| D729,280 S | 5/2015 | Näslund et al. |
| 9,021,777 B2 | 5/2015 | Johnson et al. |
| 9,026,299 B2 | 5/2015 | Johnson et al. |
| 9,026,302 B2 | 5/2015 | Stout et al. |
| 9,031,050 B2 | 5/2015 | Cherian et al. |
| 9,037,294 B2 | 5/2015 | Chung et al. |
| 9,043,016 B2 | 5/2015 | Filippov et al. |
| 9,043,129 B2 | 5/2015 | Bonefas et al. |
| D731,402 S | 6/2015 | Tedesco et al. |
| 9,043,952 B2 | 6/2015 | Sandin et al. |
| 9,043,953 B2 | 6/2015 | Sandin et al. |
| 9,072,218 B2 | 7/2015 | Johnson et al. |
| 9,072,219 B2 | 7/2015 | Da Rocha et al. |
| 9,079,303 B2 | 7/2015 | Abramson et al. |
| 9,093,868 B2 | 7/2015 | Baxter |
| 9,104,204 B2 | 8/2015 | Jones et al. |
| 9,104,206 B2 | 8/2015 | Biber et al. |
| 9,110,471 B2 | 8/2015 | Pack et al. |
| 9,113,595 B2 | 8/2015 | Roth et al. |
| 9,119,341 B2 | 9/2015 | Jägenstedt |
| 9,137,943 B2 | 9/2015 | Einecke et al. |
| 9,144,193 B2 | 9/2015 | Paden |
| 9,182,763 B2 | 11/2015 | Park et al. |
| 9,186,800 B2 | 11/2015 | Shin et al. |
| 9,188,980 B2 | 11/2015 | Anderson |
| 9,188,983 B2 | 11/2015 | Stout et al. |
| 9,195,256 B2 | 11/2015 | Robbins et al. |
| D745,897 S | 12/2015 | Mehra et al. |
| 9,213,934 B1 | 12/2015 | Versteeg et al. |
| 9,215,957 B2 | 12/2015 | Cohen et al. |
| 9,223,312 B2 | 12/2015 | Goel et al. |
| 9,232,692 B2 | 1/2016 | Björn et al. |

(56) References Cited

U.S. PATENT DOCUMENTS

| | | |
|---|---|---|
| 9,235,214 B2 | 1/2016 | Anderson |
| 9,236,637 B2 | 1/2016 | Anderson |
| 9,241,441 B2 | 1/2016 | Björn et al. |
| D748,568 S | 2/2016 | Helin et al. |
| 9,258,942 B2 | 2/2016 | Biber et al. |
| 9,268,331 B2 | 2/2016 | Abramson et al. |
| 9,276,419 B2 | 3/2016 | Borinato et al. |
| 9,278,690 B2 | 3/2016 | Smith |
| 9,282,695 B2 | 3/2016 | Goto |
| 9,288,942 B2 | 3/2016 | Moriguchi |
| 9,301,444 B2 | 4/2016 | Campbell et al. |
| 9,313,948 B2 | 4/2016 | Moriguchi |
| 9,313,953 B2 | 4/2016 | Borshov |
| D757,637 S | 5/2016 | Horowitz |
| 9,327,407 B2 | 5/2016 | Jones et al. |
| 9,335,767 B2 | 5/2016 | Jang et al. |
| 9,338,130 B2 | 5/2016 | Von Huben et al. |
| 9,348,897 B2 | 5/2016 | Shoham et al. |
| 9,349,187 B2 | 5/2016 | Schepelmann et al. |
| D758,455 S | 6/2016 | Maibach et al. |
| D759,577 S | 6/2016 | Wang et al. |
| 9,357,699 B2 | 6/2016 | Elonsson |
| 9,363,945 B2 | 6/2016 | Jägenstedt et al. |
| 9,375,842 B2 | 6/2016 | Shamlian et al. |
| 9,376,027 B2 | 6/2016 | Harris |
| D760,806 S | 7/2016 | Cmich et al. |
| 9,380,742 B2 | 7/2016 | Biber et al. |
| 9,405,294 B2 | 8/2016 | Jägenstedt et al. |
| 9,412,515 B2 | 8/2016 | Hyde et al. |
| 9,419,453 B2 | 8/2016 | Andersson et al. |
| 9,420,741 B2 | 8/2016 | Balutis et al. |
| 9,421,879 B2 | 8/2016 | Pastoor et al. |
| 9,426,946 B2 | 8/2016 | Fisher |
| 9,429,950 B2 | 8/2016 | Sjöholm |
| 9,436,185 B2 | 9/2016 | Schnittman |
| 9,439,348 B2 | 9/2016 | Biber et al. |
| 9,439,367 B2 | 9/2016 | Abhyanker |
| 9,440,350 B2 | 9/2016 | Mou et al. |
| 9,440,354 B2 | 9/2016 | Gutmann et al. |
| 9,446,521 B2 | 9/2016 | Casey et al. |
| 9,452,525 B2 | 9/2016 | Ziegler et al. |
| 9,452,685 B2 | 9/2016 | Hyde et al. |
| D769,180 S | 10/2016 | Wang et al. |
| 9,456,545 B2 | 10/2016 | Biber |
| 9,457,677 B2 | 10/2016 | Hyde et al. |
| 9,457,841 B2 | 10/2016 | Smith |
| 9,463,704 B2 | 10/2016 | Hyde et al. |
| 9,471,063 B2 | 10/2016 | Ouyang |
| 9,480,201 B2 | 11/2016 | Maruyama et al. |
| 9,483,055 B2 | 11/2016 | Johnson et al. |
| 9,491,904 B2 | 11/2016 | Jägenstedt et al. |
| 9,497,901 B2 | 11/2016 | Willgert |
| 9,505,140 B1 | 11/2016 | Fay et al. |
| 9,510,503 B2 | 12/2016 | Elhardt |
| 9,510,505 B2 | 12/2016 | Halloran et al. |
| 9,516,806 B2 | 12/2016 | Yamauchi et al. |
| D776,169 S | 1/2017 | Cmich et al. |
| 9,532,688 B1 | 1/2017 | Ebrahimi Afrouzi et al. |
| 9,538,702 B2 | 1/2017 | Balutis et al. |
| 9,538,706 B2 | 1/2017 | Haun |
| 9,543,680 B2 | 1/2017 | Elonsson |
| 9,545,032 B2 | 1/2017 | Baer et al. |
| 9,550,294 B2 | 1/2017 | Cohen et al. |
| 9,554,508 B2 | 1/2017 | Balutis et al. |
| 9,559,461 B1 | 1/2017 | Diehr |
| 9,560,800 B2 | 2/2017 | Reichen et al. |
| 9,563,204 B2 | 2/2017 | Willgert |
| 9,573,275 B2 | 2/2017 | Reigo et al. |
| D781,349 S | 3/2017 | Cmich |
| D781,926 S | 3/2017 | Al-Hashimi et al. |
| 9,586,563 B2 | 3/2017 | Kanai et al. |
| 9,590,862 B2 | 3/2017 | Larocca |
| 9,606,541 B2 | 3/2017 | Abramson |
| 9,622,399 B2 | 4/2017 | Kremmer et al. |
| 9,623,557 B2 | 4/2017 | Gutmann et al. |
| 9,630,319 B2 | 4/2017 | Vicenti |
| 9,632,489 B2 | 4/2017 | Biber et al. |
| 9,643,648 B2 | 5/2017 | Boyle |
| 9,693,501 B2 | 7/2017 | Giere |
| 9,699,964 B2 | 7/2017 | Roth et al. |
| 9,699,965 B2 | 7/2017 | Schygge |
| 9,701,020 B1 | 7/2017 | Ebrahimi Afrouzi |
| 9,711,767 B2 | 7/2017 | Juenger et al. |
| 9,713,302 B2 | 7/2017 | Sandin et al. |
| 9,713,303 B2 | 7/2017 | Jägenstedt et al. |
| D794,089 S | 8/2017 | Maibach et al. |
| 9,717,175 B2 | 8/2017 | Fay, II et al. |
| 9,720,417 B2 | 8/2017 | Reigo et al. |
| 9,723,782 B2 | 8/2017 | Roth et al. |
| 9,725,114 B1 | 8/2017 | Brown |
| 9,736,981 B2 | 8/2017 | Roth et al. |
| 9,740,210 B2 | 8/2017 | Sjöholm |
| 9,743,581 B1 | 8/2017 | Nier |
| D796,555 S | 9/2017 | Landberg et al. |
| D797,530 S | 9/2017 | Cmich |
| 9,750,183 B2 | 9/2017 | Haun |
| 9,766,627 B2 | 9/2017 | Jägenstedt et al. |
| D799,555 S | 10/2017 | Cmich |
| 9,785,148 B2 | 10/2017 | Yun |
| 9,788,481 B2 | 10/2017 | Das et al. |
| 9,788,483 B2 | 10/2017 | Roth et al. |
| 9,789,759 B1 | 10/2017 | Rothrock |
| 9,791,860 B2 | 10/2017 | Phillips et al. |
| 9,804,604 B2 | 10/2017 | Mattsson et al. |
| 9,807,925 B2 | 11/2017 | Johnson |
| 9,807,930 B1 | 11/2017 | Lydon et al. |
| 9,817,398 B2 | 11/2017 | Yamamura et al. |
| 9,820,433 B2 | 11/2017 | Borinato |
| 9,826,678 B2 | 11/2017 | Balutis et al. |
| 9,829,891 B2 | 11/2017 | Smith et al. |
| 9,839,179 B2 | 12/2017 | Stover |
| 9,841,768 B2 | 12/2017 | Hiramatsu et al. |
| 9,844,876 B2 | 12/2017 | Chung et al. |
| 9,848,529 B2 | 12/2017 | Franzius et al. |
| 9,848,532 B2 | 12/2017 | Keski-Luopa et al. |
| 9,851,718 B2 | 12/2017 | Booher |
| 9,853,468 B2 | 12/2017 | Ireland |
| D807,281 S | 1/2018 | Irwin et al. |
| D807,811 S | 1/2018 | Wang et al. |
| 9,854,737 B2 | 1/2018 | Yamauchi et al. |
| 9,854,956 B2 | 1/2018 | Song et al. |
| 9,857,025 B2 | 1/2018 | Gottinger et al. |
| 9,861,035 B2 | 1/2018 | Kruckeberg et al. |
| 9,864,396 B1 | 1/2018 | Brown |
| 9,872,437 B2 | 1/2018 | Markusson et al. |
| 9,874,876 B2 | 1/2018 | Shimamura |
| 9,876,370 B2 | 1/2018 | Yamamura et al. |
| D810,664 S | 2/2018 | Sgreccia et al. |
| D810,665 S | 2/2018 | Sgreccia et al. |
| 9,884,423 B2 | 2/2018 | Cohen et al. |
| 9,894,836 B2 | 2/2018 | Garton |
| 9,895,808 B2 | 2/2018 | Stout et al. |
| 9,901,028 B2 | 2/2018 | Hans |
| 9,903,947 B2 | 2/2018 | Das et al. |
| 9,924,632 B2 | 3/2018 | Chenevert et al. |
| 9,924,847 B2 | 3/2018 | Gottinger et al. |
| 9,931,007 B2 | 4/2018 | Morin et al. |
| 9,931,008 B2 | 4/2018 | Yoo et al. |
| 9,931,750 B2 | 4/2018 | Cohen et al. |
| 9,936,635 B2 | 4/2018 | Gottinger et al. |
| 9,963,065 B2 | 5/2018 | Otto |
| 9,968,024 B2 | 5/2018 | Haneda et al. |
| 9,972,098 B1 | 5/2018 | Ebrahimi Afrouzi et al. |
| 9,981,545 B1 | 5/2018 | Padhan |
| 9,983,586 B2 | 5/2018 | Borinato |
| 10,005,358 B2 | 6/2018 | Schmidt et al. |
| 10,011,180 B2 | 7/2018 | Hyde et al. |
| 10,020,470 B2 | 7/2018 | Ito |
| 10,021,830 B2 | 7/2018 | Doughty |
| 10,024,964 B2 | 7/2018 | Pierce et al. |
| 10,029,368 B2 | 7/2018 | Wolowelsky et al. |
| 10,031,527 B2 | 7/2018 | Björn |
| 10,034,421 B2 | 7/2018 | Doughty et al. |
| 10,035,270 B2 | 7/2018 | Fay et al. |

(56)         References Cited

U.S. PATENT DOCUMENTS

| | | | |
|---|---|---|---|
| 10,037,038 | B2 | 7/2018 | Sandin et al. |
| 10,038,176 | B2 | 7/2018 | Ito |
| 10,045,485 | B2 | 8/2018 | Burns |
| 10,046,130 | B2 | 8/2018 | Molden et al. |
| 10,054,924 | B2 | 8/2018 | Willgert |
| 10,057,813 | B1 | 8/2018 | Likar et al. |
| 10,067,232 | B2 | 9/2018 | Halloran et al. |
| 10,070,764 | B2 | 9/2018 | Schnittman et al. |
| 10,071,475 | B2 | 9/2018 | Lin et al. |
| 10,078,336 | B2 | 9/2018 | Reigo et al. |
| 10,080,326 | B2 | 9/2018 | Yamamura et al. |
| D830,418 | S | 10/2018 | Näslund et al. |
| 10,091,930 | B2 | 10/2018 | Balutis et al. |
| 10,093,194 | B2 | 10/2018 | Hyde et al. |
| 10,093,259 | B2 | 10/2018 | Pan |
| 10,098,277 | B2 | 10/2018 | Ouyang |
| 10,098,278 | B2 | 10/2018 | Velderman |
| 10,104,835 | B2 | 10/2018 | Köhler et al. |
| 10,105,838 | B2 | 10/2018 | Mou et al. |
| 10,108,198 | B2 | 10/2018 | Björn et al. |
| D834,185 | S | 11/2018 | Molden et al. |
| D834,504 | S | 11/2018 | Ropars |
| D834,505 | S | 11/2018 | Wang et al. |
| 10,117,379 | B2 | 11/2018 | Guiet et al. |
| 10,123,479 | B2 | 11/2018 | Ladd, Jr. et al. |
| 10,124,494 | B2 | 11/2018 | Outa et al. |
| 10,130,037 | B2 | 11/2018 | Conrad |
| 10,131,057 | B2 | 11/2018 | Patel et al. |
| 10,136,576 | B2 | 11/2018 | Reigo |
| 10,149,430 | B2 | 12/2018 | Bergström et al. |
| 10,152,062 | B2 | 12/2018 | Schnittman |
| 10,157,334 | B2 | 12/2018 | Schepelmann et al. |
| 10,159,180 | B2 | 12/2018 | Balutis et al. |
| 10,162,359 | B2 | 12/2018 | Johnson et al. |
| D837,150 | S | 1/2019 | Näslund et al. |
| 10,165,725 | B2 | 1/2019 | Sugumaran et al. |
| 10,172,282 | B2 | 1/2019 | Svensson et al. |
| 10,178,826 | B2 | 1/2019 | Jägenstedt et al. |
| 10,183,400 | B2 | 1/2019 | Trigui et al. |
| 10,183,701 | B2 | 1/2019 | Ebrahimi Afrouzi et al. |
| 10,185,325 | B2 | 1/2019 | Reigo et al. |
| 10,201,261 | B2 | 2/2019 | Tanaka et al. |
| 10,207,557 | B2 | 2/2019 | Björn et al. |
| 10,212,880 | B2 | 2/2019 | Cmich et al. |
| 10,238,026 | B2 | 3/2019 | Köhler et al. |
| D845,877 | S | 4/2019 | Geng et al. |
| 10,244,678 | B2 | 4/2019 | Lydon et al. |
| 10,246,907 | B2 | 4/2019 | Shen |
| 10,257,976 | B2 | 4/2019 | Ladd, Jr. et al. |
| 10,259,498 | B2 | 4/2019 | Jägenstedt et al. |
| 10,268,206 | B2 | 4/2019 | Yamamura |
| 10,274,954 | B2 | 4/2019 | Balutis et al. |
| D848,488 | S | 5/2019 | Cmich |
| 10,281,912 | B2 | 5/2019 | Hollister |
| 10,281,922 | B2 | 5/2019 | Smith et al. |
| 10,299,431 | B2 | 5/2019 | Ladd, Jr. et al. |
| 10,299,652 | B2 | 5/2019 | Gilbert, Jr. et al. |
| D852,232 | S | 6/2019 | Eidson et al. |
| 10,310,510 | B2 | 6/2019 | Mannefred et al. |
| 10,315,306 | B2 | 6/2019 | Abramson |
| 10,321,625 | B2 | 6/2019 | Einecke et al. |
| 10,327,384 | B2 | 6/2019 | Johansson et al. |
| D853,447 | S | 7/2019 | Mehra et al. |
| D853,448 | S | 7/2019 | Mehra et al. |
| D853,449 | S | 7/2019 | Mehra et al. |
| 10,334,777 | B2 | 7/2019 | Uemura |
| 10,338,602 | B2 | 7/2019 | Grufman et al. |
| 10,343,280 | B1 | 7/2019 | Ebrahimi Afrouzi |
| 10,346,995 | B1 | 7/2019 | Ebrahimi Afrouzi |
| 10,353,399 | B2 | 7/2019 | Ebrahimi Afrouzi |
| 10,362,730 | B2 | 7/2019 | Ladd, Jr. et al. |
| 10,365,661 | B2 | 7/2019 | Jägenstedt et al. |
| 10,369,705 | B2 | 8/2019 | Trigui et al. |
| 10,372,140 | B2 | 8/2019 | Sun et al. |
| 10,375,880 | B2 | 8/2019 | Morin et al. |
| 10,377,035 | B2 | 8/2019 | He et al. |
| 10,379,172 | B2 | 8/2019 | Kleiner et al. |
| 10,384,346 | B2 | 8/2019 | Hickman et al. |
| 10,386,844 | B2 | 8/2019 | Wilcox et al. |
| 10,390,483 | B2 | 8/2019 | Balutis et al. |
| 10,392,007 | B1 | 8/2019 | Brown |
| D858,424 | S | 9/2019 | Chattopadhyay |
| 10,405,488 | B2 | 9/2019 | Kamfors et al. |
| 10,425,488 | B2 | 9/2019 | Larsén et al. |
| D864,256 | S | 10/2019 | Eidson et al. |
| 10,426,083 | B2 | 10/2019 | Doughty |
| 10,440,879 | B2 | 10/2019 | Björn et al. |
| 10,442,083 | B2 | 10/2019 | Wolowelsky et al. |
| 10,444,756 | B2 | 10/2019 | Kamfors et al. |
| 10,444,757 | B2 | 10/2019 | Dong et al. |
| 10,444,760 | B2 | 10/2019 | Grufman et al. |
| 10,448,565 | B2 | 10/2019 | Mannefred et al. |
| 10,454,287 | B2 | 10/2019 | Yamamura et al. |
| 10,456,924 | B2 | 10/2019 | Outa et al. |
| 10,459,452 | B2 | 10/2019 | Eagling et al. |
| 10,462,961 | B2 | 11/2019 | Tjernberg et al. |
| 10,463,215 | B2 | 11/2019 | Morin et al. |
| 10,464,206 | B2 | 11/2019 | Frisby et al. |
| 10,466,710 | B2 | 11/2019 | Biber et al. |
| 10,485,164 | B2 | 11/2019 | Letsky |
| 10,488,865 | B2 | 11/2019 | Afrouzi et al. |
| 10,496,262 | B1 | 12/2019 | Ebrahimi Afrouzi et al. |
| 10,500,722 | B2 | 12/2019 | Vicenti |
| 10,514,701 | B2 | 12/2019 | Windorfer |
| 10,517,211 | B2 | 12/2019 | Öhrlund et al. |
| 10,518,651 | B2 | 12/2019 | Svensson et al. |
| 10,520,113 | B1 | 12/2019 | Thompson |
| 10,542,667 | B2 | 1/2020 | Song et al. |
| 10,542,670 | B2 | 1/2020 | Cmich et al. |
| 10,549,646 | B2 | 2/2020 | Reynolds et al. |
| 10,551,844 | B2 | 2/2020 | Biber et al. |
| 10,552,770 | B2 | 2/2020 | Brough et al. |
| 10,555,456 | B2 | 2/2020 | Borinato |
| 10,555,457 | B2 | 2/2020 | Song et al. |
| 10,561,063 | B2 | 2/2020 | Hasegawa et al. |
| 10,568,258 | B2 | 2/2020 | Wahlgren |
| 10,571,905 | B2 | 2/2020 | Yamamura |
| 10,571,928 | B2 | 2/2020 | Sun et al. |
| 10,575,465 | B2 | 3/2020 | Ran et al. |
| 10,575,696 | B2 | 3/2020 | O'Brien et al. |
| 10,583,562 | B2 | 3/2020 | Stout et al. |
| 10,588,255 | B2 | 3/2020 | Song et al. |
| 10,589,418 | B2 | 3/2020 | Gordon-Carroll et al. |
| 10,589,432 | B2 | 3/2020 | Al Nahwi et al. |
| 10,589,433 | B2 | 3/2020 | Al Nahwi et al. |
| 10,592,998 | B2 | 3/2020 | Eijdenberg et al. |
| 10,594,117 | B2 | 3/2020 | Song et al. |
| 10,595,459 | B2 | 3/2020 | Aposhian et al. |
| 10,595,692 | B2 | 3/2020 | Morin et al. |
| 10,598,793 | B2 | 3/2020 | Öhrlund et al. |
| 10,599,154 | B2 | 3/2020 | Dean et al. |
| 10,606,275 | B2 | 3/2020 | Dean et al. |
| 10,606,279 | B2 | 3/2020 | Grufman et al. |
| D880,532 | S | 4/2020 | Gunnarsson et al. |
| D881,252 | S | 4/2020 | Vestberg et al. |
| D882,640 | S | 4/2020 | Estey |
| 10,609,862 | B2 | 4/2020 | Wu et al. |
| 10,611,028 | B1 | 4/2020 | Zhou et al. |
| 10,612,929 | B2 | 4/2020 | Afrouzi et al. |
| 10,613,541 | B1 | 4/2020 | Ebrahimi Afrouzi et al. |
| 10,621,537 | B2 | 4/2020 | Ben-Alexander |
| D884,762 | S | 5/2020 | Gunnarsson et al. |
| D884,763 | S | 5/2020 | Gunnarsson et al. |
| 10,643,377 | B2 | 5/2020 | Grufman et al. |
| 10,646,997 | B2 | 5/2020 | Reigo et al. |
| 10,649,466 | B2 | 5/2020 | Holmström et al. |
| 10,651,594 | B2 | 5/2020 | Tsai et al. |
| 10,653,057 | B2 | 5/2020 | Choi et al. |
| 10,653,058 | B2 | 5/2020 | Yamanaka et al. |
| 10,653,282 | B2 | 5/2020 | Song et al. |
| 10,656,652 | B2 | 5/2020 | Dean et al. |
| D887,464 | S | 6/2020 | Gunnarsson et al. |
| D887,465 | S | 6/2020 | Gunnarsson et al. |
| D887,466 | S | 6/2020 | Gunnarsson et al. |

(56) References Cited

U.S. PATENT DOCUMENTS

| | | | |
|---|---|---|---|
| 10,670,406 B2 | 6/2020 | Eguchi et al. | |
| 10,673,630 B2 | 6/2020 | Pakkan et al. | |
| 10,674,659 B2 | 6/2020 | Ladd, Jr. et al. | |
| 10,674,660 B2 | 6/2020 | Matsuzawa et al. | |
| 10,681,863 B2 | 6/2020 | Hans et al. | |
| 10,681,864 B2 | 6/2020 | Matt et al. | |
| 10,681,867 B2 | 6/2020 | Dunbar | |
| 10,691,000 B2 | 6/2020 | Du et al. | |
| 10,698,417 B2 | 6/2020 | Churavy et al. | |
| D889,517 S | 7/2020 | Prybor et al. | |
| 10,716,258 B2 | 7/2020 | Pellenc et al. | |
| 10,721,860 B2 | 7/2020 | Liljedahl | |
| D892,187 S | 8/2020 | Maggard | |
| 10,737,369 B2 | 8/2020 | Steinhauser et al. | |
| 10,737,395 B2 | 8/2020 | Wolff et al. | |
| 10,738,495 B2 | 8/2020 | Durvasula et al. | |
| 10,739,769 B2 | 8/2020 | Dean et al. | |
| 10,747,413 B2 | 8/2020 | Schneider et al. | |
| 10,750,667 B2 | 8/2020 | Yamauchi et al. | |
| 10,750,918 B2 | 8/2020 | Jung et al. | |
| D896,737 S | 9/2020 | Phely | |
| 10,758,100 B2 | 9/2020 | Cohen et al. | |
| 10,765,284 B2 | 9/2020 | Song et al. | |
| 10,766,147 B2 | 9/2020 | Trigui et al. | |
| 10,777,000 B2 | 9/2020 | Grufman et al. | |
| 10,782,705 B2 | 9/2020 | Reigo et al. | |
| 10,785,907 B2 | 9/2020 | Doughty et al. | |
| 10,788,832 B2 | 9/2020 | Nykamp | |
| 10,791,684 B2 | 10/2020 | He et al. | |
| 10,795,377 B2 | 10/2020 | Afrouzi et al. | |
| 10,806,075 B2 | 10/2020 | Grufman et al. | |
| 10,809,071 B2 | 10/2020 | Afrouzi et al. | |
| 10,809,740 B2 | 10/2020 | Reinert et al. | |
| 10,814,495 B2 | 10/2020 | Patel et al. | |
| 10,820,493 B2 | 11/2020 | Ritzer et al. | |
| 10,824,163 B2 | 11/2020 | Einecke et al. | |
| 10,834,870 B2 | 11/2020 | Wagner | |
| 10,842,074 B2 | 11/2020 | Jägenstedt et al. | |
| 10,843,734 B1 | 11/2020 | Ebrahimi Afrouzi et al. | |
| 10,843,735 B1 | 11/2020 | Ebrahimi Afrouzi et al. | |
| 10,845,481 B2 | 11/2020 | Pierce et al. | |
| 10,845,804 B2 | 11/2020 | Holgersson et al. | |
| D906,373 S | 12/2020 | Morin et al. | |
| 10,849,267 B2 | 12/2020 | Strandberg et al. | |
| 10,849,270 B2 | 12/2020 | Johansson et al. | |
| 10,850,400 B2 | 12/2020 | Park | |
| 10,852,735 B2 | 12/2020 | Tan et al. | |
| 10,852,738 B2 | 12/2020 | Mannefred et al. | |
| 10,856,467 B2 | 12/2020 | Maggard | |
| 10,858,041 B2 | 12/2020 | Jägenstedt et al. | |
| 10,869,432 B2 | 12/2020 | Wykman et al. | |
| 10,873,194 B2 | 12/2020 | Lydon et al. | |
| 10,874,045 B2 | 12/2020 | Balutis et al. | |
| 10,874,049 B2 | 12/2020 | Ladd, Jr. et al. | |
| 10,874,051 B2 | 12/2020 | Kasai et al. | |
| 10,874,054 B2 | 12/2020 | Krystowski | |
| 10,874,278 B2 | 12/2020 | Matt et al. | |
| D908,597 S | 1/2021 | Meng et al. | |
| D908,598 S | 1/2021 | Meng et al. | |
| 10,882,187 B2 | 1/2021 | Li et al. | |
| 10,888,046 B2 | 1/2021 | Gorenflo et al. | |
| 10,888,047 B2 | 1/2021 | Yasuda | |
| 10,890,921 B2 | 1/2021 | Gillett | |
| 10,892,625 B1 | 1/2021 | Franklin et al. | |
| 10,895,876 B2 | 1/2021 | Arenz et al. | |
| 10,899,171 B2 | 1/2021 | Cmich | |
| 10,912,253 B2 | 2/2021 | Einecke et al. | |
| 10,928,833 B2 | 2/2021 | Reigo | |
| 10,932,409 B2 | 3/2021 | Ingvalson et al. | |
| 10,935,383 B1 | 3/2021 | Ebrahimi Afrouzi et al. | |
| 10,939,611 B2 | 3/2021 | Liljedahl | |
| 10,952,578 B2 | 3/2021 | Gill et al. | |
| 10,959,371 B2 | 3/2021 | Zhou et al. | |
| 10,966,368 B2 | 4/2021 | Desai et al. | |
| 10,967,752 B2 | 4/2021 | Liu et al. | |
| 10,973,168 B2 | 4/2021 | Hans et al. | |
| 10,974,597 B1 | 4/2021 | Manji | |
| 10,980,173 B2 * | 4/2021 | Becke | A01D 34/828 |
| 10,986,775 B2 | 4/2021 | Matt et al. | |
| 10,986,971 B1 | 4/2021 | Ebrahimi Afrouzi | |
| 10,993,598 B2 | 5/2021 | Park et al. | |
| 11,003,192 B2 | 5/2021 | Dalfra et al. | |
| 11,009,869 B2 | 5/2021 | Moroi et al. | |
| 11,013,655 B1 | 5/2021 | Ebrahimi Afrouzi et al. | |
| 11,014,460 B2 | 5/2021 | Schnittman et al. | |
| 11,016,481 B2 | 5/2021 | Gustavsson et al. | |
| D922,444 S | 6/2021 | Morin et al. | |
| 11,019,975 B2 | 6/2021 | Jang et al. | |
| 11,020,857 B2 | 6/2021 | Xiong et al. | |
| 11,032,973 B2 | 6/2021 | Conrad | |
| 11,039,582 B2 | 6/2021 | Gilliam et al. | |
| 11,039,583 B2 | 6/2021 | Gilliam et al. | |
| 11,044,844 B2 | 6/2021 | Keski-luopa et al. | |
| 11,048,268 B2 | 6/2021 | Ouyang | |
| 11,051,449 B2 | 7/2021 | Bergh et al. | |
| 11,051,671 B2 | 7/2021 | Jang et al. | |
| 11,052,535 B2 | 7/2021 | Parks, II et al. | |
| 11,052,540 B2 | 7/2021 | Stout et al. | |
| 11,054,822 B2 | 7/2021 | Özmen | |
| 11,054,836 B2 | 7/2021 | Wang et al. | |
| 11,058,053 B2 | 7/2021 | Patel et al. | |
| 11,064,652 B2 | 7/2021 | Matt et al. | |
| 11,065,762 B2 | 7/2021 | Sakai et al. | |
| 11,069,082 B1 | 7/2021 | Ebrahimi Afrouzi et al. | |
| 11,069,936 B2 | 7/2021 | Ito | |
| 11,071,429 B2 | 7/2021 | Jang et al. | |
| 11,072,250 B2 | 7/2021 | Gilbert, Jr. et al. | |
| 11,072,255 B2 | 7/2021 | Svensson et al. | |
| 11,075,910 B2 | 7/2021 | Dean et al. | |
| 11,076,529 B2 | 8/2021 | Chen et al. | |
| 11,079,755 B2 | 8/2021 | Schlacks, IV et al. | |
| 11,084,172 B2 | 8/2021 | Casey et al. | |
| 11,089,732 B2 | 8/2021 | Jägenstedt et al. | |
| 11,097,428 B2 | 8/2021 | Al Nahwi et al. | |
| 11,099,572 B2 | 8/2021 | Cestonaro et al. | |
| 11,104,006 B2 | 8/2021 | Fay et al. | |
| 11,105,109 B2 | 8/2021 | Durvasula et al. | |
| 11,106,215 B2 | 8/2021 | Dalfra | |
| 11,109,528 B2 | 9/2021 | Strang | |
| 11,109,731 B2 | 9/2021 | Jang et al. | |
| 11,112,505 B2 | 9/2021 | Öhrlund et al. | |
| 11,112,532 B2 | 9/2021 | Jägenstedt et al. | |
| 11,115,798 B2 | 9/2021 | Beaulieu et al. | |
| 11,117,264 B2 | 9/2021 | Tsai et al. | |
| 11,119,496 B1 | 9/2021 | Ebrahimi Afrouzi et al. | |
| 11,125,291 B2 | 9/2021 | Matsuura | |
| 11,126,193 B2 | 9/2021 | Mannefred et al. | |
| 11,134,609 B2 | 10/2021 | Willgert et al. | |
| 11,140,815 B2 | 10/2021 | Matt et al. | |
| 11,140,819 B2 | 10/2021 | Chen et al. | |
| 11,141,034 B2 | 10/2021 | Jang et al. | |
| 11,147,209 B1 | 10/2021 | George | |
| 11,154,006 B2 | 10/2021 | Liljedahl | |
| 11,154,442 B1 | 10/2021 | Dean et al. | |
| 11,157,015 B2 | 10/2021 | Schnittman | |
| D937,181 S | 11/2021 | Guidry | |
| 11,161,235 B2 | 11/2021 | He et al. | |
| 11,161,381 B2 | 11/2021 | Svensson et al. | |
| 11,161,422 B2 | 11/2021 | Andriolo et al. | |
| 11,161,578 B2 | 11/2021 | Wu et al. | |
| 11,163,292 B2 | 11/2021 | Adler et al. | |
| 11,166,411 B2 | 11/2021 | Fuse et al. | |
| 11,169,527 B2 | 11/2021 | Dalfra | |
| 11,169,530 B1 | 11/2021 | Ärlig et al. | |
| 11,171,497 B2 | 11/2021 | Jiao et al. | |
| 11,173,594 B2 | 11/2021 | Kim | |
| 11,175,374 B2 | 11/2021 | Kameyama et al. | |
| 11,191,403 B2 | 12/2021 | Gill et al. | |
| 11,197,414 B2 | 12/2021 | Zeiler et al. | |
| 11,199,853 B1 | 12/2021 | Afrouzi et al. | |
| 11,202,547 B2 | 12/2021 | Jang et al. | |
| 11,215,461 B1 | 1/2022 | Ebrahimi Afrouzi et al. | |
| 11,221,628 B2 | 1/2022 | Holgersson et al. | |
| 11,225,228 B2 | 1/2022 | Liu et al. | |

(56) References Cited

U.S. PATENT DOCUMENTS

| | | | |
|---|---|---|---|
| 11,229,154 B2 | 1/2022 | Hershbarger | |
| 11,231,708 B2 | 1/2022 | Hyakusawa | |
| D943,638 S | 2/2022 | Rauch et al. | |
| 11,235,451 B2 | 2/2022 | Bombulie | |
| 11,235,472 B2 | 2/2022 | Al Nahwi et al. | |
| 11,253,126 B2 | 2/2022 | Jang et al. | |
| 11,260,765 B2 | 3/2022 | Namiki et al. | |
| 11,269,349 B2 | 3/2022 | Shao et al. | |
| 11,274,929 B1 | 3/2022 | Afrouzi et al. | |
| 11,278,176 B2 | 3/2022 | Huang et al. | |
| 11,278,177 B2 | 3/2022 | Lin et al. | |
| 11,284,766 B2 | 3/2022 | Jang et al. | |
| 11,287,821 B2 | 3/2022 | Borinato | |
| 11,287,832 B2 | 3/2022 | Ebrahimi Afrouzi | |
| 11,291,343 B2 | 4/2022 | Jang et al. | |
| 11,292,136 B2 | 4/2022 | Wolff et al. | |
| 11,298,831 B2 | 4/2022 | Tsai et al. | |
| 11,300,975 B2 | 4/2022 | Dalfra et al. | |
| 11,320,828 B1 | 5/2022 | Ebrahimi Afrouzi et al. | |
| 11,325,590 B2 | 5/2022 | Han et al. | |
| 11,340,079 B1 | 5/2022 | Ebrahimi Afrouzi et al. | |
| 11,347,230 B2 | 5/2022 | Wang et al. | |
| 11,351,670 B2 | 6/2022 | Wolowelsky et al. | |
| 11,357,166 B2 | 6/2022 | Hahn et al. | |
| 11,357,167 B2 | 6/2022 | Aposhian et al. | |
| 11,378,979 B2 | 7/2022 | Zhou et al. | |
| 11,380,320 B2 | 7/2022 | Duncan | |
| 11,393,114 B1 | 7/2022 | Ebrahimi Afrouzi et al. | |
| 11,415,998 B2 | 8/2022 | Strandberg | |
| 11,464,164 B2 | 10/2022 | Cmich et al. | |
| 11,596,117 B2 | 3/2023 | Koehler et al. | |
| 11,614,744 B2 | 3/2023 | Ran et al. | |
| 11,654,574 B2 | 5/2023 | Zhang et al. | |
| 11,662,723 B2 | 5/2023 | Schlacks, IV et al. | |
| 2002/0005237 A1 | 1/2002 | Musat et al. | |
| 2002/0038537 A1* | 4/2002 | Umemoto | A01D 34/6806 |
| | | | 56/13.3 |
| 2003/0029149 A1 | 2/2003 | Fillman et al. | |
| 2003/0144774 A1 | 7/2003 | Trissel et al. | |
| 2003/0218046 A1 | 11/2003 | Mangone, Jr. | |
| 2003/0236590 A1 | 12/2003 | Park et al. | |
| 2004/0000823 A1 | 1/2004 | Patridge | |
| 2004/0103659 A1 | 6/2004 | Johnson | |
| 2004/0158358 A1 | 8/2004 | Anezaki et al. | |
| 2004/0160415 A1* | 8/2004 | Rosenberg | G05G 9/047 |
| | | | 345/156 |
| 2004/0187457 A1 | 9/2004 | Colens | |
| 2004/0190376 A1 | 9/2004 | Hulden et al. | |
| 2004/0200505 A1 | 10/2004 | Taylor et al. | |
| 2004/0204792 A1 | 10/2004 | Taylor et al. | |
| 2004/0211444 A1 | 10/2004 | Taylor et al. | |
| 2004/0236468 A1 | 11/2004 | Taylor et al. | |
| 2004/0244138 A1 | 12/2004 | Taylor et al. | |
| 2005/0010331 A1 | 1/2005 | Taylor et al. | |
| 2005/0028346 A1 | 2/2005 | Mangone, Jr. | |
| 2005/0034437 A1 | 2/2005 | McMurtry et al. | |
| 2005/0039428 A1 | 2/2005 | McMurtry et al. | |
| 2005/0042059 A1 | 2/2005 | Bremer | |
| 2005/0060975 A1 | 3/2005 | McClymonds | |
| 2005/0171637 A1 | 8/2005 | Tani et al. | |
| 2005/0171644 A1 | 8/2005 | Tani | |
| 2005/0273967 A1 | 12/2005 | Taylor et al. | |
| 2006/0010844 A1 | 1/2006 | Angott | |
| 2006/0020369 A1 | 1/2006 | Taylor et al. | |
| 2006/0020370 A1 | 1/2006 | Abramson | |
| 2006/0191096 A1 | 8/2006 | Sudo et al. | |
| 2006/0212191 A1 | 9/2006 | Saeki | |
| 2006/0217854 A1 | 9/2006 | Takenaka et al. | |
| 2006/0219838 A1 | 10/2006 | Audet | |
| 2006/0272308 A1 | 12/2006 | Moore | |
| 2007/0100496 A1 | 5/2007 | Forell | |
| 2007/0119137 A1 | 5/2007 | Brandon | |
| 2007/0142972 A1 | 6/2007 | Abramson et al. | |
| 2007/0143949 A1 | 6/2007 | Chiu | |
| 2007/0145943 A1 | 6/2007 | Sudo | |

| | | | |
|---|---|---|---|
| 2007/0150109 A1 | 6/2007 | Peless et al. | |
| 2007/0193239 A1 | 8/2007 | Satoski | |
| 2007/0234698 A1 | 10/2007 | Silbernagel et al. | |
| 2007/0276541 A1 | 11/2007 | Sawasaki | |
| 2008/0066988 A1 | 3/2008 | Asp | |
| 2008/0143065 A1 | 6/2008 | Defazio et al. | |
| 2008/0163117 A1 | 7/2008 | Machtelinck et al. | |
| 2008/0167753 A1 | 7/2008 | Peless et al. | |
| 2008/0256941 A1* | 10/2008 | Bertolasi | G05G 9/047 |
| | | | 60/422 |
| 2008/0281470 A1 | 11/2008 | Gilbert, Jr. et al. | |
| 2008/0294288 A1 | 11/2008 | Yamauchi | |
| 2008/0296107 A1 | 12/2008 | Porter | |
| 2009/0038282 A1 | 2/2009 | Avalle et al. | |
| 2009/0112679 A1 | 4/2009 | Machtelinck | |
| 2009/0157259 A1 | 6/2009 | Han et al. | |
| 2009/0182464 A1 | 7/2009 | Myeong et al. | |
| 2009/0217636 A1* | 9/2009 | Loxterkamp | B62D 11/006 |
| | | | 56/10.8 |
| 2009/0230749 A1* | 9/2009 | Kostak | B60N 2/777 |
| | | | 701/50 |
| 2009/0260901 A1* | 10/2009 | Ishii | B60L 15/2036 |
| | | | 701/70 |
| 2009/0276277 A1 | 11/2009 | Vansteenkiste et al. | |
| 2009/0313038 A1 | 12/2009 | Machtelinck | |
| 2010/0057286 A1 | 3/2010 | Kerchner | |
| 2010/0063652 A1 | 3/2010 | Anderson | |
| 2010/0066587 A1 | 3/2010 | Yamauchi et al. | |
| 2010/0140999 A1* | 6/2010 | Kladde | B60N 2/507 |
| | | | 297/340 |
| 2010/0275564 A1 | 11/2010 | Baetica et al. | |
| 2010/0299016 A1 | 11/2010 | Benzler et al. | |
| 2010/0302017 A1* | 12/2010 | Guglielmo | B66F 11/046 |
| | | | 345/161 |
| 2011/0046784 A1 | 2/2011 | Anderson | |
| 2011/0046836 A1 | 2/2011 | Anderson | |
| 2011/0048153 A1* | 3/2011 | Standke | G05G 9/047 |
| | | | 74/471 XY |
| 2011/0112713 A1 | 5/2011 | Teng et al. | |
| 2011/0153172 A1 | 6/2011 | Anderson | |
| 2011/0153338 A1 | 6/2011 | Anderson | |
| 2011/0197419 A1* | 8/2011 | Melone | A01D 34/64 |
| | | | 29/428 |
| 2011/0202307 A1 | 8/2011 | Petereit et al. | |
| 2011/0208357 A1 | 8/2011 | Yamauchi | |
| 2011/0260689 A1 | 10/2011 | Kano | |
| 2011/0295423 A1 | 12/2011 | Anderson | |
| 2012/0012635 A1 | 1/2012 | Jaffe et al. | |
| 2012/0029752 A1 | 2/2012 | Johnson et al. | |
| 2012/0101679 A1 | 4/2012 | Anderson et al. | |
| 2012/0111655 A1 | 5/2012 | Ebihara et al. | |
| 2012/0143429 A1 | 6/2012 | Anderson | |
| 2012/0215380 A1 | 8/2012 | Fouillade et al. | |
| 2012/0226381 A1 | 9/2012 | Abramson et al. | |
| 2012/0253581 A1 | 10/2012 | Anderson | |
| 2012/0265346 A1 | 10/2012 | Gilbert, Jr. et al. | |
| 2012/0303160 A1 | 11/2012 | Ziegler et al. | |
| 2013/0000677 A1 | 1/2013 | Sumonthee | |
| 2013/0031787 A1 | 2/2013 | Kamiya et al. | |
| 2013/0031788 A1 | 2/2013 | Ohno | |
| 2013/0093380 A1 | 4/2013 | Gallert | |
| 2013/0098402 A1 | 4/2013 | Yoon et al. | |
| 2013/0167495 A1 | 7/2013 | Borinato | |
| 2013/0214498 A1 | 8/2013 | DeFazio et al. | |
| 2014/0000231 A1 | 1/2014 | Bernini | |
| 2014/0126952 A1 | 5/2014 | Fay, II | |
| 2014/0163733 A1 | 6/2014 | Sadowski et al. | |
| 2014/0165524 A1 | 6/2014 | Schygge | |
| 2014/0173946 A1 | 6/2014 | Gerrits | |
| 2014/0197222 A1 | 7/2014 | Howe | |
| 2014/0203776 A1 | 7/2014 | Ireland et al. | |
| 2014/0204510 A1 | 7/2014 | Ireland | |
| 2014/0330496 A1 | 11/2014 | Crouse et al. | |
| 2014/0345240 A1 | 11/2014 | Poe | |
| 2015/0012164 A1 | 1/2015 | Yu et al. | |
| 2015/0045992 A1 | 2/2015 | Ashby et al. | |
| 2015/0120057 A1 | 4/2015 | Wong et al. | |
| 2015/0128547 A1 | 5/2015 | Einecke et al. | |

(56) References Cited

U.S. PATENT DOCUMENTS

| | | |
|---|---|---|
| 2015/0163993 A1 | 6/2015 | Pettersson |
| 2015/0181806 A1 | 7/2015 | Lim et al. |
| 2015/0270729 A1 | 9/2015 | Isobe |
| 2015/0301532 A1 | 10/2015 | Norris et al. |
| 2015/0359168 A1* | 12/2015 | Higashikawa ......... A01D 34/66 |
| | | 56/14.7 |
| 2015/0379785 A1 | 12/2015 | Brown, Jr. et al. |
| 2016/0014957 A1 | 1/2016 | Johansson et al. |
| 2016/0075032 A1 | 3/2016 | Goel et al. |
| 2016/0100523 A1 | 4/2016 | Anderson |
| 2016/0128275 A1 | 5/2016 | Johnson |
| 2016/0146611 A1 | 5/2016 | Matthews |
| 2016/0149177 A1 | 5/2016 | Sugeno et al. |
| 2016/0157275 A1 | 6/2016 | Matthews |
| 2016/0174140 A1 | 6/2016 | Wu et al. |
| 2016/0179095 A1 | 6/2016 | Sarid et al. |
| 2016/0187885 A1 | 6/2016 | Pack et al. |
| 2016/0198644 A1 | 7/2016 | Lameli et al. |
| 2016/0311076 A1 | 10/2016 | Matsumoto et al. |
| 2016/0316619 A1 | 11/2016 | Johanek et al. |
| 2016/0336769 A1 | 11/2016 | Kim et al. |
| 2016/0338262 A1 | 11/2016 | Liu et al. |
| 2016/0354931 A1 | 12/2016 | Jones et al. |
| 2016/0360695 A1 | 12/2016 | Klackensjö |
| 2016/0378111 A1 | 12/2016 | Lenser et al. |
| 2017/0046663 A1 | 2/2017 | Wong et al. |
| 2017/0088010 A1 | 3/2017 | Tonks et al. |
| 2017/0196164 A1* | 7/2017 | Bryant ................. A01D 34/008 |
| 2017/0269595 A1 | 9/2017 | Chen |
| 2017/0303466 A1 | 10/2017 | Grufman et al. |
| 2017/0308092 A1 | 10/2017 | Altinger et al. |
| 2017/0325648 A1 | 11/2017 | Huang |
| 2017/0351260 A1 | 12/2017 | Willgert et al. |
| 2017/0361468 A1 | 12/2017 | Cheuvront et al. |
| 2018/0006280 A1 | 1/2018 | Ovadia et al. |
| 2018/0103583 A1 | 4/2018 | Stridh |
| 2018/0120852 A1 | 5/2018 | Cho |
| 2018/0184585 A1 | 7/2018 | Song et al. |
| 2018/0184591 A1 | 7/2018 | Song et al. |
| 2018/0232134 A1 | 8/2018 | Ebrahimi Afrouzi et al. |
| 2018/0246516 A1 | 8/2018 | Franzius et al. |
| 2018/0263182 A1 | 9/2018 | Albinger et al. |
| 2018/0267552 A1 | 9/2018 | Artes et al. |
| 2018/0317368 A1 | 11/2018 | Du et al. |
| 2018/0344116 A1 | 12/2018 | Schriesheim et al. |
| 2018/0348787 A1 | 12/2018 | Sandin et al. |
| 2019/0041869 A1 | 2/2019 | Shao et al. |
| 2019/0049593 A1 | 2/2019 | He et al. |
| 2019/0049968 A1 | 2/2019 | Dean et al. |
| 2019/0049984 A1 | 2/2019 | Wong et al. |
| 2019/0053423 A1 | 2/2019 | Guiet et al. |
| 2019/0069330 A1 | 2/2019 | Ebrahimi Afrouzi et al. |
| 2019/0113931 A1 | 4/2019 | Zha et al. |
| 2019/0118877 A1 | 4/2019 | Ran et al. |
| 2019/0141886 A1 | 5/2019 | Liu et al. |
| 2019/0141888 A1 | 5/2019 | Balutis et al. |
| 2019/0160972 A1 | 5/2019 | Zeiler |
| 2019/0166487 A1 | 5/2019 | Russ et al. |
| 2019/0176321 A1 | 6/2019 | Afrouzi et al. |
| 2019/0187714 A1 | 6/2019 | He et al. |
| 2019/0199120 A1 | 6/2019 | Hoppel et al. |
| 2019/0227574 A1 | 7/2019 | Du et al. |
| 2019/0229580 A1 | 7/2019 | Edwards |
| 2019/0239428 A1 | 8/2019 | Levin et al. |
| 2019/0246862 A1 | 8/2019 | Gilbert, Jr. et al. |
| 2019/0248007 A1 | 8/2019 | Duffy et al. |
| 2019/0250604 A1 | 8/2019 | Balutis et al. |
| 2019/0265724 A1 | 8/2019 | Sheng et al. |
| 2019/0270124 A1 | 9/2019 | Jang et al. |
| 2019/0270435 A1 | 9/2019 | Matsuura |
| 2019/0275666 A1 | 9/2019 | Abramson |
| 2019/0278269 A1 | 9/2019 | He et al. |
| 2019/0289785 A1 | 9/2019 | Kasai |
| 2019/0291779 A1 | 9/2019 | Zeiler |
| 2019/0297869 A1 | 10/2019 | Michaels et al. |
| 2019/0299398 A1 | 10/2019 | Svensson |
| 2019/0313576 A1 | 10/2019 | Haneda et al. |
| 2019/0320580 A1 | 10/2019 | Haneda et al. |
| 2019/0327895 A1 | 10/2019 | Walden |
| 2019/0339719 A1 | 11/2019 | Wang et al. |
| 2019/0343040 A1 | 11/2019 | Testolin et al. |
| 2019/0344419 A1 | 11/2019 | Zhu |
| 2019/0346848 A1 | 11/2019 | Zhou et al. |
| 2019/0357430 A1 | 11/2019 | Kraft |
| 2019/0357431 A1 | 11/2019 | Kamfors et al. |
| 2019/0369620 A1 | 12/2019 | Zhou et al. |
| 2019/0369629 A1 | 12/2019 | Dalfra |
| 2019/0369640 A1 | 12/2019 | He et al. |
| 2019/0378360 A1 | 12/2019 | Bergenholm et al. |
| 2019/0380265 A1 | 12/2019 | Matsuda |
| 2019/0380266 A1 | 12/2019 | Liljedahl |
| 2019/0381900 A1* | 12/2019 | Ito ........................... B60K 1/04 |
| 2019/0383887 A1 | 12/2019 | Kleiner et al. |
| 2019/0384306 A1 | 12/2019 | Jang et al. |
| 2019/0391589 A1 | 12/2019 | Komorida et al. |
| 2020/0000023 A1 | 1/2020 | Chung |
| 2020/0019156 A1 | 1/2020 | Drew et al. |
| 2020/0022553 A1 | 1/2020 | Gill et al. |
| 2020/0033386 A1 | 1/2020 | Abramson |
| 2020/0037498 A1 | 2/2020 | Ko et al. |
| 2020/0039079 A1 | 2/2020 | Brouwers et al. |
| 2020/0042011 A1 | 2/2020 | Ärlig et al. |
| 2020/0044212 A1 | 2/2020 | Lee |
| 2020/0044401 A1 | 2/2020 | Uemura |
| 2020/0050208 A1 | 2/2020 | Frick et al. |
| 2020/0073403 A1 | 3/2020 | Abramson et al. |
| 2020/0083706 A1 | 3/2020 | Paskov |
| 2020/0093058 A1 | 3/2020 | Ritzer et al. |
| 2020/0100425 A1 | 4/2020 | Li |
| 2020/0101920 A1 | 4/2020 | Bartel |
| 2020/0108499 A1 | 4/2020 | Vicenti |
| 2020/0120863 A1 | 4/2020 | Liu et al. |
| 2020/0128750 A1 | 4/2020 | Svensson et al. |
| 2020/0129029 A1 | 4/2020 | Kim et al. |
| 2020/0139536 A1 | 5/2020 | Frisby et al. |
| 2020/0146211 A1 | 5/2020 | Wahlgren |
| 2020/0146214 A1 | 5/2020 | Wagner |
| 2020/0154637 A1 | 5/2020 | Doughty |
| 2020/0170180 A1 | 6/2020 | Kong et al. |
| 2020/0172166 A1 | 6/2020 | Chang et al. |
| 2020/0173784 A1 | 6/2020 | Chang |
| 2020/0193071 A1 | 6/2020 | Yu et al. |
| 2020/0196523 A1 | 6/2020 | Ran et al. |
| 2020/0198488 A1 | 6/2020 | Liljedahl |
| 2020/0201328 A1 | 6/2020 | Abramson |
| 2020/0201347 A1 | 6/2020 | Dalfra et al. |
| 2020/0206896 A1 | 7/2020 | Wong et al. |
| 2020/0221633 A1 | 7/2020 | Einecke et al. |
| 2020/0229344 A1 | 7/2020 | Du et al. |
| 2020/0233658 A1 | 7/2020 | Yang et al. |
| 2020/0236846 A1 | 7/2020 | Choi et al. |
| 2020/0237169 A1 | 7/2020 | Song et al. |
| 2020/0239090 A1 | 7/2020 | Kong et al. |
| 2020/0245550 A1 | 8/2020 | Smith et al. |
| 2020/0245560 A1 | 8/2020 | Legault |
| 2020/0253116 A1 | 8/2020 | Ladd, Jr. et al. |
| 2020/0256369 A1 | 8/2020 | Gao et al. |
| 2020/0260638 A1 | 8/2020 | Rotole |
| 2020/0267903 A1 | 8/2020 | Gao et al. |
| 2020/0269914 A1 | 8/2020 | Lawson, Jr. |
| 2020/0277923 A1 | 9/2020 | Dixon |
| 2020/0278680 A1 | 9/2020 | Schulz et al. |
| 2020/0278683 A1 | 9/2020 | Dean et al. |
| 2020/0281114 A1 | 9/2020 | Jägenstedt et al. |
| 2020/0281430 A1 | 9/2020 | Morin et al. |
| 2020/0282863 A1 | 9/2020 | David et al. |
| 2020/0282972 A1 | 9/2020 | Manji |
| 2020/0285963 A1 | 9/2020 | Velkey et al. |
| 2020/0287397 A1 | 9/2020 | Jiao et al. |
| 2020/0297180 A1 | 9/2020 | Kang et al. |
| 2020/0300203 A1 | 9/2020 | Brune |
| 2020/0300206 A1 | 9/2020 | Zeiler |
| 2020/0315087 A1 | 10/2020 | Svensson et al. |
| 2020/0315095 A1 | 10/2020 | Liu |

(56) References Cited

U.S. PATENT DOCUMENTS

| | | |
|---|---|---|
| 2020/0323191 A1 | 10/2020 | Duncan et al. |
| 2020/0323408 A1 | 10/2020 | Cohen et al. |
| 2020/0326725 A1 | 10/2020 | Churavy et al. |
| 2020/0337201 A1 | 10/2020 | Siekmann |
| 2020/0337226 A1 | 10/2020 | Xian |
| 2020/0352082 A1 | 11/2020 | Maeder et al. |
| 2020/0352091 A1 | 11/2020 | Ambros et al. |
| 2020/0356093 A1 | 11/2020 | Shimamura et al. |
| 2020/0362536 A1 | 11/2020 | Shimamura et al. |
| 2020/0363810 A1 | 11/2020 | Arras et al. |
| 2020/0366481 A1 | 11/2020 | Pakkan et al. |
| 2020/0367429 A1 | 11/2020 | Yuan |
| 2020/0369080 A1 | 11/2020 | Cmich |
| 2020/0375096 A1 | 12/2020 | Coleman |
| 2020/0375097 A1 | 12/2020 | Coleman |
| 2020/0375098 A1 | 12/2020 | Muro et al. |
| 2020/0383265 A1 | 12/2020 | Holgersson |
| 2020/0393844 A1 | 12/2020 | Ritzer et al. |
| 2020/0396916 A1 | 12/2020 | He et al. |
| 2020/0401146 A1 | 12/2020 | Strandberg |
| 2021/0000005 A1 | 1/2021 | Robinson |
| 2021/0000008 A1 | 1/2021 | Svensson et al. |
| 2021/0003405 A1 | 1/2021 | Choi |
| 2021/0004895 A1 | 1/2021 | Kuriyagawa et al. |
| 2021/0016453 A1 | 1/2021 | Patel et al. |
| 2021/0018927 A1 | 1/2021 | Ackerman et al. |
| 2021/0029873 A1 | 2/2021 | Yamauchi et al. |
| 2021/0029874 A1 | 2/2021 | Robertsson |
| 2021/0031367 A1 | 2/2021 | Mirzaei et al. |
| 2021/0037703 A1 | 2/2021 | Holgersson |
| 2021/0039501 A1 | 2/2021 | Matsuda |
| 2021/0041871 A1 | 2/2021 | Lai et al. |
| 2021/0048831 A1 | 2/2021 | Yun et al. |
| 2021/0057694 A1 | 2/2021 | Zeiler |
| 2021/0059112 A1 | 3/2021 | Kim |
| 2021/0059116 A1 | 3/2021 | Laurin |
| 2021/0064036 A1 | 3/2021 | Muro et al. |
| 2021/0064050 A1 | 3/2021 | Pickett et al. |
| 2021/0070356 A1 | 3/2021 | Lyzen et al. |
| 2021/0072764 A1 | 3/2021 | Kean |
| 2021/0076561 A1 | 3/2021 | Kiyooka |
| 2021/0076562 A1 | 3/2021 | Doughty et al. |
| 2021/0076563 A1 | 3/2021 | Andriolo et al. |
| 2021/0076892 A1 | 3/2021 | Schriesheim et al. |
| 2021/0083492 A1 | 3/2021 | Towner et al. |
| 2021/0083493 A1 | 3/2021 | Towner et al. |
| 2021/0083494 A1 | 3/2021 | Towner et al. |
| 2021/0084815 A1 | 3/2021 | Li et al. |
| 2021/0084821 A1 | 3/2021 | Wu |
| 2021/0086831 A1 | 3/2021 | Ikeda |
| 2021/0089034 A1 | 3/2021 | Hjelmaker |
| 2021/0092912 A1 | 4/2021 | Wykman et al. |
| 2021/0094346 A1 | 4/2021 | Cmich |
| 2021/0100160 A1 | 4/2021 | Kang et al. |
| 2021/0100161 A1 | 4/2021 | Balutis et al. |
| 2021/0107363 A1 | 4/2021 | Han et al. |
| 2021/0111384 A1 | 4/2021 | Jeffrey |
| 2021/0112712 A1 | 4/2021 | Vaughn |
| 2021/0114810 A1 | 4/2021 | Matsuoka et al. |
| 2021/0116911 A1 | 4/2021 | Pjevach |
| 2021/0116933 A1 | 4/2021 | Ouyang |
| 2021/0125366 A1 | 4/2021 | Hasberg et al. |
| 2021/0127569 A1 | 5/2021 | Gruhler et al. |
| 2021/0127577 A1 | 5/2021 | Weihl |
| 2021/0129904 A1 | 5/2021 | Manji |
| 2021/0132604 A1 | 5/2021 | Gillett |
| 2021/0132624 A1 | 5/2021 | Andriolo et al. |
| 2021/0132625 A1 | 5/2021 | Gillett |
| 2021/0132626 A1 | 5/2021 | Gillett |
| 2021/0143650 A1 | 5/2021 | Wang |
| 2021/0153428 A1 | 5/2021 | Mittmann et al. |
| 2021/0153431 A1 | 5/2021 | Hermansson |
| 2021/0153710 A1 | 5/2021 | Mosebach et al. |
| 2021/0157331 A1 | 5/2021 | He |
| 2021/0161065 A1 | 6/2021 | Holgersson |
| 2021/0165109 A1 | 6/2021 | Yang et al. |
| 2021/0165411 A1 | 6/2021 | Andriolo et al. |
| 2021/0168999 A1 | 6/2021 | Xu |
| 2021/0170852 A1 | 6/2021 | Fan |
| 2021/0176915 A1 | 6/2021 | Vines et al. |
| 2021/0179137 A1 | 6/2021 | Gillett |
| 2021/0185911 A1 | 6/2021 | Agerhall |
| 2021/0191764 A1 | 6/2021 | Dalfra |
| 2021/0200226 A1 | 7/2021 | Wang et al. |
| 2021/0200228 A1 | 7/2021 | Grufman et al. |
| 2021/0204473 A1 | 7/2021 | Andriolo et al. |
| 2021/0206367 A1 | 7/2021 | Liu et al. |
| 2021/0216070 A1 | 7/2021 | VanKampen et al. |
| 2021/0219488 A1 | 7/2021 | Zhao et al. |
| 2021/0221246 A1 | 7/2021 | Liu et al. |
| 2021/0223787 A1 | 7/2021 | Pellisari |
| 2021/0227744 A1 | 7/2021 | Zhou et al. |
| 2021/0228043 A1 | 7/2021 | Jang et al. |
| 2021/0230622 A1 | 7/2021 | Crow et al. |
| 2021/0235616 A1 | 8/2021 | Stark et al. |
| 2021/0255638 A1 | 8/2021 | Ma et al. |
| 2021/0257843 A1 | 8/2021 | Andres, V et al. |
| 2021/0257951 A1 | 8/2021 | Tae-Jong et al. |
| 2021/0259497 A1 | 8/2021 | Park et al. |
| 2021/0263131 A1 | 8/2021 | Dalfra |
| 2021/0263529 A1 | 8/2021 | Takahashi et al. |
| 2021/0270225 A1 | 9/2021 | Meyer |
| 2021/0270338 A1 | 9/2021 | Ederfors |
| 2021/0272438 A1 | 9/2021 | Askenmalm |
| 2021/0274705 A1 | 9/2021 | Mårtensson et al. |
| 2021/0282322 A1 | 9/2021 | Yoon et al. |
| 2021/0289695 A1 | 9/2021 | Grufman et al. |
| 2021/0294348 A1 | 9/2021 | Lan et al. |
| 2021/0298232 A1 | 9/2021 | Wolf et al. |
| 2021/0302999 A1 | 9/2021 | Yokoyama et al. |
| 2021/0311484 A1 | 10/2021 | Lee et al. |
| 2021/0315155 A1 | 10/2021 | Lee et al. |
| 2021/0315162 A1 | 10/2021 | Ogura |
| 2021/0321854 A1 | 10/2021 | Zhang et al. |
| 2021/0325872 A1 | 10/2021 | Schlacks, IV et al. |
| 2021/0325874 A1 | 10/2021 | Schlacks, IV et al. |
| 2021/0325875 A1 | 10/2021 | Schlacks, IV et al. |
| 2021/0325876 A1 | 10/2021 | Schlacks, IV et al. |
| 2021/0325877 A1 | 10/2021 | Schlacks, IV et al. |
| 2021/0325878 A1 | 10/2021 | Schlacks, IV et al. |
| 2021/0328991 A1 | 10/2021 | Dean et al. |
| 2021/0329836 A1 | 10/2021 | Wang |
| 2021/0329841 A1 | 10/2021 | Cuong et al. |
| 2021/0331594 A1 | 10/2021 | Svensson et al. |
| 2021/0337726 A1 | 11/2021 | Keski-Luopa et al. |
| 2021/0344299 A1 | 11/2021 | Layne et al. |
| 2021/0345544 A1 | 11/2021 | Han et al. |
| 2021/0345545 A1 | 11/2021 | Zhao et al. |
| 2021/0347204 A1 | 11/2021 | Cmich |
| 2021/0352841 A1 | 11/2021 | Edfors et al. |
| 2021/0352842 A1 | 11/2021 | Pu et al. |
| 2021/0352843 A1 | 11/2021 | Zhao et al. |
| 2021/0360853 A1 | 11/2021 | Herrera |
| 2021/0365044 A1 | 11/2021 | Xue et al. |
| 2021/0382476 A1 | 12/2021 | Morrison et al. |
| 2022/0009363 A1 | 1/2022 | Gilbert, Jr. et al. |
| 2022/0022371 A1 | 1/2022 | Askenmalm et al. |
| 2022/0022386 A1 | 1/2022 | Danling |
| 2022/0029477 A1 | 1/2022 | He et al. |
| 2022/0030766 A1 | 2/2022 | Johansson |
| 2022/0039313 A1 | 2/2022 | Morrison et al. |
| 2022/0061212 A1 | 3/2022 | Zeiler et al. |
| 2022/0066456 A1 | 3/2022 | Ebrahimi Afrouzi et al. |
| 2022/0071086 A1 | 3/2022 | Levin et al. |
| 2022/0071465 A1 | 3/2022 | Kim et al. |
| 2022/0083075 A1 | 3/2022 | Heiss et al. |
| 2022/0091257 A1 | 3/2022 | Almers et al. |
| 2022/0100197 A1 | 3/2022 | Chao |
| 2022/0124973 A1 | 4/2022 | Juel |
| 2022/0129000 A1 | 4/2022 | Ingvalson et al. |
| 2022/0142438 A1 | 5/2022 | Chen et al. |
| 2022/0151143 A1 | 5/2022 | Liljedahl et al. |
| 2022/0151147 A1 | 5/2022 | Chen et al. |
| 2022/0167552 A1 | 6/2022 | Frick et al. |

(56) References Cited

U.S. PATENT DOCUMENTS

| | | |
|---|---|---|
| 2022/0167553 A1 | 6/2022 | Rogö et al. |
| 2022/0174868 A1 | 6/2022 | Flygare |
| 2022/0180282 A1 | 6/2022 | Powell et al. |
| 2022/0183223 A1 | 6/2022 | Svensson et al. |
| 2022/0183226 A1 | 6/2022 | Paolo Andriolo |
| 2022/0201845 A1 | 6/2022 | Prasad et al. |
| 2022/0217902 A1 | 7/2022 | Chen et al. |
| 2022/0217904 A1 | 7/2022 | Svensson et al. |
| 2022/0240444 A1 | 8/2022 | Wang et al. |
| 2022/0261006 A1 | 8/2022 | Zaslavsky et al. |
| 2022/0272897 A1 | 9/2022 | Jiao et al. |
| 2022/0295696 A1 | 9/2022 | Holgersson et al. |
| 2022/0295709 A1 | 9/2022 | Wisse et al. |
| 2022/0322603 A1 | 10/2022 | Inaba et al. |
| 2022/0322908 A1 | 10/2022 | Cha et al. |
| 2022/0324112 A1 | 10/2022 | Wolowelsky et al. |
| 2022/0326709 A1 | 10/2022 | Andriolo |
| 2022/0334244 A1 | 10/2022 | Li et al. |
| 2022/0342425 A1 | 10/2022 | Glimberg et al. |
| 2022/0354050 A1 | 11/2022 | Du et al. |
| 2022/0396969 A1 | 12/2022 | Arvidsson et al. |
| 2023/0008134 A1 | 1/2023 | Olofsson et al. |
| 2023/0008169 A1 | 1/2023 | Cuong et al. |
| 2023/0009964 A1 | 1/2023 | Jonsson et al. |
| 2023/0010420 A1 | 1/2023 | Glimberg et al. |
| 2023/0015812 A1 | 1/2023 | Wikestad et al. |
| 2023/0017821 A1 | 1/2023 | Ma et al. |
| 2023/0034100 A1 | 2/2023 | Holgersson et al. |
| 2023/0042864 A1 | 2/2023 | Danling et al. |
| 2023/0051150 A1 | 2/2023 | Pu et al. |
| 2023/0059610 A1 | 2/2023 | Mei et al. |
| 2023/0071262 A1 | 3/2023 | Lundkvist et al. |
| 2023/0074101 A1 | 3/2023 | Mårtensson et al. |
| 2023/0081732 A1 | 3/2023 | Abramson |
| 2023/0085538 A1 | 3/2023 | Lundkvist et al. |
| 2023/0092131 A1 | 3/2023 | Lao et al. |
| 2023/0117845 A1 | 4/2023 | Holgersson et al. |
| 2023/0119277 A1 | 4/2023 | Leijonberger |
| 2023/0138339 A1 | 5/2023 | Wikestad |
| 2023/0145580 A1 | 5/2023 | Hong et al. |
| 2023/0152817 A1 | 5/2023 | Huang et al. |
| 2023/0161357 A1 | 5/2023 | Liljedahl et al. |
| 2023/0176000 A1 | 6/2023 | Abbott et al. |
| 2023/0176225 A1 | 6/2023 | Mårtensson et al. |
| 2023/0185309 A1 | 6/2023 | Glimberg et al. |
| 2023/0189705 A1 | 6/2023 | Svensson et al. |

FOREIGN PATENT DOCUMENTS

| | | | |
|---|---|---|---|
| AU | 2011239328 A1 | 11/2011 |
| AU | 2012101338 A4 | 11/2012 |
| AU | 2014201952 A1 | 4/2014 |
| AU | 2015230722 A1 | 10/2015 |
| CA | 1079076 A | 6/1980 |
| CA | 1338206 C | 4/1996 |
| CN | 2382585 Y | 6/2000 |
| CN | 2693167 Y | 4/2005 |
| CN | 3512456 | 3/2006 |
| CN | 3599999 | 1/2007 |
| CN | 3626101 | 3/2007 |
| CN | 101185088 A | 5/2008 |
| CN | 300775531 | 5/2008 |
| CN | 201127182 Y | 10/2008 |
| CN | 101313319 A | 11/2008 |
| CN | 201226676 Y | 4/2009 |
| CN | 201226677 Y | 4/2009 |
| CN | 100485567 C | 5/2009 |
| CN | 100498602 C | 6/2009 |
| CN | 201260303 Y | 6/2009 |
| CN | 101516760 A | 8/2009 |
| CN | 101632335 A | 1/2010 |
| CN | 301144405 S | 2/2010 |
| CN | 301276003 S | 6/2010 |
| CN | 301290512 S | 7/2010 |
| CN | 201557392 U | 8/2010 |
| CN | 301328063 | 8/2010 |
| CN | 101292244 B | 12/2010 |
| CN | 301444971 | 1/2011 |
| CN | 101982037 A | 3/2011 |
| CN | 201797741 U | 4/2011 |
| CN | 301506267 | 4/2011 |
| CN | 201846616 U | 6/2011 |
| CN | 301573109 | 6/2011 |
| CN | 301611305 | 7/2011 |
| CN | 301653707 | 8/2011 |
| CN | 301660006 | 8/2011 |
| CN | 201998815 U | 10/2011 |
| CN | 301742022 | 11/2011 |
| CN | 202077380 U | 12/2011 |
| CN | 102523841 A | 7/2012 |
| CN | 302020661 | 8/2012 |
| CN | 102687620 A | 9/2012 |
| CN | 102687625 A | 9/2012 |
| CN | 302080704 | 9/2012 |
| CN | 102271246 A | 11/2012 |
| CN | 102771259 A | 11/2012 |
| CN | 302218376 | 12/2012 |
| CN | 102880175 A | 1/2013 |
| CN | 302299693 | 1/2013 |
| CN | 302350176 | 3/2013 |
| CN | 302456271 | 6/2013 |
| CN | 302483861 | 6/2013 |
| CN | 103294056 A | 9/2013 |
| CN | 103324191 A | 9/2013 |
| CN | 103324192 A | 9/2013 |
| CN | 203233683 U | 10/2013 |
| CN | 302629702 | 11/2013 |
| CN | 103473497 A | 12/2013 |
| CN | 302702748 | 1/2014 |
| CN | 103578164 A | 2/2014 |
| CN | 203423971 U | 2/2014 |
| CN | 103676947 A | 3/2014 |
| CN | 203575087 U | 5/2014 |
| CN | 103858584 A | 6/2014 |
| CN | 203691948 U | 7/2014 |
| CN | 203735069 U | 7/2014 |
| CN | 302881351 | 7/2014 |
| CN | 104007765 A | 8/2014 |
| CN | 104025796 A | 9/2014 |
| CN | 104041239 A | 9/2014 |
| CN | 203840762 U | 9/2014 |
| CN | 302943247 | 9/2014 |
| CN | 302943249 | 9/2014 |
| CN | 104094727 A | 10/2014 |
| CN | 104111460 A | 10/2014 |
| CN | 104111651 A | 10/2014 |
| CN | 104111652 A | 10/2014 |
| CN | 104111653 A | 10/2014 |
| CN | 203851480 U | 10/2014 |
| CN | 203851502 U | 10/2014 |
| CN | 302974154 | 10/2014 |
| CN | 104160830 A | 11/2014 |
| CN | 302993652 | 11/2014 |
| CN | 204014494 U | 12/2014 |
| CN | 204047176 U | 12/2014 |
| CN | 303058887 | 12/2014 |
| CN | 303075143 | 1/2015 |
| CN | 104360684 A | 2/2015 |
| CN | 204143255 U | 2/2015 |
| CN | 104571102 A | 4/2015 |
| CN | 104686050 A | 6/2015 |
| CN | 104704979 A | 6/2015 |
| CN | 104704980 A | 6/2015 |
| CN | 204362599 U | 6/2015 |
| CN | 303232131 | 6/2015 |
| CN | 104737699 A | 7/2015 |
| CN | 104750104 A | 7/2015 |
| CN | 104782314 A | 7/2015 |
| CN | 104793614 A | 7/2015 |
| CN | 104793617 A | 7/2015 |
| CN | 204443108 U | 7/2015 |
| CN | 204462853 U | 7/2015 |
| CN | 204495362 U | 7/2015 |
| CN | 204515530 U | 7/2015 |

(56)  References Cited

FOREIGN PATENT DOCUMENTS

| | | | |
|---|---|---|---|
| CN | 204518491 | U | 8/2015 |
| CN | 204539960 | U | 8/2015 |
| CN | 303318601 | | 8/2015 |
| CN | 104904403 | A | 9/2015 |
| CN | 104904404 | A | 9/2015 |
| CN | 204613789 | U | 9/2015 |
| CN | 204649212 | U | 9/2015 |
| CN | 303408640 | | 10/2015 |
| CN | 105082080 | A | 11/2015 |
| CN | 105096177 | A | 11/2015 |
| CN | 303452341 | | 11/2015 |
| CN | 303452355 | | 11/2015 |
| CN | 105163037 | A | 12/2015 |
| CN | 204810982 | U | 12/2015 |
| CN | 204858702 | U | 12/2015 |
| CN | 204925588 | U | 12/2015 |
| CN | 303478376 | | 12/2015 |
| CN | 303519781 | | 12/2015 |
| CN | 105230225 | A | 1/2016 |
| CN | 103621244 | B | 2/2016 |
| CN | 105353758 | A | 2/2016 |
| CN | 303579400 | | 2/2016 |
| CN | 105432212 | A | 3/2016 |
| CN | 105512689 | A | 4/2016 |
| CN | 303654613 | | 4/2016 |
| CN | 105557175 | A | 5/2016 |
| CN | 105573308 | A | 5/2016 |
| CN | 105573311 | A | 5/2016 |
| CN | 303670522 | | 5/2016 |
| CN | 105660039 | A | 6/2016 |
| CN | 105684630 | A | 6/2016 |
| CN | 105700521 | A | 6/2016 |
| CN | 205335882 | U | 6/2016 |
| CN | 205336853 | U | 6/2016 |
| CN | 303690781 | | 6/2016 |
| CN | 105759813 | A | 7/2016 |
| CN | 205431101 | U | 8/2016 |
| CN | 205454604 | U | 8/2016 |
| CN | 205489586 | U | 8/2016 |
| CN | 205510867 | U | 8/2016 |
| CN | 303778782 | | 8/2016 |
| CN | 303862286 | | 9/2016 |
| CN | 103283404 | B | 10/2016 |
| CN | 105988469 | A | 10/2016 |
| CN | 105988470 | A | 10/2016 |
| CN | 106020207 | A | 10/2016 |
| CN | 303888354 | | 10/2016 |
| CN | 303888360 | | 10/2016 |
| CN | 106142023 | A | 11/2016 |
| CN | 205694315 | U | 11/2016 |
| CN | 303933081 | | 11/2016 |
| CN | 103941600 | B | 12/2016 |
| CN | 106171248 | A | 12/2016 |
| CN | 205812811 | U | 12/2016 |
| CN | 205829192 | U | 12/2016 |
| CN | 205830138 | U | 12/2016 |
| CN | 303969591 | | 12/2016 |
| CN | 106258166 | A | 1/2017 |
| CN | 106325280 | A | 1/2017 |
| CN | 106355609 | A | 1/2017 |
| CN | 304004639 | | 1/2017 |
| CN | 106393094 | A | 2/2017 |
| CN | 106406301 | A | 2/2017 |
| CN | 304055132 | | 2/2017 |
| CN | 304055134 | | 2/2017 |
| CN | 304055136 | | 2/2017 |
| CN | 106489412 | A | 3/2017 |
| CN | 205993268 | U | 3/2017 |
| CN | 103576681 | B | 4/2017 |
| CN | 206115269 | U | 4/2017 |
| CN | 304095129 | | 4/2017 |
| CN | 106647727 | A | 5/2017 |
| CN | 106708033 | A | 5/2017 |
| CN | 206196372 | U | 5/2017 |
| CN | 304129527 | | 5/2017 |
| CN | 304129534 | | 5/2017 |
| CN | 106852225 | A | 6/2017 |
| CN | 106877420 | A | 6/2017 |
| CN | 206274765 | U | 6/2017 |
| CN | 206278169 | U | 6/2017 |
| CN | 304175254 | | 6/2017 |
| CN | 304208974 | | 7/2017 |
| CN | 107024910 | A | 8/2017 |
| CN | 107027431 | A | 8/2017 |
| CN | 304227934 | | 8/2017 |
| CN | 304241160 | | 8/2017 |
| CN | 206472500 | U | 9/2017 |
| CN | 304283754 | | 9/2017 |
| CN | 206547328 | U | 10/2017 |
| CN | 206547363 | U | 10/2017 |
| CN | 206611777 | U | 11/2017 |
| CN | 206611791 | U | 11/2017 |
| CN | 206611812 | U | 11/2017 |
| CN | 206619022 | U | 11/2017 |
| CN | 107463166 | A | 12/2017 |
| CN | 107463168 | A | 12/2017 |
| CN | 107505939 | A | 12/2017 |
| CN | 107515603 | A | 12/2017 |
| CN | 107516226 | A | 12/2017 |
| CN | 107517642 | A | 12/2017 |
| CN | 206686605 | U | 12/2017 |
| CN | 206808075 | U | 12/2017 |
| CN | 107544483 | A | 1/2018 |
| CN | 107600209 | A | 1/2018 |
| CN | 107624368 | A | 1/2018 |
| CN | 207037461 | U | 2/2018 |
| CN | 107800200 | A | 3/2018 |
| CN | 207075257 | U | 3/2018 |
| CN | 304529661 | | 3/2018 |
| CN | 304544247 | | 3/2018 |
| CN | 107888751 | A | 4/2018 |
| CN | 107913034 | A | 4/2018 |
| CN | 107960191 | A | 4/2018 |
| CN | 207201326 | U | 4/2018 |
| CN | 207269396 | U | 4/2018 |
| CN | 304565875 | | 4/2018 |
| CN | 108055906 | A | 5/2018 |
| CN | 108064539 | A | 5/2018 |
| CN | 108073179 | A | 5/2018 |
| CN | 108156957 | A | 6/2018 |
| CN | 108205313 | A | 6/2018 |
| CN | 207496811 | U | 6/2018 |
| CN | 108323326 | A | 7/2018 |
| CN | 108337987 | A | 7/2018 |
| CN | 108345297 | A | 7/2018 |
| CN | 108345298 | A | 7/2018 |
| CN | 207587788 | U | 7/2018 |
| CN | 207639110 | U | 7/2018 |
| CN | 207651536 | U | 7/2018 |
| CN | 207653023 | U | 7/2018 |
| CN | 207692389 | U | 8/2018 |
| CN | 304767946 | | 8/2018 |
| CN | 304794944 | | 8/2018 |
| CN | 207851614 | U | 9/2018 |
| CN | 304806495 | | 9/2018 |
| CN | 304811825 | | 9/2018 |
| CN | 108664014 | A | 10/2018 |
| CN | 108693873 | A | 10/2018 |
| CN | 207965652 | U | 10/2018 |
| CN | 108919814 | A | 11/2018 |
| CN | 208159284 | U | 11/2018 |
| CN | 108957512 | A | 12/2018 |
| CN | 109062225 | A | 12/2018 |
| CN | 109075284 | A | 12/2018 |
| CN | 208175354 | U | 12/2018 |
| CN | 208285831 | U | 12/2018 |
| CN | 304926953 | | 12/2018 |
| CN | 304926955 | | 12/2018 |
| CN | 109213123 | A | 1/2019 |
| CN | 208387297 | U | 1/2019 |
| CN | 304980236 | | 1/2019 |
| CN | 305010344 | | 1/2019 |
| CN | 305010365 | | 1/2019 |
| CN | 305017366 | | 1/2019 |

(56) References Cited

FOREIGN PATENT DOCUMENTS

| | | | |
|---|---|---|---|
| CN | 105875063 | B | 2/2019 |
| CN | 208480301 | U | 2/2019 |
| CN | 208521989 | U | 2/2019 |
| CN | 305027640 | | 2/2019 |
| CN | 109542092 | A | 3/2019 |
| CN | 208638993 | U | 3/2019 |
| CN | 109566065 | A | 4/2019 |
| CN | 109601114 | A | 4/2019 |
| CN | 109658937 | A | 4/2019 |
| CN | 109682368 | A | 4/2019 |
| CN | 109682371 | A | 4/2019 |
| CN | 109683604 | A | 4/2019 |
| CN | 109696888 | A | 4/2019 |
| CN | 208739598 | U | 4/2019 |
| CN | 208752461 | U | 4/2019 |
| CN | 109757189 | A | 5/2019 |
| CN | 106982585 | B | 6/2019 |
| CN | 109892096 | A | 6/2019 |
| CN | 209002355 | U | 6/2019 |
| CN | 209002393 | U | 6/2019 |
| CN | 305196413 | | 6/2019 |
| CN | 305225230 | | 6/2019 |
| CN | 305227797 | | 6/2019 |
| CN | 305227798 | | 6/2019 |
| CN | 305227800 | | 6/2019 |
| CN | 109960253 | A | 7/2019 |
| CN | 109962512 | A | 7/2019 |
| CN | 109983907 | A | 7/2019 |
| CN | 109983908 | A | 7/2019 |
| CN | 110018686 | A | 7/2019 |
| CN | 209170907 | U | 7/2019 |
| CN | 305261165 | | 7/2019 |
| CN | 305261166 | | 7/2019 |
| CN | 305265564 | | 7/2019 |
| CN | 110177456 | A | 8/2019 |
| CN | 209265268 | U | 8/2019 |
| CN | 209299766 | U | 8/2019 |
| CN | 106155056 | B | 9/2019 |
| CN | 110221594 | A | 9/2019 |
| CN | 110268858 | A | 9/2019 |
| CN | 209336712 | U | 9/2019 |
| CN | 209409782 | U | 9/2019 |
| CN | 305355791 | | 9/2019 |
| CN | 305357008 | | 9/2019 |
| CN | 110347144 | A | 10/2019 |
| CN | 110366368 | A | 10/2019 |
| CN | 305407445 | | 10/2019 |
| CN | 110447372 | A | 11/2019 |
| CN | 209676901 | U | 11/2019 |
| CN | 305447400 | | 11/2019 |
| CN | 305452583 | | 11/2019 |
| CN | 110584551 | A | 12/2019 |
| CN | 110622680 | A | 12/2019 |
| CN | 209710730 | U | 12/2019 |
| CN | 209861609 | U | 12/2019 |
| CN | 305503785 | | 12/2019 |
| CN | 305523640 | | 12/2019 |
| CN | 209955654 | U | 1/2020 |
| CN | 209964645 | U | 1/2020 |
| CN | 305574602 | | 1/2020 |
| CN | 110741810 | A | 2/2020 |
| CN | 110764495 | A | 2/2020 |
| CN | 110850858 | A | 2/2020 |
| CN | 110850860 | A | 2/2020 |
| CN | 110852133 | A | 2/2020 |
| CN | 210016305 | U | 2/2020 |
| CN | 210074814 | U | 2/2020 |
| CN | 210116329 | U | 2/2020 |
| CN | 305596393 | | 2/2020 |
| CN | 105988472 | B | 3/2020 |
| CN | 107493797 | B | 3/2020 |
| CN | 110881903 | A | 3/2020 |
| CN | 110895411 | A | 3/2020 |
| CN | 110915409 | A | 3/2020 |
| CN | 110928280 | A | 3/2020 |
| CN | 110928285 | A | 3/2020 |
| CN | 107643751 | B | 4/2020 |
| CN | 111034450 | A | 4/2020 |
| CN | 111045423 | A | 4/2020 |
| CN | 305716236 | | 4/2020 |
| CN | 107643750 | B | 5/2020 |
| CN | 108142070 | B | 5/2020 |
| CN | 111123910 | A | 5/2020 |
| CN | 111165158 | A | 5/2020 |
| CN | 210444878 | U | 5/2020 |
| CN | 210580043 | U | 5/2020 |
| CN | 305750432 | | 5/2020 |
| CN | 305757781 | | 5/2020 |
| CN | 305789888 | | 5/2020 |
| CN | 111226569 | A | 6/2020 |
| CN | 111296044 | A | 6/2020 |
| CN | 210782124 | U | 6/2020 |
| CN | 210808273 | U | 6/2020 |
| CN | 210821640 | U | 6/2020 |
| CN | 210839520 | U | 6/2020 |
| CN | 305827495 | | 6/2020 |
| CN | 305827496 | | 6/2020 |
| CN | 305827503 | | 6/2020 |
| CN | 305860595 | | 6/2020 |
| CN | 305860598 | | 6/2020 |
| CN | 305869411 | | 6/2020 |
| CN | 106717462 | B | 7/2020 |
| CN | 108811699 | B | 7/2020 |
| CN | 210900401 | U | 7/2020 |
| CN | 210987056 | U | 7/2020 |
| CN | 211015146 | U | 7/2020 |
| CN | 305946746 | | 7/2020 |
| CN | 305946760 | | 7/2020 |
| CN | 111487982 | A | 8/2020 |
| CN | 111492783 | A | 8/2020 |
| CN | 111512766 | A | 8/2020 |
| CN | 111543167 | A | 8/2020 |
| CN | 211212948 | U | 8/2020 |
| CN | 211353152 | U | 8/2020 |
| CN | 305989577 | | 8/2020 |
| CN | 306019404 | | 8/2020 |
| CN | 105988471 | B | 9/2020 |
| CN | 111685651 | A | 9/2020 |
| CN | 211531846 | U | 9/2020 |
| CN | 211580673 | U | 9/2020 |
| CN | 107637255 | B | 10/2020 |
| CN | 110754204 | B | 10/2020 |
| CN | 111742692 | A | 10/2020 |
| CN | 111766589 | A | 10/2020 |
| CN | 111819988 | A | 10/2020 |
| CN | 211671358 | U | 10/2020 |
| CN | 211671381 | U | 10/2020 |
| CN | 211721118 | U | 10/2020 |
| CN | 211721119 | U | 10/2020 |
| CN | 211741921 | U | 10/2020 |
| CN | 211741924 | U | 10/2020 |
| CN | 211793024 | U | 10/2020 |
| CN | 306085189 | | 10/2020 |
| CN | 306128197 | | 10/2020 |
| CN | 306140210 | | 10/2020 |
| CN | 306174630 | S | 11/2020 |
| CN | 112009175 | A | 12/2020 |
| CN | 112119742 | A | 12/2020 |
| CN | 112120620 | A | 12/2020 |
| CN | 112134314 | A | 12/2020 |
| CN | 112147992 | A | 12/2020 |
| CN | 212034862 | U | 12/2020 |
| CN | 212034865 | U | 12/2020 |
| CN | 212034879 | U | 12/2020 |
| CN | 212034881 | U | 12/2020 |
| CN | 212046920 | U | 12/2020 |
| CN | 212061111 | U | 12/2020 |
| CN | 212116218 | U | 12/2020 |
| CN | 212116223 | U | 12/2020 |
| CN | 306223128 | | 12/2020 |
| CN | 306236075 | | 12/2020 |
| CN | 306236808 | | 12/2020 |
| CN | 112230636 | A | 1/2021 |
| CN | 112230637 | A | 1/2021 |

(56) References Cited

FOREIGN PATENT DOCUMENTS

| | | | |
|---|---|---|---|
| CN | 112230644 | A | 1/2021 |
| CN | 112235760 | A | 1/2021 |
| CN | 112259866 | A | 1/2021 |
| CN | 112261631 | A | 1/2021 |
| CN | 212290131 | U | 1/2021 |
| CN | 212304892 | U | 1/2021 |
| CN | 212305863 | U | 1/2021 |
| CN | 212324777 | U | 1/2021 |
| CN | 212367908 | U | 1/2021 |
| CN | 212367916 | U | 1/2021 |
| CN | 306278588 | S | 1/2021 |
| CN | 306303188 | S | 1/2021 |
| CN | 106909140 | B | 2/2021 |
| CN | 109247117 | B | 2/2021 |
| CN | 109683556 | B | 2/2021 |
| CN | 112306049 | A | 2/2021 |
| CN | 112385401 | A | 2/2021 |
| CN | 112400453 | A | 2/2021 |
| CN | 212499740 | U | 2/2021 |
| CN | 212515710 | U | 2/2021 |
| CN | 212520009 | U | 2/2021 |
| CN | 212539202 | U | 2/2021 |
| CN | 212572469 | U | 2/2021 |
| CN | 212573554 | U | 2/2021 |
| CN | 212621511 | U | 2/2021 |
| CN | 306328112 | S | 2/2021 |
| CN | 112435422 | A | 3/2021 |
| CN | 112438114 | A | 3/2021 |
| CN | 112445221 | A | 3/2021 |
| CN | 112449842 | A | 3/2021 |
| CN | 112449846 | A | 3/2021 |
| CN | 112449864 | A | 3/2021 |
| CN | 112492956 | A | 3/2021 |
| CN | 112514637 | A | 3/2021 |
| CN | 112544239 | A | 3/2021 |
| CN | 112567959 | A | 3/2021 |
| CN | 112567961 | A | 3/2021 |
| CN | 212637167 | U | 3/2021 |
| CN | 212696647 | U | 3/2021 |
| CN | 212696648 | U | 3/2021 |
| CN | 212696668 | U | 3/2021 |
| CN | 306358736 | S | 3/2021 |
| CN | 112602441 | A | 4/2021 |
| CN | 112706602 | A | 4/2021 |
| CN | 112720451 | A | 4/2021 |
| CN | 112731935 | A | 4/2021 |
| CN | 212876733 | U | 4/2021 |
| CN | 212906002 | U | 4/2021 |
| CN | 212933333 | U | 4/2021 |
| CN | 212936733 | U | 4/2021 |
| CN | 212970834 | U | 4/2021 |
| CN | 213075541 | U | 4/2021 |
| CN | 213091901 | U | 4/2021 |
| CN | 112740889 | A | 5/2021 |
| CN | 112740892 | A | 5/2021 |
| CN | 112740893 | A | 5/2021 |
| CN | 112764419 | A | 5/2021 |
| CN | 112769424 | A | 5/2021 |
| CN | 112773264 | A | 5/2021 |
| CN | 112799395 | A | 5/2021 |
| CN | 112799399 | A | 5/2021 |
| CN | 112823584 | A | 5/2021 |
| CN | 112824993 | A | 5/2021 |
| CN | 112826376 | A | 5/2021 |
| CN | 112838656 | A | 5/2021 |
| CN | 112840828 | A | 5/2021 |
| CN | 112859828 | A | 5/2021 |
| CN | 213187216 | U | 5/2021 |
| CN | 213210764 | U | 5/2021 |
| CN | 213214364 | U | 5/2021 |
| CN | 213240579 | U | 5/2021 |
| CN | 306569555 | S | 5/2021 |
| CN | 306569560 | S | 5/2021 |
| CN | 107976995 | B | 6/2021 |
| CN | 110122045 | B | 6/2021 |
| CN | 112947399 | A | 6/2021 |
| CN | 112970414 | A | 6/2021 |
| CN | 113039919 | A | 6/2021 |
| CN | 213306269 | U | 6/2021 |
| CN | 113064419 | A | 7/2021 |
| CN | 113115624 | A | 7/2021 |
| CN | 113115625 | A | 7/2021 |
| CN | 113115626 | A | 7/2021 |
| CN | 113156928 | A | 7/2021 |
| CN | 113156929 | A | 7/2021 |
| CN | 213814000 | U | 7/2021 |
| CN | 306670241 | S | 7/2021 |
| CN | 306680105 | S | 7/2021 |
| CN | 306694791 | S | 7/2021 |
| CN | 106300578 | B | 8/2021 |
| CN | 108781704 | B | 8/2021 |
| CN | 113243190 | A | 8/2021 |
| CN | 113311830 | A | 8/2021 |
| CN | 213850492 | U | 8/2021 |
| CN | 213921292 | U | 8/2021 |
| CN | 306745285 | S | 8/2021 |
| CN | 306753239 | S | 8/2021 |
| CN | 306768440 | S | 8/2021 |
| CN | 113366964 | A | 9/2021 |
| CN | 113439526 | A | 9/2021 |
| CN | 113448259 | A | 9/2021 |
| CN | 214126036 | U | 9/2021 |
| CN | 214151499 | U | 9/2021 |
| CN | 214178073 | U | 9/2021 |
| CN | 214228929 | U | 9/2021 |
| CN | 214240309 | U | 9/2021 |
| CN | 306824139 | | 9/2021 |
| CN | 306839148 | | 9/2021 |
| CN | 306846782 | | 9/2021 |
| CN | 113455167 | A | 10/2021 |
| CN | 113552873 | A | 10/2021 |
| CN | 113552874 | A | 10/2021 |
| CN | 214508006 | U | 10/2021 |
| CN | 306880401 | | 10/2021 |
| CN | 113721749 | A | 11/2021 |
| CN | 214852822 | U | 11/2021 |
| CN | 113759377 | A | 12/2021 |
| CN | 113759886 | A | 12/2021 |
| CN | 113771556 | A | 12/2021 |
| CN | 113778084 | A | 12/2021 |
| CN | 113805573 | A | 12/2021 |
| CN | 113812251 | A | 12/2021 |
| CN | 215011658 | U | 12/2021 |
| CN | 215041875 | U | 12/2021 |
| CN | 215073955 | U | 12/2021 |
| CN | 215122126 | U | 12/2021 |
| CN | 215223139 | U | 12/2021 |
| CN | 215223140 | U | 12/2021 |
| CN | 215244172 | U | 12/2021 |
| CN | 215269503 | U | 12/2021 |
| CN | 215321765 | U | 12/2021 |
| CN | 307035324 | | 12/2021 |
| CN | 113892332 | A | 1/2022 |
| CN | 113970918 | A | 1/2022 |
| CN | 307047963 | | 1/2022 |
| CN | 307047966 | | 1/2022 |
| CN | 114089423 | A | 2/2022 |
| CN | 215774282 | U | 2/2022 |
| CN | 215813854 | U | 2/2022 |
| CN | 215911524 | U | 2/2022 |
| CN | 307125064 | | 2/2022 |
| CN | 114097400 | A | 3/2022 |
| CN | 307168522 | | 3/2022 |
| CN | 307168531 | | 3/2022 |
| CN | 307168534 | | 3/2022 |
| CN | 307168536 | | 3/2022 |
| CN | 307202311 | | 3/2022 |
| CN | 216153511 | U | 4/2022 |
| CN | 216253986 | U | 4/2022 |
| CN | 307222105 | | 4/2022 |
| CN | 307243485 | | 4/2022 |
| CN | 307265564 | | 4/2022 |
| CN | 307265565 | | 4/2022 |
| CN | 307278021 | | 4/2022 |

(56) References Cited

FOREIGN PATENT DOCUMENTS

| | | | |
|---|---|---|---|
| CN | 307278029 | | 4/2022 |
| CN | 307301254 | | 4/2022 |
| CN | 216507708 U | | 5/2022 |
| CN | 216610752 U | | 5/2022 |
| CN | 307325242 | | 5/2022 |
| CN | 307337031 | | 5/2022 |
| CN | 307347754 | | 5/2022 |
| CN | 307347757 | | 5/2022 |
| CN | 307369096 | | 5/2022 |
| CN | 307369129 | | 5/2022 |
| CN | 307376792 | | 5/2022 |
| CN | 115666221 A | | 1/2023 |
| DE | 7345220 U | | 6/1974 |
| DE | 7345211 U | | 11/1974 |
| DE | 2437756 A1 | | 3/1975 |
| DE | 2448130 A1 | | 4/1976 |
| DE | 7609000 U1 | | 9/1977 |
| DE | 2612381 A1 | | 10/1977 |
| DE | 3929388 A1 | | 3/1991 |
| DE | 19521067 A1 | | 12/1996 |
| DE | 19644057 A1 | | 5/1998 |
| DE | 29823263 U1 | | 4/1999 |
| DE | 19933340 A1 | | 1/2001 |
| DE | 20308046 U1 | | 7/2003 |
| DE | 10302908 A1 | | 8/2004 |
| DE | 102006038553 A1 | | 2/2008 |
| DE | 102007053310 A1 | | 6/2009 |
| DE | 102007060056 A1 | | 6/2009 |
| DE | 102008011947 A1 | | 9/2009 |
| DE | 202010007832 U1 | | 8/2010 |
| DE | 402010004757-0001 | | 11/2010 |
| DE | 102009027557 A1 | | 1/2011 |
| DE | 202012011298 U1 | | 1/2013 |
| DE | 202012009375 U1 | | 4/2013 |
| DE | 102013202075 A1 | | 8/2014 |
| DE | 102013203549 A1 | | 9/2014 |
| DE | 102013203705 A1 | | 9/2014 |
| DE | 202014005547 U1 | | 9/2014 |
| DE | 202014102390 U1 | | 9/2014 |
| DE | 102014211712 A1 | | 2/2015 |
| DE | 102014112587 A1 | | 3/2015 |
| DE | 102014208434 A1 | | 11/2015 |
| DE | 102014210277 A1 | | 12/2015 |
| DE | 102014212399 A1 | | 12/2015 |
| DE | 102016205336 A1 | | 10/2017 |
| DE | 102016219270 A1 | | 4/2018 |
| DE | 102016222659 A1 | | 5/2018 |
| DE | 202018100833 U1 | | 5/2018 |
| DE | 202018100835 U1 | | 5/2018 |
| DE | 202018100836 U1 | | 5/2018 |
| DE | 202018000417 U1 * | 6/2018 | ............ A01D 34/66 |
| DE | 102017204865 A1 | | 9/2018 |
| DE | 102018206803 A1 | | 11/2019 |
| DE | 202015009764 U1 | | 1/2020 |
| DE | 102019206856 A1 | | 11/2020 |
| DE | 102019214995 A1 | | 4/2021 |
| DE | 102019215913 A1 | | 4/2021 |
| DE | 102021100122 A1 | | 7/2021 |
| DE | 102020202740 A1 | | 9/2021 |
| EP | 0072572 B1 | | 2/1983 |
| EP | 0628976 A1 | | 12/1994 |
| EP | 1364571 A2 | | 11/2003 |
| EP | 1460182 B1 | | 9/2004 |
| EP | 1709859 A1 | | 10/2006 |
| EP | 1779718 A3 | | 5/2007 |
| EP | 2006708 A1 | | 12/2008 |
| EP | 2026161 A1 | | 2/2009 |
| EP | 2110295 A2 | | 10/2009 |
| EP | 2163352 A2 | | 3/2010 |
| EP | 2248409 A1 | | 11/2010 |
| EP | 2269433 A1 | | 1/2011 |
| EP | 2286653 A2 | | 2/2011 |
| EP | 2296072 A2 | | 3/2011 |
| EP | 2385755 B1 | | 11/2011 |
| EP | 2425700 A2 | | 3/2012 |
| EP | 2586283 A1 | | 5/2013 |
| EP | 2687077 A2 | | 1/2014 |
| EP | 2693072 A1 | | 2/2014 |
| EP | 2798937 A1 | | 11/2014 |
| EP | 2805598 A1 | | 11/2014 |
| EP | 2823936 A2 | | 1/2015 |
| EP | 2851760 A1 | | 3/2015 |
| EP | 2875712 A1 | | 5/2015 |
| EP | 2717110 B1 | | 8/2015 |
| EP | 2959764 A1 | | 12/2015 |
| EP | 2960741 A2 | | 12/2015 |
| EP | 2960742 A1 | | 12/2015 |
| EP | 2783561 B1 | | 3/2016 |
| EP | 2692220 B1 | | 4/2016 |
| EP | 3047719 A1 | | 7/2016 |
| EP | 2875712 B1 | | 10/2016 |
| EP | 3076457 A1 | | 10/2016 |
| EP | 3118016 A1 | | 1/2017 |
| EP | 3165075 A1 | | 5/2017 |
| EP | 3167699 A1 | | 5/2017 |
| EP | 3167700 A1 | | 5/2017 |
| EP | 3222132 A2 | | 9/2017 |
| EP | 2883437 B1 | | 3/2018 |
| EP | 3316067 A1 | | 5/2018 |
| EP | 2743789 B1 | | 6/2018 |
| EP | 3330824 A1 | | 6/2018 |
| EP | 1985487 B1 | | 8/2018 |
| EP | 3366102 A1 | | 8/2018 |
| EP | 3381258 A1 | | 10/2018 |
| EP | 3325305 B1 | | 1/2019 |
| EP | 3427994 A1 | | 1/2019 |
| EP | 3479682 A1 | | 5/2019 |
| EP | 2960100 B1 | | 8/2019 |
| EP | 3520593 A1 | | 8/2019 |
| EP | 3528213 A1 | | 8/2019 |
| EP | 3534183 A1 | | 9/2019 |
| EP | 3545750 A4 | | 12/2019 |
| EP | 3584108 A1 | | 12/2019 |
| EP | 3597090 A1 | | 1/2020 |
| EP | 3497776 A4 | | 2/2020 |
| EP | 3660618 A1 | | 6/2020 |
| EP | 3708399 A1 | | 9/2020 |
| EP | 3725146 A1 | | 10/2020 |
| EP | 3739658 A1 | | 11/2020 |
| EP | 3542614 B1 | | 12/2020 |
| EP | 3753387 A1 | | 12/2020 |
| EP | 3760021 A1 | | 1/2021 |
| EP | 3542612 B1 | | 2/2021 |
| EP | 3791708 A1 | | 3/2021 |
| EP | 3831544 A1 | | 6/2021 |
| EP | 3837944 A1 | | 6/2021 |
| EP | 3837945 A1 | | 6/2021 |
| EP | 3837946 A1 | | 6/2021 |
| EP | 3861911 A2 | | 8/2021 |
| ES | 199267 U | | 7/1975 |
| ES | 451339 A1 | | 12/1977 |
| FR | 2641755 A1 | | 7/1990 |
| FR | 2666955 A1 | | 3/1992 |
| FR | 2728136 A1 | | 6/1996 |
| FR | 2771141 A1 | | 5/1999 |
| FR | 2890525 A1 | | 3/2007 |
| FR | 3114537 A1 | | 4/2022 |
| GB | 1128265 A | | 9/1968 |
| GB | 1288108 A | | 9/1972 |
| GB | 1371959 A | | 10/1974 |
| GB | 1451896 A | | 10/1976 |
| GB | 1452308 A | | 10/1976 |
| GB | 1489373 A | | 10/1977 |
| GB | 1526519 A | | 9/1978 |
| GB | 1557379 A | | 12/1979 |
| GB | 2287170 A | | 9/1995 |
| GB | 2295304 A | | 5/1996 |
| GB | 2305840 A | | 4/1997 |
| GB | 2308049 B | | 6/1997 |
| GB | 2419430 A | | 4/2006 |
| GB | 232922 A | | 6/2007 |
| GB | 2433791 A | | 7/2007 |
| GB | 90017056580001 | | 5/2010 |
| GB | 2500168 A | | 9/2013 |

(56)                References Cited

FOREIGN PATENT DOCUMENTS

| | | | |
|---|---|---|---|
| GB | 90024715400001 | | 8/2014 |
| GB | 2513960 | A | 11/2014 |
| GB | 2515556 | A | 12/2014 |
| GB | 2516370 | A | 1/2015 |
| GB | 90027012680001 | | 5/2015 |
| GB | 90027378900001 | | 10/2015 |
| GB | 90041329260001 | | 9/2017 |
| GB | 90029638920001 | | 3/2018 |
| GB | 90056318840001 | | 9/2018 |
| GB | 2563347 | A | 12/2018 |
| GB | 90040756950001 | | 6/2019 |
| GB | 90073918420006 | | 1/2020 |
| GB | 90080413210001 | | 8/2020 |
| GB | 2581956 | A | 9/2020 |
| GB | 90081876860001 | | 10/2020 |
| GB | 6195686 | | 5/2022 |
| JP | H11282560 | A | 10/1999 |
| JP | 3028482 | B1 | 6/2000 |
| JP | 2006/251883 | A | 9/2006 |
| JP | 2006/268497 | A | 10/2006 |
| JP | 2008239030 | A | 10/2008 |
| JP | 2011/020615 | A | 2/2011 |
| JP | 2011155925 | | 8/2011 |
| JP | 2015/149963 | A | 8/2015 |
| JP | 2020001436 | A | 1/2020 |
| KR | 2013/0044130 | A | 5/2013 |
| KR | 2015/0125305 | A | 11/2015 |
| SE | 538774 | C2 | 11/2016 |
| SE | 540834 | C2 | 11/2018 |
| SE | 542098 | C2 | 2/2020 |
| SE | 543019 | C2 | 9/2020 |
| SE | 543247 | C2 | 10/2020 |
| SE | 2150377 | A1 | 3/2021 |
| SE | 1951390 | A1 | 6/2021 |
| SE | 2150080 | A1 | 6/2021 |
| SE | 2050216 | A1 | 8/2021 |
| SE | 543941 | C2 | 9/2021 |
| SE | 543943 | C2 | 9/2021 |
| SE | 2150193 | A1 | 10/2021 |
| SE | 2150394 | A1 | 10/2021 |
| TW | 201324105 | A | 6/2013 |
| TW | 201324105 | A1 | 6/2013 |
| WO | WO91/06435 | A1 | 5/1991 |
| WO | WO97/49528 | A1 | 12/1997 |
| WO | WO00/60921 | A1 | 10/2000 |
| WO | WO00/74466 | A1 | 12/2000 |
| WO | WO03/040846 | A1 | 5/2003 |
| WO | WO03/103375 | A1 | 12/2003 |
| WO | WO2005/002320 | A1 | 1/2005 |
| WO | WO2006/094887 | A2 | 9/2006 |
| WO | WO2006/094889 | A1 | 9/2006 |
| WO | WO2006/102740 | A1 | 10/2006 |
| WO | WO2007/091967 | A1 | 8/2007 |
| WO | WO2007/140930 | A1 | 12/2007 |
| WO | WO2008/015479 | A2 | 2/2008 |
| WO | WO2008/060689 | A2 | 5/2008 |
| WO | WO2008/068494 | A1 | 6/2008 |
| WO | WO2008/095715 | A2 | 8/2008 |
| WO | WO2008/144135 | A1 | 11/2008 |
| WO | WO2009/036644 | A1 | 3/2009 |
| WO | WO2009/071379 | A1 | 6/2009 |
| WO | WO2009/077239 | A1 | 6/2009 |
| WO | WO2009/083319 | A1 | 7/2009 |
| WO | WO2010/077198 | A1 | 7/2010 |
| WO | WO2010079301 | A1 | 7/2010 |
| WO | WO2010/130479 | A2 | 11/2010 |
| WO | WO2011/115536 | A1 | 9/2011 |
| WO | WO2012/047176 | A1 | 4/2012 |
| WO | WO2013/010475 | A1 | 1/2013 |
| WO | WO2013/011252 | A1 | 1/2013 |
| WO | WO2013/025135 | A1 | 2/2013 |
| WO | WO2013/064301 | A1 | 5/2013 |
| WO | WO2013/081516 | A1 | 6/2013 |
| WO | WO2013/083311 | A1 | 6/2013 |
| WO | WO2013/102417 | A1 | 7/2013 |
| WO | WO2013/107266 | A1 | 7/2013 |
| WO | WO2013/107374 | A1 | 7/2013 |
| WO | WO2013/125992 | A1 | 8/2013 |
| WO | WO2013/185622 | A1 | 12/2013 |
| WO | WO2014/007694 | A1 | 1/2014 |
| WO | WO2014/056443 | A1 | 4/2014 |
| WO | WO2014/071860 | A1 | 5/2014 |
| WO | WO2014/079363 | A1 | 5/2014 |
| WO | WO2014/079632 | A1 | 5/2014 |
| WO | WO2014/086267 | A1 | 6/2014 |
| WO | WO2014/173290 | A1 | 10/2014 |
| WO | WO2015/010277 | A1 | 1/2015 |
| WO | WO2015/053488 | A1 | 4/2015 |
| WO | WO2015/144998 | A1 | 10/2015 |
| WO | WO2015/154822 | A1 | 10/2015 |
| WO | WO2015/161829 | A1 | 10/2015 |
| WO | WO2015/169343 | A1 | 11/2015 |
| WO | WO2015/172831 | A1 | 11/2015 |
| WO | WO2015/182514 | A1 | 12/2015 |
| WO | WO2015/192903 | A1 | 12/2015 |
| WO | WO2016/038512 | A1 | 3/2016 |
| WO | WO2016/097891 | A1 | 6/2016 |
| WO | WO2016/097892 | A1 | 6/2016 |
| WO | WO2016/097897 | A1 | 6/2016 |
| WO | WO2016/103070 | A1 | 6/2016 |
| WO | WO2016/108104 | A1 | 7/2016 |
| WO | WO2016/109721 | A1 | 7/2016 |
| WO | WO2016/119751 | A1 | 8/2016 |
| WO | WO2016/127923 | A1 | 8/2016 |
| WO | WO2016/131399 | A1 | 8/2016 |
| WO | WO2016/184398 | A1 | 11/2016 |
| WO | WO2017/101882 | A1 | 6/2017 |
| WO | WO2017/123137 | A1 | 7/2017 |
| WO | WO2017/129551 | A1 | 8/2017 |
| WO | WO2017/133625 | A1 | 8/2017 |
| WO | WO2017/148438 | A1 | 9/2017 |
| WO | WO2017/167207 | A1 | 10/2017 |
| WO | WO2017/181995 | A1 | 10/2017 |
| WO | WO2017/186372 | A1 | 11/2017 |
| WO | WO2017/190784 | A1 | 11/2017 |
| WO | WO2017/198222 | A1 | 11/2017 |
| WO | WO2017/206950 | A1 | 12/2017 |
| WO | WO2017/211308 | A1 | 12/2017 |
| WO | WO2018/001340 | A1 | 1/2018 |
| WO | WO2018/010650 | A1 | 1/2018 |
| WO | WO2018/028624 | A1 | 2/2018 |
| WO | WO2018/057250 | A1 | 3/2018 |
| WO | WO2018/057452 | A2 | 3/2018 |
| WO | WO2018/057589 | A1 | 3/2018 |
| WO | WO2018/059323 | A1 | 4/2018 |
| WO | WO2018/103178 | A1 | 6/2018 |
| WO | WO2018/117190 | A1 | 6/2018 |
| WO | WO2018/125222 | A1 | 7/2018 |
| WO | WO2018/127209 | A1 | 7/2018 |
| WO | WO2018/146518 | A1 | 8/2018 |
| WO | WO2018/153599 | A1 | 8/2018 |
| WO | WO2018/174777 | A1 | 9/2018 |
| WO | WO2018/185376 | A1 | 10/2018 |
| WO | WO2018/199829 | A1 | 11/2018 |
| WO | WO2019/034382 | A1 | 2/2019 |
| WO | WO2019/063012 | A1 | 4/2019 |
| WO | WO2019/080935 | A1 | 5/2019 |
| WO | WO2019/096052 | A1 | 5/2019 |
| WO | WO2019/096463 | A1 | 5/2019 |
| WO | WO2019/109982 | A1 | 6/2019 |
| WO | WO2019/110013 | A1 | 6/2019 |
| WO | WO2019/144916 | A1 | 8/2019 |
| WO | WO2019/157841 | A1 | 8/2019 |
| WO | WO2019/158090 | A1 | 8/2019 |
| WO | WO2019/158452 | A1 | 8/2019 |
| WO | WO2019/168069 | A1 | 9/2019 |
| WO | WO2019/170142 | A1 | 9/2019 |
| WO | WO2019/206274 | A1 | 10/2019 |
| WO | WO2019/238099 | A1 | 12/2019 |
| WO | WO2020/020652 | A1 | 1/2020 |
| WO | WO2020/063811 | A1 | 4/2020 |
| WO | WO2020/064087 | A1 | 4/2020 |
| WO | WO2020077176 | A1 | 4/2020 |
| WO | WO2020/093970 | A1 | 5/2020 |

(56)　　　　　References Cited

FOREIGN PATENT DOCUMENTS

| WO | WO2020/093992 A1 | 5/2020 |
|----|------------------|--------|
| WO | WO2020/098666 A1 | 5/2020 |
| WO | WO2020/098670 A1 | 5/2020 |
| WO | WO2020/103696 A1 | 5/2020 |
| WO | WO2020/104242 A1 | 5/2020 |
| WO | WO2020/107007 A1 | 5/2020 |
| WO | WO2020/107772 A1 | 6/2020 |
| WO | WO2020/108267 A1 | 6/2020 |
| WO | WO2020/108550 A1 | 6/2020 |
| WO | WO2020/114415 A1 | 6/2020 |
| WO | WO2020/125450 A1 | 6/2020 |
| WO | WO2020110247 A1 | 6/2020 |
| WO | WO2020/134667 A1 | 7/2020 |
| WO | WO2020/148138 A1 | 7/2020 |
| WO | WO2020147841 A1 | 7/2020 |
| WO | WO2020/155853 A1 | 8/2020 |
| WO | WO2020/156519 A1 | 8/2020 |
| WO | WO2020/156684 A1 | 8/2020 |
| WO | WO2020/156851 A1 | 8/2020 |
| WO | WO2020/161021 A1 | 8/2020 |
| WO | WO2020/170933 A1 | 8/2020 |
| WO | WO2020174046 A1 | 9/2020 |
| WO | WO2020/193513 A1 | 10/2020 |
| WO | WO2020/199055 A1 | 10/2020 |
| WO | WO2020/218960 A1 | 10/2020 |
| WO | WO2020/256619 A1 | 12/2020 |
| WO | WO2020/259586 A1 | 12/2020 |
| WO | WO2020253003 A1 | 12/2020 |
| WO | WO2020253821 A1 | 12/2020 |
| WO | WODM/212022 | 12/2020 |
| WO | WO2021/013173 A1 | 1/2021 |
| WO | WO2021000947 A1 | 1/2021 |
| WO | WO2021/023227 A1 | 2/2021 |
| WO | WO2021/031418 A1 | 2/2021 |
| WO | WO2021/031423 A1 | 2/2021 |
| WO | WO2021/031451 A1 | 2/2021 |
| WO | WO2021/036033 A1 | 3/2021 |
| WO | WO2021/036077 A1 | 3/2021 |
| WO | WO2021/047063 A1 | 3/2021 |
| WO | WO2021/047068 A1 | 3/2021 |
| WO | WO2021/047602 A1 | 3/2021 |
| WO | WO2021047195 A1 | 3/2021 |
| WO | WO2021047196 A1 | 3/2021 |
| WO | WO2021/068370 A1 | 4/2021 |
| WO | WO2021/068928 A1 | 4/2021 |
| WO | WO2021/078220 A1 | 4/2021 |
| WO | WO2021071652 A1 | 4/2021 |
| WO | WO2021071655 A1 | 4/2021 |
| WO | WO2021079176 A1 | 4/2021 |
| WO | WO2021/082817 A1 | 5/2021 |
| WO | WO2021/088551 A1 | 5/2021 |
| WO | WO2021/088553 A1 | 5/2021 |
| WO | WO2021/088558 A1 | 5/2021 |
| WO | WO2021/093474 A1 | 5/2021 |
| WO | WO2021/093526 A1 | 5/2021 |
| WO | WO2021/093851 A1 | 5/2021 |
| WO | WO2021/098382 A1 | 5/2021 |
| WO | WO2021/103803 A1 | 6/2021 |
| WO | WO2021/103804 A1 | 6/2021 |
| WO | WO2021/110414 A1 | 6/2021 |
| WO | WO2021/114988 A1 | 6/2021 |
| WO | WO2021/115364 A1 | 6/2021 |
| WO | WO2021/136234 A1 | 7/2021 |
| WO | WO2021/139389 A1 | 7/2021 |
| WO | WO2021/139683 A1 | 7/2021 |
| WO | WO2021/139685 A1 | 7/2021 |
| WO | WO2021/139809 A1 | 7/2021 |
| WO | WO2021/147494 A1 | 7/2021 |
| WO | WO2021/147792 A1 | 7/2021 |
| WO | WO2021134826 A1 | 7/2021 |
| WO | WO2021/164738 A1 | 8/2021 |
| WO | WO2021/175331 A1 | 9/2021 |
| WO | WO2021/180123 A1 | 9/2021 |
| WO | WO2021/190627 A1 | 9/2021 |
| WO | WO2021190612 A1 | 9/2021 |
| WO | WO2021/208308 A1 | 10/2021 |
| WO | WO2021/215980 A1 | 10/2021 |
| WO | WODM/217452 | 10/2021 |
| WO | WO2021/225494 A1 | 11/2021 |
| WO | WO2021/230791 A1 | 11/2021 |
| WO | WO2021/233205 A1 | 11/2021 |
| WO | WO2022/042362 A1 | 3/2022 |

OTHER PUBLICATIONS

US 8,275,482 B2, 09/2012, Casey et al. (withdrawn)
US 10,675,758 B2, 06/2020, Cohen et al. (withdrawn)
US 10,798,874 B2, 10/2020, Balutis et al. (withdrawn)
US 10,952,370 B2, 03/2021, Sebastian et al. (withdrawn)
Translation of DE-202018000417-U1.*
European Search Report Corresponding with Patent Application No. EP22161447 on Jul. 14, 2022 (1 page).
European Search Report Corresponding with Patent Application No. EP22161440 on Jul. 14, 2022 (1 page).
European Search Report Corresponding with Patent Application No. EP22161444 on Jul. 13, 2022 (1 page).
European Search Report Corresponding with Patent Application No. EP22161445 on Jul. 13, 2022 (1 page).
European Search Report Corresponding with Application No. EP23161704 on Jul. 19, 2023 (1 page).
Chinese Office Action Corresponding with Application No. 202210263784.1 on Mar. 30, 2023 (2 pages).
Chinese Office Action Corresponding with Application No. 202210240058.8 on Apr. 15, 2023 (1 page).
Chinese Office Action Corresponding with Application No. 202210239760.2 on May 8, 2023 (1 page).
Canadian Office Action Corresponding with Application No. 3,152,026 on May 12, 2023 (1 page).
Canadian Office Action Corresponding with Application No. 3,152,034 on May 24, 2023 (1 page).
Canadian Office Action Corresponding with Application No. 3,152,050 on May 25, 2023 (1 page).
"Car Family", Nan Chen, pp. 213, Shangdong People's Press, Jan. 2011, 1st edition.
"Product Form Design", Li Xiyun et al., pp. 114-115, China Light Industry Press, Jun. 2019, 1st edition.
"Principles and Maintenance of Automatic Transmissions", Zhao Zhenning, pp. 18-22, Beijing Institute of Technology Press, Jul. 2008, 1st edition.
Australian Office Action Corresponding with Application No. 2022201652 on Oct. 30, 2023 (1 page).
Australian Office Action Corresponding with Application No. 2022201647 on Oct. 31, 2023 (1 page).
European Office Action Corresponding to Application No. 22161440 on Dec. 13, 2024.

* cited by examiner

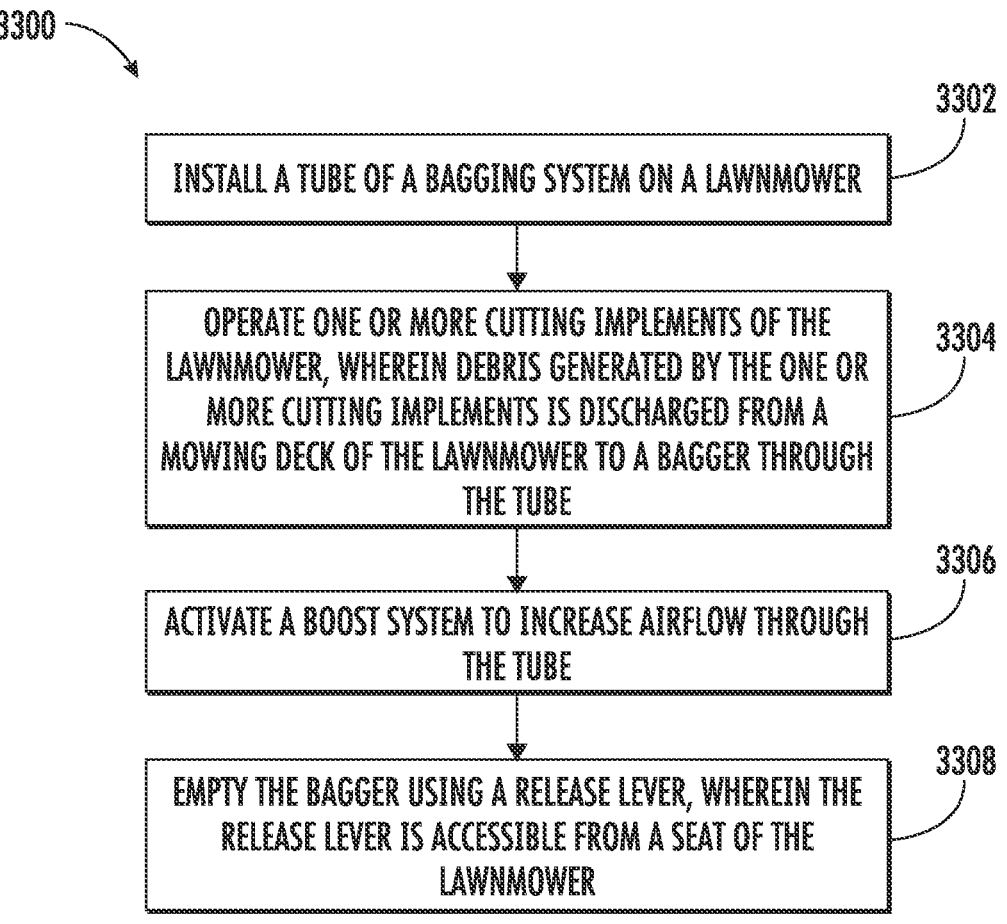

3300

3302
INSTALL A TUBE OF A BAGGING SYSTEM ON A LAWNMOWER

3304
OPERATE ONE OR MORE CUTTING IMPLEMENTS OF THE LAWNMOWER, WHEREIN DEBRIS GENERATED BY THE ONE OR MORE CUTTING IMPLEMENTS IS DISCHARGED FROM A MOWING DECK OF THE LAWNMOWER TO A BAGGER THROUGH THE TUBE

3306
ACTIVATE A BOOST SYSTEM TO INCREASE AIRFLOW THROUGH THE TUBE

3308
EMPTY THE BAGGER USING A RELEASE LEVER, WHEREIN THE RELEASE LEVER IS ACCESSIBLE FROM A SEAT OF THE LAWNMOWER

FIG. 33

LAWNMOWERS

CROSS-REFERENCE TO RELATED APPLICATIONS

The present application claims priority to U.S. Provisional Patent Application 63/159,256 filed on Mar. 10, 2021, the disclosure of which is incorporated by reference herein in its entirety, and to U.S. Provisional Patent Application 63/288, 958, filed Dec. 13, 2021, the disclosure of which is incorporated by reference herein in its entirety.

FIELD

The present disclosure relates generally to lawnmowers, and more particularly to electrically powered lawnmowers.

BACKGROUND

Lawnmowers are typically used to trim grass and maintain lawns. Traditionally, lawnmowing operations were performed manually or using gas powered lawnmowers. However, manual grass trimming operations are laborious and inefficient while gas powered lawnmowers are loud and require gas and other fluids to operate.

As consumers continue to demand more environmentally friendly yard maintenance equipment with less maintenance and lower noise pollution, it has become increasingly clear that loud, inefficient lawnmowers utilizing gas powered engines are no longer acceptable to consumers.

Accordingly, improved lawnmowers are desired in the art. In particular, lawnmowers which provide quiet, clean, and efficient mowing would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a lawnmower is provided. The lawnmower includes a frame; a walking element coupled to the frame; a motor coupled to the frame, the motor selectively powering the walking element; a user interface comprising: a lever having a home position and being moveable from the home position; a base having a relatively fixed position with respect to the frame, the base defining an area configured to receive the lever such that the lever is accessible by an operator of the lawnmower; and a detection system configured to detect relative movement of the lever and communicate the detected movement to a processor which controls a direction of travel of the lawnmower in response to the detected relative movement of the lever, wherein the lever is moveable from the home position in at least two directions, the two directions being selected from of a group consisting of an X-directional translation, a Y-directional translation, a clockwise rotation, and a counter-clockwise rotation.

In accordance with another embodiment, a user interface for a lawnmower is provided. The user interface includes a lever having a home position and being moveable from the home position; a base having a relatively fixed position with respect to a frame of the lawnmower, the base defining an area configured to receive the lever such that the lever is accessible by an operator of the lawnmower; and a detection system configured to detect relative movement of the lever and communicate the detected movement to a processor which controls a direction of travel of the lawnmower in response to the detected relative movement of the lever, wherein the lever is moveable from the home position in at least two directions, the two directions being selected from of a group consisting of an X-directional translation, a Y-directional translation, a clockwise rotation, and a counter-clockwise rotation.

In accordance with another embodiment, a lawnmower is provided. The lawnmower includes installing a frame; a walking element coupled to the frame; a motor selectively powering the walking element; and a user interface comprising a joystick configured to control a direction of travel, a speed of travel, or both of the lawnmower.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which:

FIG. 33 is a flow chart of a method of operating a lawnmower in accordance with embodiments of the present disclosure.

DETAILED DESCRIPTION

Figure 1:
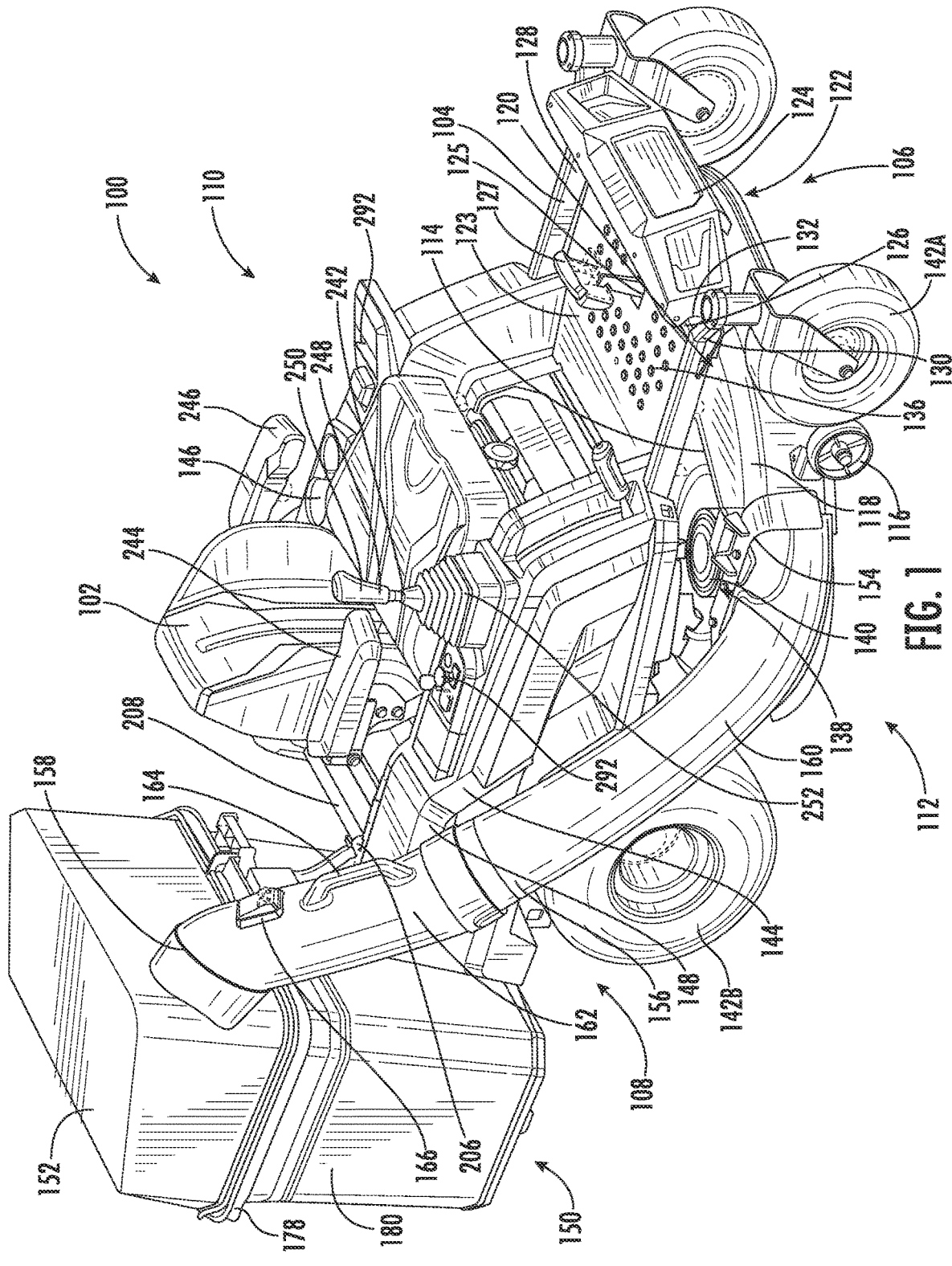
FIG. 1 is a perspective view of a lawnmower in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive—or and not to an exclusive—or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, a lawnmower described herein may operate using power provided by one or more batteries. For example, the lawnmower can include a plurality of first batteries and a plurality of second batteries. The first and second batteries can be different from one another, e.g., operate at different voltages. For instance, by way of non-limiting example, the first batteries can be 80V batteries and the second batteries can be 40V batteries. The 40V batteries can be boosted to 80V by a booster, e.g., a voltage converter, a boost converter, a buck-boost converter, or the like, to allow the 40V and 80V batteries to operate in parallel across a common rail. Other voltages and operating parameters are contemplated herein. For instance, in certain instances, the first batteries are between 50V and 80V, such as approximately 72V. The batteries can operate alone, together, or in various sub-combinations to provide power to the lawnmower. In some embodiments, the batteries, e.g., the first and second batteries, can be charged through a charging port on the lawnmower. In other instances, at least one of the batteries can be directly charged without use of a charging port of the lawnmower. For example, the battery can be removed from the lawnmower and directly connected to a power source or indirectly coupled to the power source through an intermediary component, e.g., a converter.

The lawnmower can include features which enable advantageous aspects of operation. By way of example, the lawnmower can include a battery storage area having a design which enables efficient space utilization and customization. The lawnmower can have an ergonomic design which enables more efficient operation, e.g., easier release of debris from a bagger system, better control of movement using a joystick, storage areas for personal items during use, bagger boost systems which enhance debris removal, and the like. These and other advantageous principles of the design described herein will become clear after reading the entire disclosure.

Referring now to the drawings, FIG. 1 illustrates a perspective view of a lawnmower 100 in accordance with an exemplary embodiment of the present disclosure. The lawnmower 100 depicted in FIG. 1 is a riding lawn mower which includes a seat 102 configured to support a lawnmower operator (hereinafter referred to as the "operator"). The seat 102 is coupled to a frame 104 which provides rigidity and structural support to the lawnmower 100. The frame 104 can extend between a front end 106 of the lawnmower 100 and a rear end 108 of the lawnmower 100. The frame 104 can extend between a left side 110 of the lawnmower 100 and a right side 112 of the lawnmower 100. In one or more instances, the frame 104 may extend continuously, i.e., be formed from one or more components connected together. In other instances, the frame 104 can be formed from separate, spaced apart components which are joined through dynamic interfaces.

A mower deck 114 can be disposed at a vertical elevation below the seat 102. The mower deck 114 may also be disposed at least partially in front of the seat 102. At least a portion of the mower deck 114 may also be disposed below at least a portion of the frame 104. The mower deck 114 may be adjustable between a plurality of different heights, as measured relative to an underlying ground surface. For example, the mower deck 114 can be adjustable between at least two different heights, such as at least three different heights, such as at least four different heights, such as at least five different heights, such as at least six different heights, such as at least seven different heights, and so on. The operator can select a desired length of the grass by selecting between the different heights of the mower deck 114.

The mower deck 114 can include one or more walking elements, such as one or more wheels 116. The wheel(s) 116 can be configured to support the mower deck 114 relative to the underlying ground surface at least when the mower deck 114 is at the lowest height, i.e., closest to the underlying ground surface. The wheel(s) 116 may also contact the ground, for example, when the mower deck 114 passes over uneven ground (independent of which height position the mower deck 114 is at). In such instances, the wheels 116 may contact one or more elevated portions of the ground and lift the mower deck 114 relative to the frame 104. This can allow the mower deck 114 to conform to the shape of the underlying ground surface to provide a more even mowing height.

Figures 30, 31:
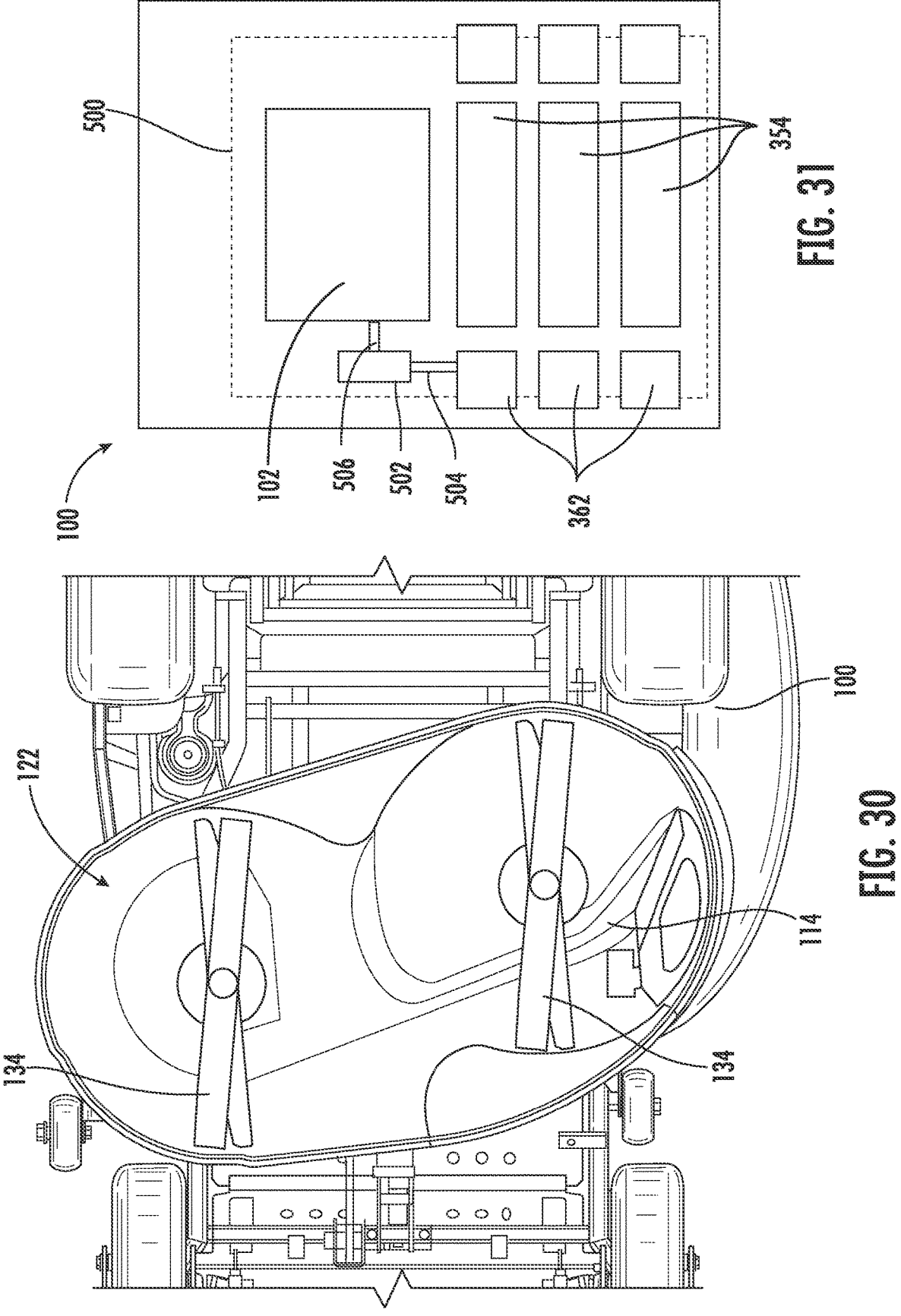
FIG. 30 is a bottom view of the lawnmower in accordance with embodiments of the present disclosure.
FIG. 31 is a schematic view of a cooling circuit of the lawnmower in accordance with embodiments of the present disclosure.

The mower deck 114 can include a body 118 defining an upper surface 120 and a lower surface 122 (FIG. 30). In one or more embodiments, a sound dampening element (not shown) such as a sound dampening material, may be used on the mower deck 114 to reduce the sound created by rotation of the cutting implement. In an embodiment, the sound dampening material can be disposed on the upper surface 120 of the mower deck 114. In another embodiment, the sound dampening material can be disposed on the lower surface 122 of the mower deck 114. In yet another embodiment, the sound dampening material can be disposed between the upper surface 120 and the lower surface 122 of the mower deck 114, e.g., within a cavity (not illustrated) between the upper and lower surfaces 120 and 122.

By way of non-limiting example, the sound dampening material can include a mass-loaded vinyl sound barrier, acoustic mineral wool insulation, glue compound, one or more resilient sound channels, acoustic caulk, soundproof foam, soundproof blankets or sheets, or the like. In some instances, the sound dampening material can be coupled to the mower deck 114 through adhesive. In other instances, the sound dampening material can be coupled to the mower deck 114 through one or more fasteners, e.g., threaded fasteners.

A floor 123 can be disposed above the mower deck 114. The floor 123 can be coupled with the frame 104. In certain instances, the floor 123 can define a textured surface 136 to enhance grip and increase traction for the operator. In one or more embodiments, the textured surface 136 may be integral with the floor 123. For example, the textured surface 136 can include stamped ridges or frustoconical cutouts in the floor 123. In other embodiments, the textured surface 136 may include a removable or discrete textured component which is coupled with the floor 123.

The floor 123 can include a cutout 125. In an embodiment, the cutout 125 can be defined entirely by the floor 123, i.e., the cutout 125 can be a closed cutout. In another embodiment, the cutout 125 can be a slot which extends into the floor 123 from a side surface of the floor 123, i.e., at least one side of the cutout 125 is open. In certain instances, the cutout 125 can be centrally disposed in a lateral direction of the lawnmower 100. In other instances, the cutout 125 can be laterally offset. A pedal 127 can be disposed at least partially within the cutout 125. The pedal 127 can provide functionality for the operator. For instance, the pedal 127 can be a brake pedal to allow the operator to brake the lawnmower 100. The pedal 127 can include a park feature which allows the operator to selectively reconfigure the lawnmower 100 to a parked mode.

In certain instances, the lawnmower 100 can further include a footrest 124. By way of example, the footrest 124 can extend between and be supported by components of the frame 104. In the depicted embodiment, the frame 104 includes a cross member 126 extending between two lateral members 128 and 130. In one or more embodiments, the footrest 124 can include a groove 132 which receives the cross member 126. In this regard, the footrest 124 can rest upon the cross member 126 and be supported at least in part by the cross member 126. The footrest 124 may also be coupled to the frame 104 at one or more other locations, such as at the lateral members 128 and 130.

The footrest 124 can be disposed at a vertical elevation above the mower deck 114. In the depicted embodiment, the footrest 124 is disposed at the front end 106 of the lawnmower 100. In this regard, the operator can extend his or her feet forward to the footrest 124 for support, e.g., when seated on the lawnmower 100. The footrest 124 may also operate as a fender (or bumper) for the front end 106 of the lawnmower 100. In the event of impact, the footrest 124 can be easily swapped and replaced to reduce the costs associated with damage to the lawnmower 100.

The mower deck 114 can shield the operator from one or more cutting implements 134 (FIG. 30) of the lawnmower 100. In an embodiment, the mower deck 114 can define one or more receiving areas 138 which each house a motor 140. The number of receiving areas 138 and motors 140 can correspond with the number of discrete cutting implements 134 of the lawnmower 100. In a particular embodiment, the lawnmower 100 can include two cutting implements 134 spaced apart from one another in a generally lateral (width) direction. In this regard, the mower deck 114 can include two receiving areas 138 and two motors 140. In another embodiment, the lawnmower 100 can include three cutting implements 134, four cutting implements 134, five cutting implements 134, or even six or more cutting implements 134.

The motors 140 can extend through the mower deck 114 such that a portion of the motors 140 is disposed above the mower deck 114 and another portion of the motors 140 is disposed below the mower deck 114. The motors 140 may be removably coupled to the mower deck 114 to allow easy access for service and repair.

The lawnmower 100 can further include a walking element configured to move the lawnmower 100 over the underlying ground surface. The walking element can include, for example, one or more wheels, treads, or the like. In the depicted embodiment, the lawnmower 100 has four wheels including two front wheels 142A and two rear wheels 142B.

In an embodiment, the front wheels 142A can be passive. That is, the front wheels 142A may not be actively driven or steered. Instead, the front wheels 142A can passively support the weight of the lawnmower 100, operator, and other features described herein. In an embodiment, the front wheels 142A can be coupled to the frame 104 such that the front wheels 142A rotate about a vertical axis. Rotation of the front wheels 142A about 360 degrees of the vertical axis can permit the lawnmower 100 to turn without incurring a radius of turn. In this regard, the lawnmower 100 can operate as a zero-turn radius (ZTR) lawnmower.

One or both of the rear wheels 142B can be powered (i.e., driven) to propel the lawnmower 100. In an embodiment, the rear wheels 142B can be independently operable, e.g., operated at different speeds as compared to one another. For instance, the rear wheels 142B can be independently powered by separate motors or operate through interfaces configured to permit different relative displacement between the rear wheels 142B. Examples of such interfaces include slip clutches, gearboxes, and the like. The direction of travel of the lawnmower 100 may be adjusted by varying the speed and direction of each of the rear wheels 142B relative to one another. For instance, the lawnmower 100 can turn left when the right rear wheel 142B is operating faster than the left rear wheel 142B. Conversely, the lawnmower 100 can turn right when the left rear wheel 142B is operating faster than the right rear wheel 142B.

In an embodiment, the front wheels 142A can be different from the rear wheels 142B. For instance, a diameter of the front wheels 142A can be less than a diameter of the rear wheels 142B. By way of another example, tire width of the front wheels 142A can be less than tire width of the rear wheels 142B. By way of yet another example, the front wheels 142A may have a different tread pattern (e.g., a lesser pronounced tread pattern) as compared to the rear wheels 142B.

The lawnmower 100 can further include a fairing 144. In one embodiment, the fairing 144 can include a single, integral piece. In another embodiment, the fairing 144 can include a plurality of discrete pieces. The word "fairing" is used interchangeably herein to refer to both single-piece and multi-piece fairings.

Referring to the embodiment in FIG. 1, the fairing 144 can include at least a left fairing 146 and a right fairing 148. The left and right fairings 146 and 148 may be coupled with the frame 104. In an embodiment, the left and right fairings 146 and 148 can be reflectively symmetrical with one another about a centerline of the lawnmower 100. That is, the left and right fairings 146 and 148 can have a mirrored shape as one another. In another embodiment, the left and right fairings 146 and 148 can have different shapes as compared to one another (where the different shapes are not reflectively symmetrical with one another).

In an embodiment, the left and right fairings 146 and 148 can be disposed on left and right sides of the seat 102, respectively. The left and right fairings 146 and 148 can extend rearward from the seat 102 toward the rear end 108 of the lawnmower 100. In an embodiment, the left and right fairings 146 and 148 can join together, or be disposed adjacent to one another, at a location behind the seat 102. For instance, the left and right fairings 146 and 148 can interface at a seam extending generally along the centerline of the lawnmower 100.

As described in greater detail below, the fairings 144 can form areas along the lawnmower 100 where the operator can store equipment, accessories, or the like. The fairings 144 can also form interfaces for receiving objects which provide operational aspects of the lawnmower 100. For instance, as described in greater detail below, the fairings 144 can define slots into which one or more dividers can be inserted to form discrete segments of a storage area behind the seat 102. Additionally, the fairings 144 can define one or more battery receiving areas of the lawnmower 100.

In an embodiment, at least one of the fairings 144 may be removably coupled to the frame 104. For instance, at least the right fairing 148 may be removable from the lawnmower 100 when the operator desires to utilize certain accessories, such as a bagging system. By removing the right fairing 148, the operator may be able to access one or more connection interfaces previously hidden by the right fairing 148 that allow the operator to couple one or more accessories to the lawnmower 100. By removing the right fairing 148 and adding the accessory in the area where the right fairing 148 previously occupied, the width of the lawnmower 100 can be reduced when using the accessory. That is, the accessory does not need to be disposed laterally outside of the right fairing 148. This may be particularly important when operators seek to use the lawnmower 100 in areas having confined dimensions, such as when operating in yards that have gates or paths with minimal lateral (width) clearance, e.g., 36 inch clearance, 34 inch clearance, 32 inch clearance, or even 30 inch clearance. While reference above to utilizing an accessory with the lawnmower 100 includes removing the right fairing 148, it should be understood that the left fairing 146 may alternatively be removed and replaced by the accessory. In yet another embodiment, the accessory may be installable on the lawnmower 100 with the fairings 144 all remaining in their respective positions on the lawnmower 100.

In one or more embodiments, the lawnmower 100 can include a bagging system 150. The bagging system 150 can include a bagger 152 in fluid communication with the mower deck 114. In particular, the bagger 152 can be in fluid communication with a discharge chute 154 extending from the mower deck 114. Air vortices generated by the cutting implement(s) can generate airflow which propels debris (e.g., grass clippings) from the mower deck 114 to the discharge chute 154. The airflow can further propel the debris to the bagger 152. In such a manner, debris discharged from the discharge chute 154 of the mower deck 114 can be collected in the bagger 152. Use of the bagging system 150 may be particularly advantageous in certain uses of the lawnmower 100, such as, e.g., during heavy mowing operations when the grass is long, when picking up leaves, or the like.

The bagging system 150 can include a tube 156 extending between the discharge chute 154 and an opening 158 of the bagger 152. In accordance with one or more embodiments, the tube 156 may include a plurality of discrete components linked together. For example, the tube 156 can include a first portion 160 coupled with the mower deck 114 at the discharge chute 154 and a second portion 162 which extends between the first portion 160 and the opening 158 of the bagger 152. By way of non-limiting example, the first and second portions 160 and 162 can be coupled together at an interface through one or more fasteners, hooks, clamps, straps, or the like.

In certain instances, the tube 156 can include an operating element, such as a handle 164, which allows the operator to more easily operate the tube 156, e.g., more easily move the tube 156 into and out of alignment with the opening 158 of the bagger 152. In certain instances, the tube 156 can further include an adjustment element 166 configured to change an operating characteristic of the tube 156. For instance, the adjustment element 166 can control airflow through the tube 156, lock and unlock the tube 156 relative to the bagger 152, adjust one or more internal baffles within the tube 156, or the like. In the depicted embodiment, the handle 164 and adjustment element 166 are both disposed on the second portion 162 of the tube 156. In another embodiment, either or both of the handle 164 or adjustment element 166 can be disposed on the first portion 160 of the tube 156.

Figures 2, 3:
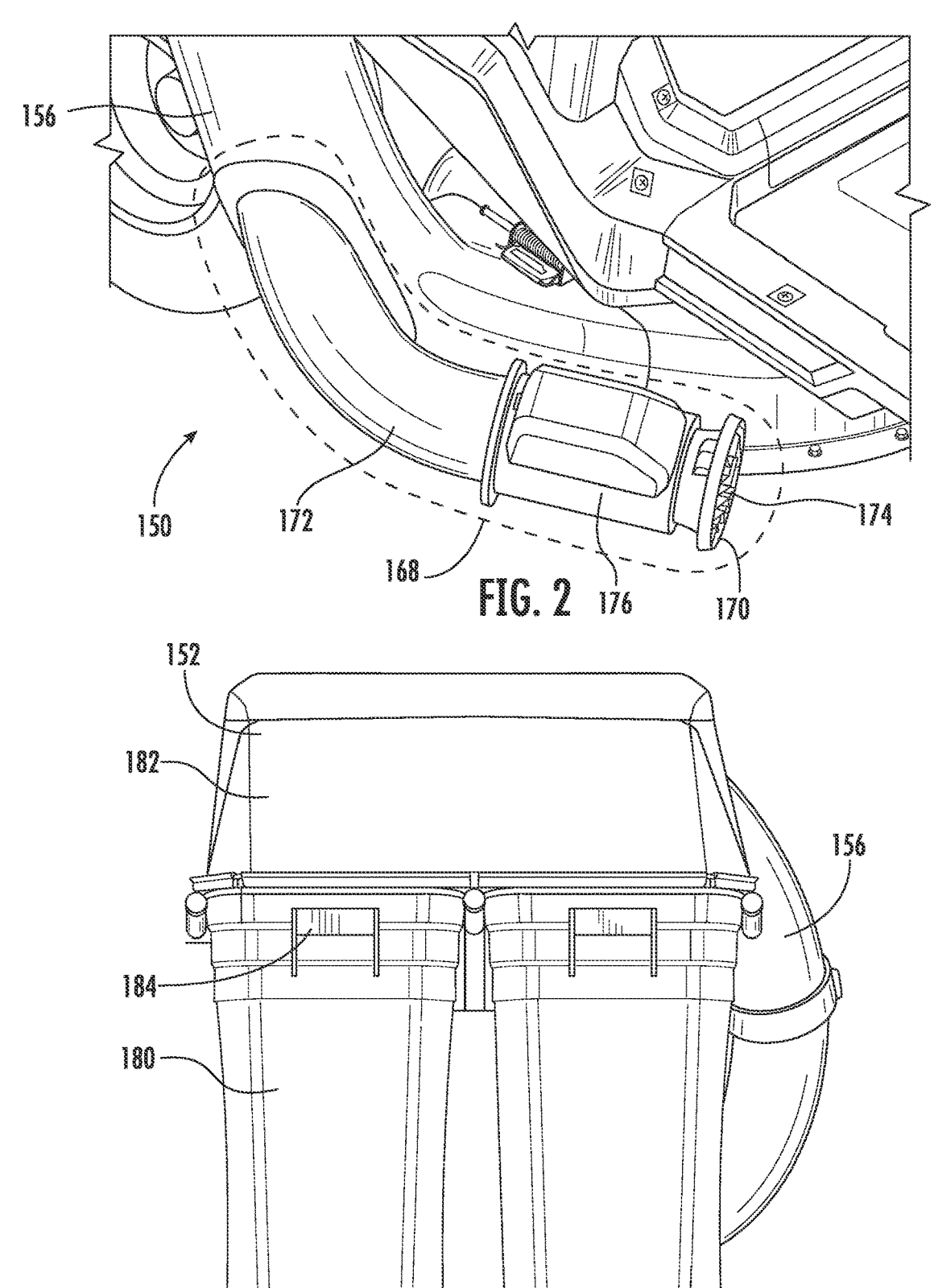
FIG. 2 is an enlarged perspective view of a portion of a bagging system of the lawnmower in accordance with embodiments of the present disclosure.
FIG. 3 is a rear view of another portion of the bagging system of the lawnmower in accordance with embodiments of the present disclosure.

FIG. 2 illustrates a portion of the tube 156 in accordance with another embodiment. In the embodiment depicted in FIG. 2, the bagging system 150 includes a boost system 168. The boost system 168 can include an air inlet 170 and a tube 172. The tube 172 can fluidly couple the air inlet 170 to another portion of the bagging system 150, such as the tube 156. A filter (or screen) 174 may be disposed at or near the air inlet 170 to prevent ingress of large debris into the boost system 168. The filter 174 can include a plurality of baffles, fabric, a woven or non-woven mesh, a porous substrate, another suitable filter material, or any combination thereof The boost system 168 can be coupled to the lawnmower 100. By way of non-limiting example, the boost system 168 can be coupled with the tube 156, with the bagger 152, with the frame 104, with the mower deck 114, or with another part of the lawnmower 100. In an embodiment, the boost system 168 can have a rigid construction. For instance, the boost system 168 can be formed from a hard-shelled material. In another embodiment, at least a portion of the boost system 168 can be flexible. For instance, the tube 172 can include a flexible material. The flexible tube 172 can be suspended from or connected to any portion of the bagging system 150.

The boost system 168 can include a motive device, such as a motor coupled to an air biasing element, such as a fan, to propel airflow from the air inlet 170 to the bagger 152. In the depicted embodiment, the motive device is disposed within an enlarged portion 176 of the tube 172. For instance, a motor can be mounted to an internal aspect of the tube 172. A fan blade can be coupled to an output shaft of the motor. As the motor rotates, the fan blade can generate airflow through the tube 172 in a direction toward the tube 156. In other embodiments, the motive device can be disposed in a separate element, i.e., not part of the enlarged portion 176 of the tube 172, or operate using a different principle of operation. In certain instances, the motive device can be powered by one or more batteries of the lawnmower 100. For example, the motive device can be powered by one or more batteries of the lawnmower 100 configured to propel the lawnmower 100 or drive the cutting implement(s).

Without use of the boost system 168, a flow rate of air through the tube 156 is generally controlled by the cutting implement 134 (FIG. 30). As the cutting implement 134 rotates, airflow is generated which propels debris and clippings out of the discharge chute 154, up the tube 156 to the bagger 152. As the cutting implement 134 rotates faster, the flow rate of air generally increases. Thus, actual flow rate is a result of the cutting implement 134.

When activated, the boost system 168 may change (e.g., increase) the actual flow rate of the air as compared to normal operating conditions, i.e., airflow generated by the cutting implement 134, or even alter a flow characteristic of the air as compared to normal operating conditions. In this regard, the boost system 168 can provide additional force to displace debris from the discharge chute 154 to the bagger 152. This may be particularly advantageous when using the lawnmower 100 in areas with large amounts of debris, or when mowing in wet or otherwise difficult conditions where the airflow generated by the cutting implement(s) 134 is insufficient to propel the debris to the bagger 152. The boost system 168 can also adjust the flow characteristics of the air, e.g., the air passing through the tube 156. For instance, in some instances, the cutting implement 134 can generate turbulent airflow within the tube 156. Turbulent air can reduce the flow rate of air through the tube 156, creating clogging situations. Using the boost system 168 can adjust the flow characteristic, e.g., smooth out the turbulence created by the cutting implement 134, to create better performance.

The boost system 168 may be selectively controlled by the operator. The operator may, for example, turn on and turn off the boost system 168 to selectively generate additional airflow within the boost system 168. By way of non-limiting example, the boost system 168 may be particularly useful during heavy duty operations, like when picking up leaves or when the ground is wet, but unnecessary during light duty operations or when the lawnmower 100 is not actively utilizing the bagging system 150. When the boost system 168 is not required, the operator may disengage the motive device, thereby terminating the increased airflow rate within the tube 156. The boost system 168 can be disengaged using a variety of methods. For instance, the boost system 168 may be controlled by a user interface disposed in a cockpit area of the lawnmower (i.e., within arms reach when seated). The user interface may be part of the display described in greater detail hereinafter. In an embodiment, the boost system 168 may be controlled at a location defined by the boost system 168, e.g., at a location along the tube 172. For instance, the tube 172 can include an ON/OFF switch. In another embodiment, the boost system 168 may be controlled using an interface located at another location along the tube 156, such as at the adjustment element 166 (FIG. 1).

In an embodiment, the boost system 168 can be controllable between an ON mode and an OFF mode. For instance, the boost system 168 can be toggled between the ON and OFF modes using a switch. In another embodiment, the boost system 168 can be adjustable such that the operator can selectively adjust an operating speed of the boost system 168, and more particularly, an operating speed of the motive device of the boost system 168. Adjustment of the operating speed of the boost system 168 may be finite or infinitely adjustable. Finite adjustment of the operating speed can include, e.g., a plurality of preset speed settings at which the boost system 168 can operate. For instance, the boost system 168 can have a LOW setting, a MEDIUM setting, and a HIGH setting. The operator can select between the plurality of preset speed settings. Infinite adjustment of the operating speed can include, e.g., a range of speeds over which the operator can select any speed within. For instance, the operator can move a speed controller (e.g., a dial, a lever, or a digital indicator) to any location within a predefined range to selectively control the boost system 168.

In an embodiment, the boost system 168 can include one or more operating modes. As previously described, these operating modes can include an ON mode, an OFF mode, and a variable speed mode. By way of further example, the operating modes can further include a time limited mode or a motor load feedback mode. In the time limited mode, the boost system 168 can remain at a prescribed operating parameter for a set duration of time. In the motor load feedback mode the boost system 168 can increase the rate of airflow in response to the load on the motor, e.g., the current draw of the motor. The lawnmower 100 may be configured to automatically control the boost system 168 in view of a detected mowing operation being performed.

In one or more embodiments, the boost system 168 may automatically turn on in response to a detected condition. For instance, the boost system 168 may automatically turn on when a detected air flow rate within the tube 156 is below a threshold level. By way of another example, the boost system 168 may automatically turn on when a detected moisture content of debris is above a threshold level. In certain instances, the boost system 168 may generate a suggestion to the operator to turn on the boost system 168. For example, a message can be displayed to the operator on a display described in greater detail below.

In an embodiment, the boost system 168 further includes an internal valve (not illustrated) which selectively opens and closes the tube 172. When the valve is open, the tube 172 can be in fluid communication with the tube 156. When the valve is closed, the tube 172 is no longer in fluid communication with the tube 156. It may be desirable to close the valve when the boost system 168 is not actively in use. In certain instances, closing of the valve can occur automatically (e.g., in response to the boost system 168 being inactive). In other instances, the valve can be closed manually.

In an embodiment, the boost system 168 can be used as a suction conduit for other actions, such as leaf pickup. In a particular instance, utilization of the boost system 168 for leaf pickup can include coupling the air inlet 170 with a hose. The motive device of the boost system 168 can be initiated and the hose can then be moved around as necessary to pick up leaves.

In an embodiment, the boost system 168 is detachably coupled to the lawnmower 100. For instance, the boost system 168 can be detachably coupled to the tube 156, the bagger 152, the mower deck 114, or the frame 104. The operator can thus save on weight and lateral (width) requirements by removing the boost system 168 when not in use. In another embodiment, the boost system 168, or a portion thereof, can be repositioned or rearranged when not in use, e.g., the boost system 168 can collapse at one or more pleats, fold, hinge, roll up, disassemble, nest, or the like.

The boost system 168 can be powered by a main power source of the lawnmower 100. For instance, the boost system 168 can be powered by one or more batteries of the lawnmower 100. In an embodiment, the boost system 168 automatically connect to the one or more batteries of the lawnmower 100 when the boost system 168 is positioned on the lawnmower 100. For instance, by way of non-limiting example, the boost system 168 can include a plug which automatically interfaces with a socket of the lawnmower 100 when the boost system 168 is properly installed on the lawnmower 100. In another embodiment, the operator can manually couple the boost system 168 with the one or more batteries of the lawnmower 100.

The boost system 168 can receive power in addition, or alternatively, using a separate power source, i.e., not from the one or more batteries of the lawnmower 100. The boost system 168 may include an integrated or removable power source, e.g., an integrated or removable battery.

Referring again to FIG. 1, the bagger 152 can be disposed at the rear end 108 of the lawnmower 100, e.g., behind the seat 102. The bagger 152 can generally include a support structure 178 configured to engage with the lawnmower 100, e.g., the frame 104 of the lawnmower 100, and support one or more bags 180 of the bagger 152 relative to the lawnmower 100.

In some instances, the bags 180 can be flexible (FIG. 3). In other instances, the bags 180 can be relatively rigid (FIG. 1). The term "bag" as used with respect to bags 180 is intended to refer to a vessel defining a volume configured to receive debris and clippings from the discharge chute 154 of the mower deck 114. In an embodiment, the support structure 178 can be integrated into the one or more bags 180 like as shown in FIG. 1. For example, the support structure 178 and one or more bags 180 may be integral with one another, e.g., formed from a rigid plastic. In another embodiment, the support structure 178 can include a relatively rigid structure which retains one or more flexible bags 180 like as shown in FIG. 3.

The bagger 152 can further include a cover 182 configured to cover the one or more bags 180 and prevent egress of debris therefrom. In an embodiment, the cover 182 can define the opening 158 in communication with the tube 156. In another embodiment, the opening 158 can be part of another portion of the bagger 152. In certain instances, the bags 180 can include handles. In the embodiment depicted in FIG. 3, the handles include a first type of handles 184 (e.g., for handling the bags 180 in an upright position) and a second type of handles 186 (e.g., for handling the bags 180 in an upside down or emptying position).

Figure 4:
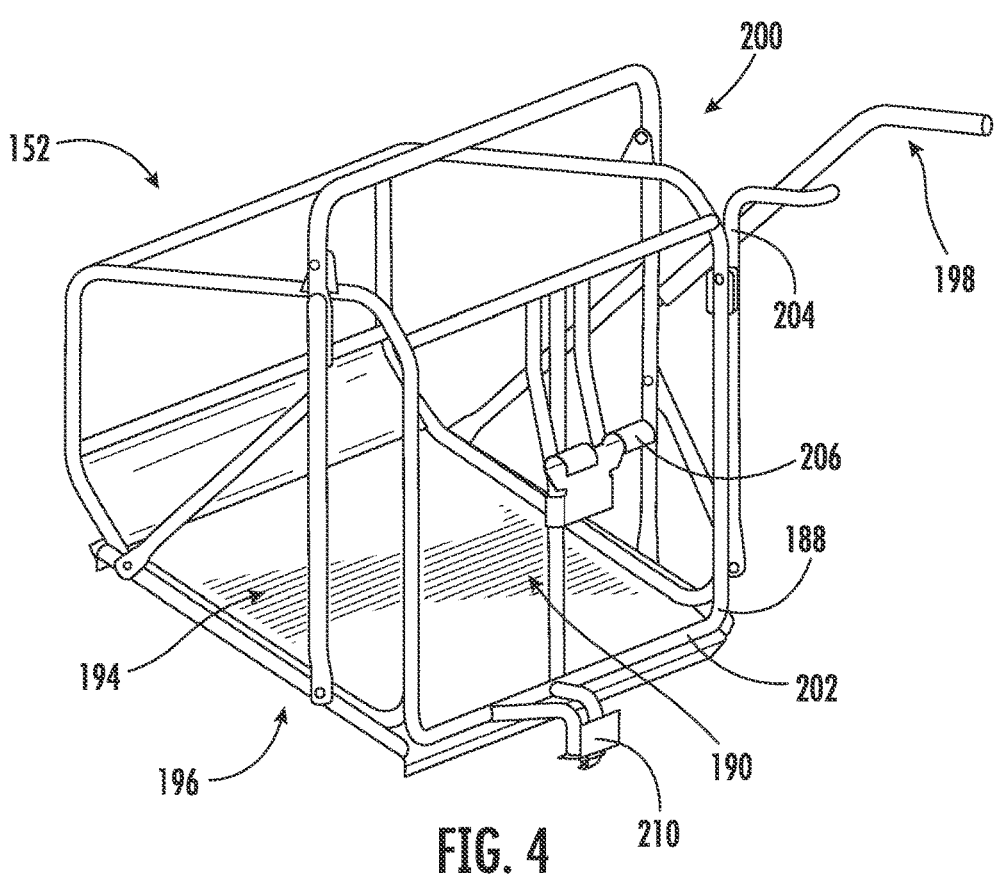
FIG. 4 is a perspective view of a frame of a bagger of the bagging system of the lawnmower in accordance with embodiments of the present disclosure.
Figure 5:
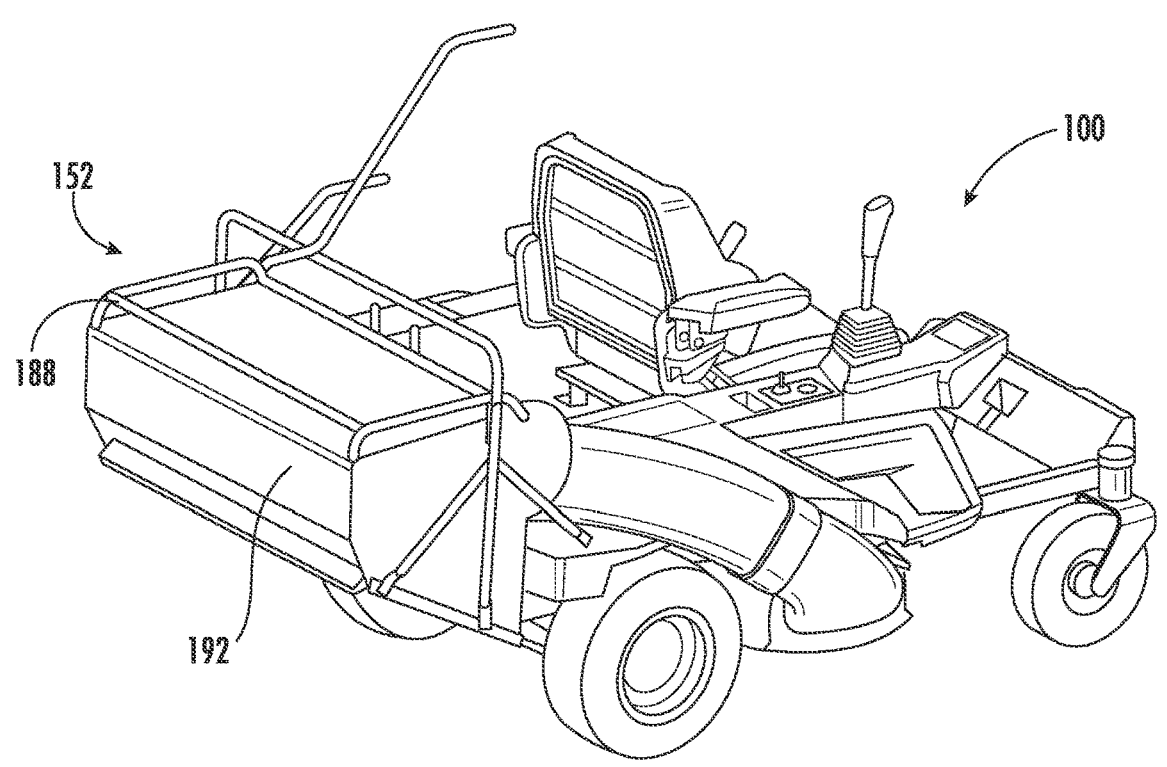
FIG. 5 is a rear perspective view of the lawnmower in accordance with embodiments of the present disclosure.

FIG. 4 illustrates a partial view of the bagger 152 in accordance with another embodiment. Referring to FIG. 4, the bagger 152 includes a frame 188 which defines a volume 190. The volume 190 can be further defined by one or more sidewalls 192, as seen in FIG. 5. The sidewalls 192 can include one or more sections, such as one section, two sections, three sections, four sections, or the like. The sidewalls 192 can be joined together to enclose the volume 190.

The bagger 152 can further include a door 194. In the depicted embodiment, the door 194 is disposed at a bottom end 196 of the bagger 152. The door 194 can be moveable with respect to the frame 188. For instance, the door 194 can be hinged relative to the frame 188. When the volume 190 becomes full of debris, the operator can open the door 194 to unload the debris. In the depicted embodiment, the door 194 includes a single piece. In another embodiment, the door 194 can include two or more components which together selectively close the volume 190.

The operator can open the door 194 using a release, e.g., a release lever 198. In the depicted embodiment, the release lever 198 is disposed at an upper end 200 of the bagger 152. The release lever 198 depicted includes a rigid structure. In other non-limiting embodiments, the release can include a wireless release mechanism; a wired release mechanism including, e.g., a cable; or another type of selectively actuatable release mechanism.

The release lever 198 can extend forward from the bagger 152 toward the front end 106 of the lawnmower 100 so as to be accessible by the operator when seated in the cockpit of the lawnmower 100. As the release lever 198 is moved, an interference piece, e.g., a catch, can open to permit the door 194 to open. In an embodiment, the door 194 can open under its own weight. In another embodiment, the door 194 can be coupled to a mechanism configured to reduce the speed at which the door 194 opens. For instance, the door 194 can be linked to the frame 188 through one or more hydraulic actuators, threaded rod actuators, or the like. The operator can close the door 194 by, e.g., returning the release lever 198 to its original (closed) position, manually rotating (e.g., lifting) the door 194 to the closed position, using a motor or other motive device to drive the door 194 to the closed position, another suitable method, or any combination thereof. In a particular embodiment, the release lever 198 can be replaced by a cable which the operator can access to release the door 194. Yet other operational methods are contemplated herein.

Referring to FIG. 5, in one or more embodiments the door 194 can be angled relative to the underlying ground surface. That is, the door 194 can be angularly offset from a horizontal plane when the lawnmower 100 is resting on a horizontal surface with the door 194 in the closed position. This angular offset from the horizontal plane can be in a range between 1° and 89°, such as in a range between 10° and 75°, such as in a range between 30° and 60°. Angularly offsetting the door 194 from horizontal can allow the lawnmower 100 to traverse heavily undulating surfaces or potholes which might cause the lawnmower 100 to pitch upward, whereby the bagger 152 becomes displaced downward, towards the underlying ground surface.

The exemplary frame 188 depicted in FIG. 4 includes a plurality of interconnected tubes. The tubes define a static portion 202 which remains relatively static with respect to the lawnmower 100 and a dynamic portion 204 which is linked with the release lever 198 and the door 194. Pushing the release lever 198 causes the door 194 to open.

The frame 188 may be collapsible, e.g., for easy storage or transportation. In an embodiment, the frame 188 may be assembled with quick connect interfaces, e.g., bayonet connections, twist-lock connections, threaded connections, pinned connections, or the like. Disassembling enough of the quick connect interfaces can allow the remaining portions of the frame 188 to remain coupled together during storage. When stowed, the frame 188 may lay flat to save space.

The bagger 152 can be coupled to the lawnmower 100 through an interface. For example, coupled with the static portion 202 can be an interface configured to couple the bagger 152 to the lawnmower 100. The interface depicted in FIG. 4 includes a hook 206 configured to interface with a rail 208 (FIG. 1) of the lawnmower 100 and a linkage 210 configured to interface with a hitch 212 (FIG. 18) disposed at the rear end 108 of the lawnmower 100. The linkage 210 can be removably coupled to the hitch 212. For instance, by way of non-limiting example, the linkage 210 can include a flange which is supported by a flange of the hitch 212. Aligned openings in the two flanges can be coupled together by one or more fasteners (e.g., threaded or non-threaded fasteners) to connect the bagger 152 to the lawnmower 100.

Figure 6:
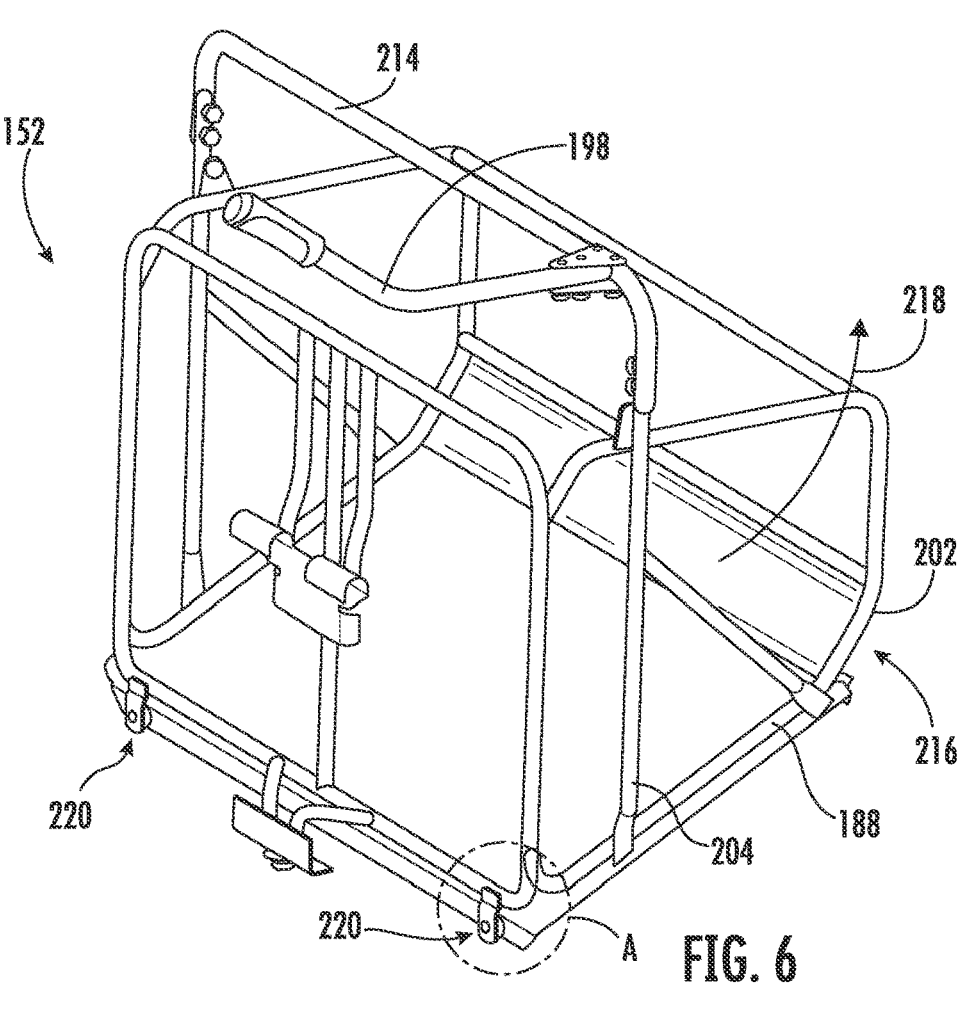
FIG. 6 is a perspective view of a frame of the bagger of the bagging system of the lawnmower in accordance with embodiments of the present disclosure.

FIG. 6 depicts the bagger 152 in accordance with another embodiment of the present disclosure. In the embodiment depicted in FIG. 6, the bagger 152 includes different static and dynamic portions 202 and 204 as compared to the bagger 152 illustrated in FIG. 4. Instead of being coupled to a side of the bagger 152, the release lever 198 depicted in FIG. 6 is coupled with a cross bar 214 of the bagger 152. As the operator displaces the release lever 198 from the position illustrated in FIG. 6, the door 196 (FIG. 7) translates and pivots backward to open an underlying side of the bagger 152. Similar to the embodiment depicted in FIGS. 4 and 5, the frame 188 of the bagger 152 depicted in FIG. 6 can include a portion 216 which is angularly offset from a horizontal plane when the lawnmower 100 is resting on a horizontal surface. The angle of the portion 216 may permit the door 196 to move past the frame 188 without contacting the frame 188 when the operator actuates the release lever 198. The door 196 can generally take a path depicted by arrow 218 when moving from the closed position (as shown) to the open position (not shown).

In an embodiment, the door 196 can be maintained in the closed position (as shown) through one or more couplers 220. In some instances, at least one of the couplers 220 can include a manual release mechanism, such as a latch. In other instances, at least one of the couplers 220 can include a quick release mechanism, such as, e.g., a magnet.

Figure 7:
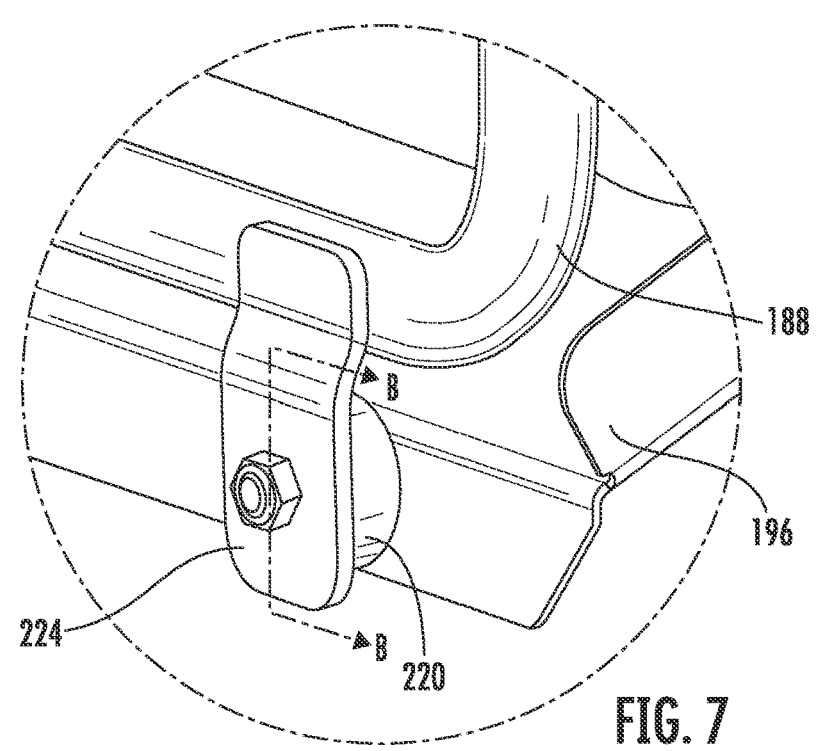
FIG. 7 is an enlarged view of a portion of the frame of the bagger as seen in Circle A in FIG. 6 in accordance with embodiments of the present disclosure.

FIG. 7 illustrates an enlarged view of a portion of FIG. 6 as seen in Circle A. The coupler 220 depicted in FIG. 7 is a magnetic coupler including a magnet 222 (FIG. 8) and a support structure 224 coupling the magnet to the frame 188. In an embodiment, the support structure 224 can be coupled to the frame 188 through one or more welded connections. In other embodiments, the support structure 224 can be coupled to the frame 188 using fasteners (e.g., threaded or non-threaded fasteners), clamps, cables, ties, adhesive, or the like.

Figure 8:
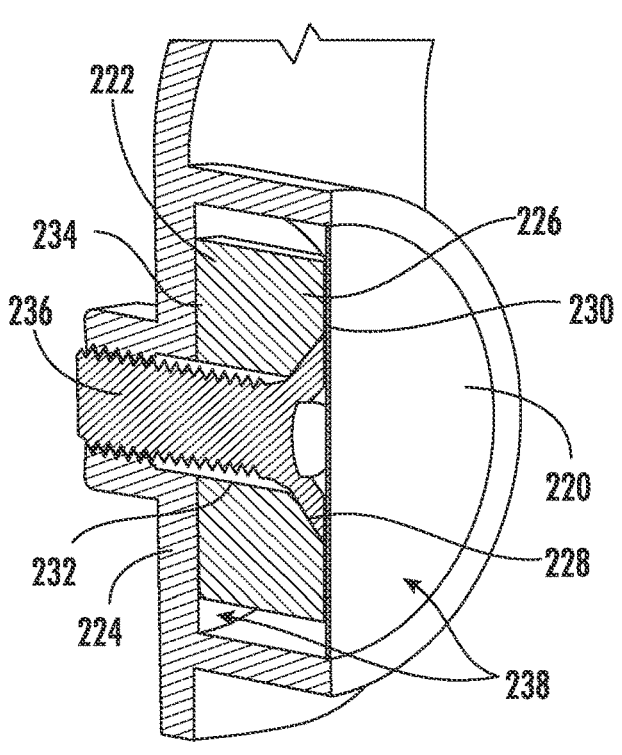
FIG. 8 is a cross-sectional perspective view of the portion of the frame as seen along Line B-B in FIG. 7 in accordance with embodiments of the present disclosure.

Referring to FIG. 8, the magnet 222 can have a body 226 defining a generally cylindrical shape with a frustoconical recess 228 disposed on a flat end 230 of the body 226. A hole 232 can extend between the frustoconical recess 228 and the other flat end 234 of the body 226. A fastener, e.g., a threaded fastener 236, can pass through the hole 232 and couple the magnet 222 to the support structure 224. Other arrangements and configurations of the coupler 220 are possible. The disclosure herein is not intended to be limited to the exemplary configuration described above.

In one or more embodiments, the coupler 220 can include a soft portion 238, such as a portion including a rubber material. The soft portion 238 can be disposed between the door 196 (FIG. 7) and the magnet 222 to soften the interface therebetween and prevent the door 196 from colliding with the magnet 222 and potentially damaging the magnet 222, the door 196, or both. The soft portion 238 can also be disposed between the magnet 222 and the support structure 224.

Figure 9:
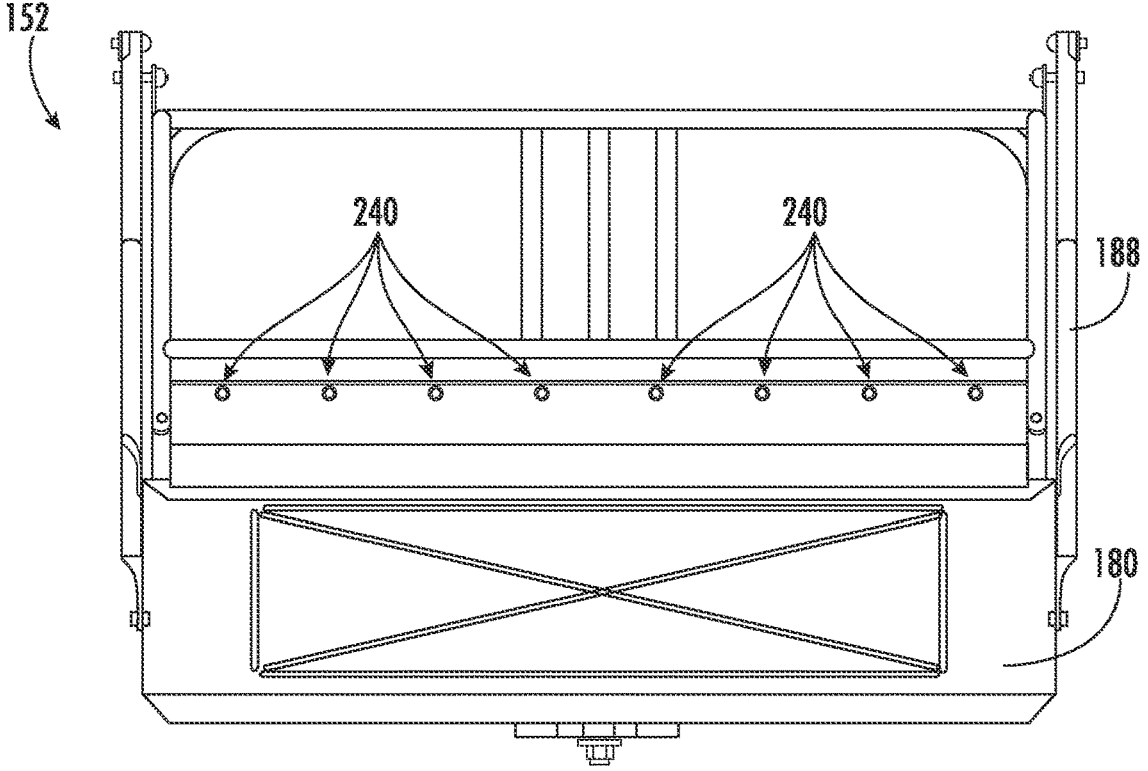
FIG. 9 is a top view of the bagger in accordance with embodiments of the present disclosure.

FIG. 9 illustrates a top view of the bagger 152 in accordance with an embodiment. As depicted, the bagger 152 can include a plurality of coupling points 240 configured to couple the bag 180 to the frame 188. The coupling points 240 can be configured for quick connect and quick disconnect. By way of example, the coupling points 240 can include snaps, where each snap is split into two pieces, with one of the pieces coupled to the bag 180 and the other of the two pieces coupled with the frame 188 (or a portion coupled therewith). In this regard, the bag 180 can be quickly configured by the operator using the snaps. In some instances, the coupling points 240 can be covered, e.g., by a sheet of material. The sheet of material can keep the coupling points 240 clean and free of debris. The sheet of material may also increase resistance against debris escaping from the bagger 152 through the coupling points 240.

Referring again to FIG. 1, the cockpit of the lawnmower 100 can include a user interface 242 which allows the operator to pilot the lawnmower 100. The user interface 242 is discussed in greater detail hereinafter. As depicted in FIG. 1, the user interface 242 is disposed on a first side of the seat 102. A first armrest 244 can be disposed on the first side of the seat 102. A second armrest 246 can be disposed on a second side of the seat 102, the second side of the seat 102 being opposite the first side. In an embodiment, the first and second armrests 244 and 246 can have different characteristics or operational capacities. For instance, the first and second armrests 244 and 246 can have different degrees of operational freedom. By way of example, the first armrest 244 may be pivotable relative to the seat 102 or static relative to the seat 102 while the second armrest 246 can pivot relative to the seat 102 and extend relative to the seat 102. In this regard, the second armrest 246 (on the lateral side of the seat 102 opposite the user interface 242) may be more adjustable (or have more degrees of operational freedom) than the first armrest 244.

In accordance with an embodiment of the present disclosure, the user interface 242 can include a joystick 248 defined by a handle 250 extending from a boot 252. The boot 252 may be sealed relative to at least one of the joystick 248 or handle 250 to prevent ingress of debris into the components of the user interface 242. While the user interface 242 is depicted on a right lateral side of the seat 102, in another embodiment, the user interface 242 can be disposed at a different location within the cockpit, such as on a left lateral side of the seat 102. In one or more embodiments, the user interface 242 can be swappable between the left and right lateral sides of the lawnmower 100.

Figure 10:
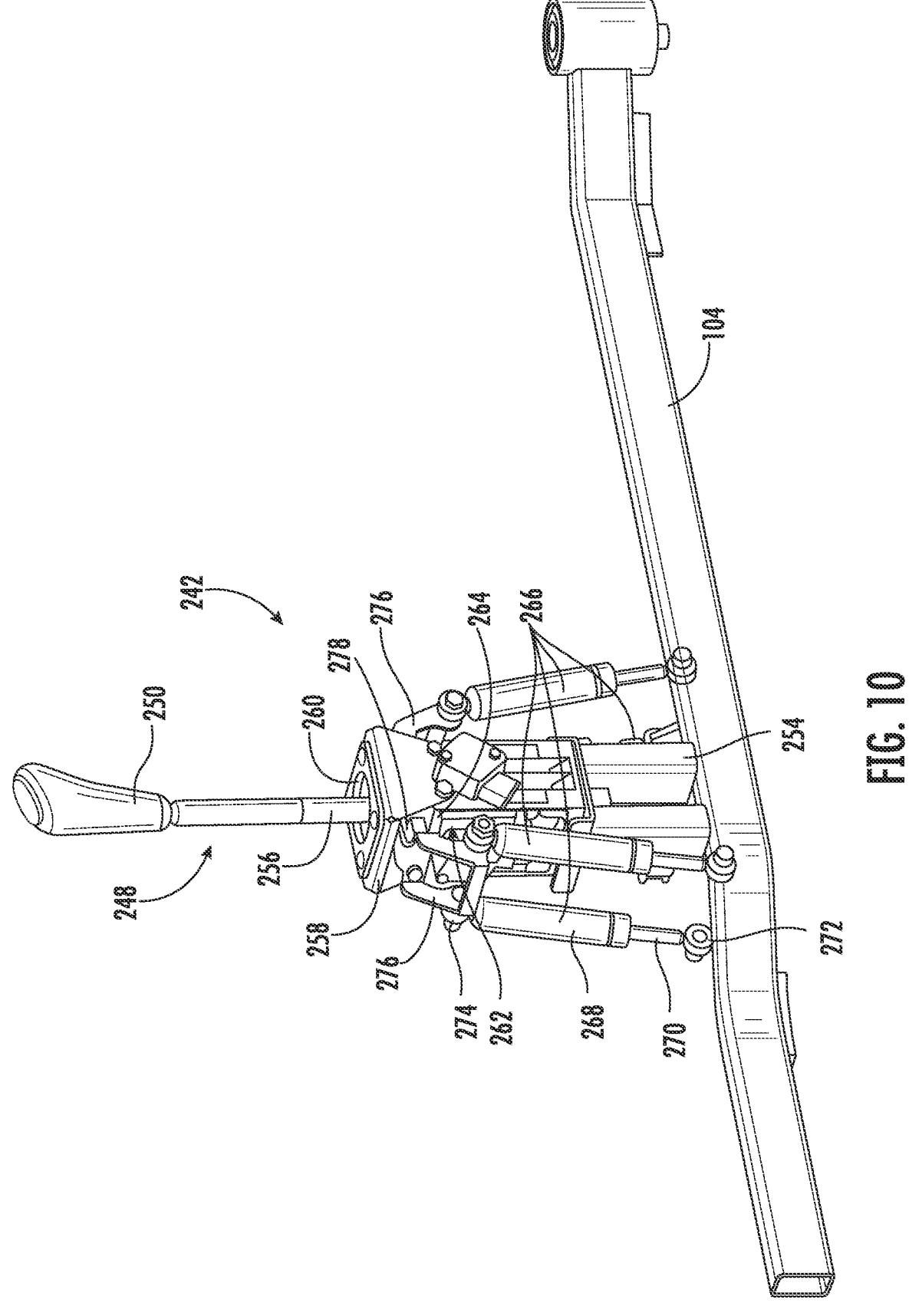
FIG. 10 is a perspective view of a user interface coupled with a frame of the lawnmower in accordance with embodiments of the present disclosure.
Figure 11:
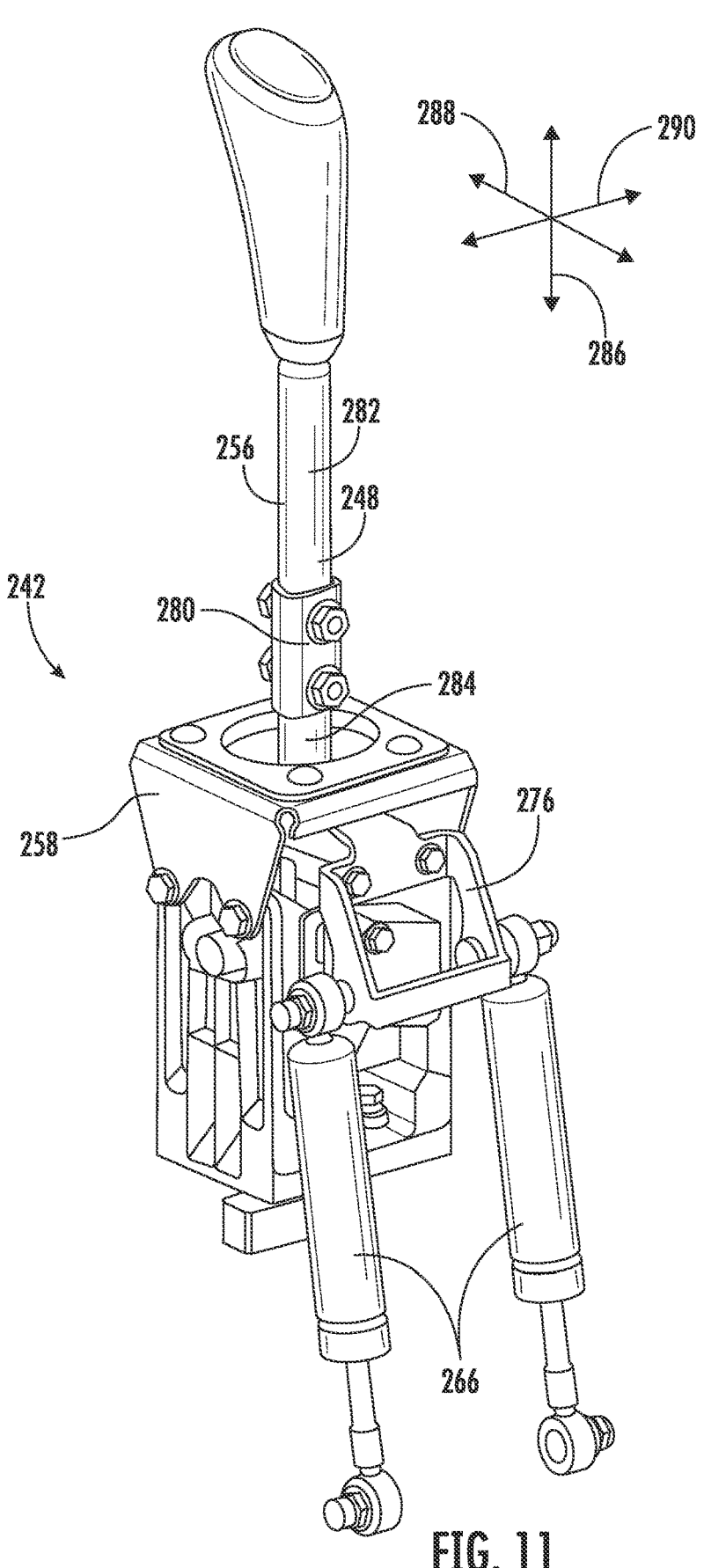
FIG. 11 is a perspective view of the user interface in accordance with embodiments of the present disclosure.

FIGS. 10 and 11 illustrate views of a user interface 242 in accordance with an exemplary embodiment of the present disclosure. Referring initially to FIG. 10, the user interface 242 is coupled to a portion of the frame 104 through one or more supports 254. The supports 254 may be integral with the frame 104 or coupled therewith.

The handle 250 can be coupled to a lever 256. The lever 256 can extend from the handle 250 to a base 258. The base 258 can define an opening 260 into which the lever 256 can extend into. In a non-limiting embodiment, the sidewall of the opening 260 can define a maximum displacement distance of the lever 256. That is, the lever 256 can be moved relative to the opening 260 up to the sidewall thereof. In this regard, the sidewall of the opening 260 may define the outer perimeter of lever 256 movement.

The base 258 can define an internal area 262 that receives the lever 256. A detection system 264 can detect relative movement of the lever 256. In an embodiment, the detection system 264 can be disposed at least partially within the internal area 262 of the base 258. For example, the detection system 264 can be disposed entirely within the internal area 262 of the base 258.

The detection system 264 can generally include components configured to detect relative movement of the joystick 248. By way of non-limiting example, the components may include any one or more of contact sensors, gimbals, gyroscopes, hall effect sensors, visual sensors, orientation sensors, electro-mechanical sensors, micro-electro-mechanical sensors (MEMS), or the like. The detection system 264, and more particularly one or more components thereof, may be in communication with a processing device (not illustrated) of the lawnmower 100. The processing device can be configured to receive information from the detection system 264. The processing device can utilize the received information to control the lawnmower 100 as described in greater detail hereinafter.

As the lawnmower 100 moves, and more particularly as the lawnmower 100 moves over rough terrain, the joystick 248 may experience one or more forces which are transferred to the operator. This can result in a subjectively rough riding experience. To mitigate the transfer of forces to the operator from the joystick 248, the user interface 242 may further include one or more dampeners 266 which are configured to dampen the transfer of forces to the operator. In the depicted embodiment, the one or more dampeners 266 include four dampeners 266. The dampeners 266 can be spaced apart from one another about the joystick 248. In an embodiment, the dampeners 266 can be equally spaced apart, or generally equally spaced apart, from one another. In an embodiment, the dampeners 266 can all comprise a same type of dampener. In another embodiment, at least one of the dampeners 266 can comprise a different type of dampener as compared to the other dampeners 266. By way of non-limiting example, the dampeners 266 can be hydraulic dampeners, electrical dampeners, magnetic dampeners, mechanical dampeners (e.g., rubber spacers), or the like. In the depicted embodiment, the dampeners 266 are all hydraulic dampeners, including a cylindrical bore 268 configured to receive a piston coupled with a shaft 270. The cylindrical bore 268 can be at least partially filled with a compressible fluid, such as a gas. As the lawnmower 100 traverses rough terrain, the piston can move within the cylindrical bore 268 which effectively dampens the transfer of force to the operator. In an embodiment, the dampeners 266 can be controlled by the lawnmower 100 (e.g., by a processing device of the lawnmower 100) to maintain a smooth joystick 248 experience.

In an embodiment, the dampeners 266 can include rod ends 272 which couple the shafts 270 of the dampeners 266 with the frame 104. In an embodiment, the shafts 270 can be directly coupled to the frame 104 through the rod ends 272. In another embodiment, the shafts 270 can be indirectly coupled to the frame 104. Rod ends 274 can couple the cylindrical bores 268 to the joystick 248. It should be understood that the inverse arrangement is also possible, i.e., the rod ends 272 couple the cylindrical bores 268 to the frame 104 and the rod ends 274 couple the shafts 270 to the joystick 248.

In an embodiment, the dampeners 266 can be indirectly coupled to the joystick 248. For instance, the dampeners 266 may be coupled to the joystick 248 through one or more intermediary members 276. In the depicted embodiment, two dampeners 266 are coupled to each one of the intermediary members 276. A first set of dampeners 266 is disposed on the forward end of the joystick 248 and a second set of dampeners 266 is disposed on the rear end of the joystick 248. The intermediary members 276 are coupled together through an interfacing component 278 which is coupled to the joystick 248.

FIG. 11 shows another view of the user interface 242. The dampeners 266 are depicted along with the rear end intermediary member 276. As the operator moves over rough terrain, the dampeners 266 can each operate independently, together, or partially together to dampen the joystick 248 and thereby reduce transfer of force to the operator.

The joystick 248 depicted in FIG. 11 includes an interface 280 formed between two portions 282 and 284 of the lever 256. The interface 280 can be adjustable to allow for movement between the two portions 282 and 284. By way of non-limiting example, the height of the joystick 248 can be adjusted to suit an operator's desired needs. To adjust the height of the joystick 248, the interface 280 is selectively opened to permit movement between the two portions 282 and 284. The movement can include at least translational movement. In some instances, the movement can also include rotational movement. In other instances, rotational movement between the two portions 282 and 284 can be prevented, e.g., by a keyed interface between the two portions 282 and 284. The keyed interface can include, for example, a slot (or other similar recessed feature) disposed on one of the two portions 282 and 284 and a rail (or other similar projecting feature) disposed on the other of the two portions 282 and 284. In some instances, the second portion 284 can remain at a relatively fixed location with respect to the base 258 while the first portion 282 can be moved relative to the base 258. In some instances, the first portion 282 can be interchangeable. The first portion 282 can thus be selected from a plurality of first portions each having any one or more of different designs, different sizes, different colors, different textures, or the like.

As depicted in FIG. 1, the user interface 242 can replace traditional lap bars, steering wheels, and foot pedal steering implements used in traditional lawnmowers. In some instances, the user interface 242, and more particularly the joystick 248, can steer the lawnmower 100 and provide throttle for moving the lawnmower 100. The joystick 248 may be configured to move about one or more of a yaw axis 286, a roll axis 288, and a pitch axis 290 (FIG. 11). In an embodiment, the joystick 248 can move about all three axis. In one or more embodiments, the joystick 248 may be able to pivot about one or more of the three axis and translate along at least one of the three axis.

In some instances, the joystick 248 can be self-centering. That is, the joystick 248 can self-return to a central position, e.g., the center of the opening 260, when the operator releases the joystick 248. By way of non-limiting example, the joystick 248 can be biased to a home position at the center of the opening 260 by one or more biasing elements, e.g., springs, hydraulics, or even dampeners 266.

As previously described, the position of the joystick 248 can be detected by the detection system 264. In an embodiment, the detection system 264 may detect displacement of the joystick 248 about any one or more of the yaw axis 286, the roll axis 288, and the pitch axis 290. The detected displacement may be measured relative to the position of the joystick 248 at the home position, i.e., unbiased and static.

The relative amount of displacement detected along each of the active axes can inform a particular portion of a mixing algorithm which controls the walking element. The mixing algorithm may be executed by a processing device of the lawnmower 100. The processing device can be electrically coupled with a memory device which stores an executable program to perform the mixing algorithm.

In accordance with an embodiment, the mixing algorithm can include only a single mixing algorithm. In this regard, the single mixing algorithm may be used to operate the lawnmower 100 during every use. In accordance with another embodiment, the mixing algorithm can include a plurality of different mixing algorithms. Each mixing algorithm can have different properties or attributes which allow for the same detected displacement to result in different operational (e.g., movement) outcomes. In certain instances, the operator may be able to switch between the mixing algorithms. In other instances, the processing device may automatically switch between the mixing algorithms, e.g., in response to a changing environmental condition. For example, when wet surfaces are detected, the lawnmower 100 may utilize a first mixing algorithm which causes slower acceleration. When dry surfaces are detected, the lawnmower 100 may utilize a second mixing algorithm which allows faster acceleration with the same amount of detected displacement.

The following mixing algorithms are provided for exemplary purposes only and are not intended to limit the scope of the disclosure.

In a first mixing algorithm, the joystick 248 can exhibit detected displacement about both the pitch and roll axis 288 and 290. Movement may be prohibited about the yaw axis 286 or, if the joystick 248 can move about the yaw axis 286, not detected. The first mixing algorithm can output a direction as a result of detected displacement about the roll axis 288 and a throttle response as a result of detected displacement about the pitch axis 290. Clockwise movement about the roll axis 288 can turn the lawnmower 100 right while counterclockwise movement about the roll axis 288 turns the lawnmower 100 left. Forward movement about the pitch axis 290 can move the lawnmower 100 forward while rearward movement about the pitch axis 290 can move the lawnmower 100 backwards.

In a second mixing algorithm, steering is performed by rotating the joystick 248 about the yaw axis 286 while throttle response is a result of displacing the joystick 248 about the pitch axis 290.

In other instances, the directions of displacement of the joystick 248 and the resulting movement of the lawnmower 100 may be inverted from the above descriptions. In some embodiments, the operator may be able to select between a normal mode and an inverse mode, where the inverse mode results in the opposite outcome of the normal mode for any one or more given displacement(s) of the joystick 248.

In an embodiment, the joystick 248 may be translatable along at least one of the yaw, roll, and pitch axis 286, 288 and 290. For instance, the joystick 248 may be translatable along the yaw axis 286. The yaw axis 286 is parallel with the joystick 248. As such, translating the joystick 248 along the yaw axis 286 can result in moving the joystick 248 into and out of the base 258. In one or more embodiments, translating the joystick 248 along the yaw axis 286 can change an operating mode of the lawnmower 100 between a drive mode, a park mode, an accessory mode, a bagger mode, or the like. In a particular embodiment, moving the joystick 248 along the yaw axis 286 into the base 258 can change the operating mode of the lawnmower 100. For example, moving the joystick 248 along the yaw axis 258, e.g., toward the base 258, can change the operating mode of the lawnmower 100 to park while moving the joystick 248 along the yaw axis 286 out of the base 260 can change the operating mode to drive. In certain instances, the pedal 127 (FIG. 1) may be used in concert with the joystick 248 to initiate the change in operating mode. By way of non-limiting example, depressing the pedal 127 may brake the lawnmower 100 while moving the joystick 248 along the yaw axis 286 can cause the lawnmower 100 to change to a parked mode. Translation of the joystick 248 along the yaw axis 286 may be prohibited until the lawnmower 100 reaches a complete, or nearly complete, stop. In other instances, the pedal 127 and joystick 248 can be used in lieu of one another to perform similar functions. By way of non-limiting example, the operator can change the operating mode to park using either one of the pedal 127 or joystick 248. It may be particularly useful to utilize the pedal 127 to park the lawnmower 100 if, e.g., the operator is using their hands to perform an operation and does not have readily available access to the joystick 248. In yet other instances, the pedal 127 may be omitted or perform a different function from the joystick 248. It should be understood that the joystick 248 can be used to perform yet further functions not described herein.

Figures 12, 13:
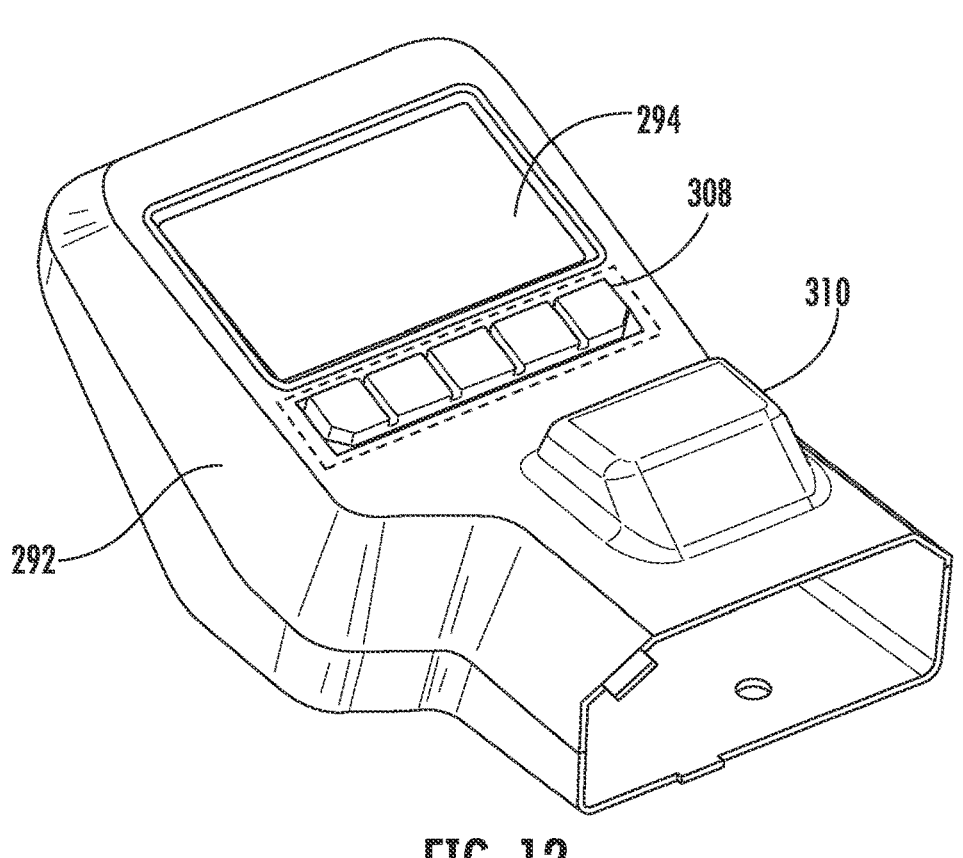
FIG. 12 is a perspective view of a human machine interface of the lawnmower in accordance with embodiments of the present disclosure.
FIG. 13 is a top view of the human machine interface in accordance with embodiments of the present disclosure.

As depicted in FIG. 1, the lawnmower can further include a human machine interface (HMI) 292 different from the user interface 242. The HMI 292 may be positioned in a location accessible to the user while seated in seat 102. For example, an HMI 292 may be positioned adjacent to either of armrest 244, 246. The HMI 292 may both convey information to the operator and receive inputs from the operator. Referring to FIGS. 12 and 13, the HMI 292 can include a display 294. By way of non-limiting example, the display 294 can be a light-emitting diode (LED) display, an organic light-emitting diode (OLED) display, an electroluminescent display (ELD), a plasma display panel (PDP), a liquid crystal display (LCD), a digital light processing (DLP) display, or the like. The display 294 can receive electrical power from one or more batteries of the lawnmower 100. In an embodiment, the display 294 may automatically turn on when the lawnmower 100 is initiated or used. In other embodiments, the operator can selectively turn on and off the display 294.

Referring to FIG. 13, the display 294 can display information to the operator. The information can include, for example, a status of the battery 296 (e.g., strength of charge), a headlight indicator 298, a bluetooth indicator 300, an operational indicator 302 (e.g., displaying drive or park), a cutting implement speed gauge 304, a wheel speed gauge 306, and the like. In some instances, the display 294 can toggle between a plurality of screens, with each screen depicted a different type of information or a different arrangement of information.

Figure 14:
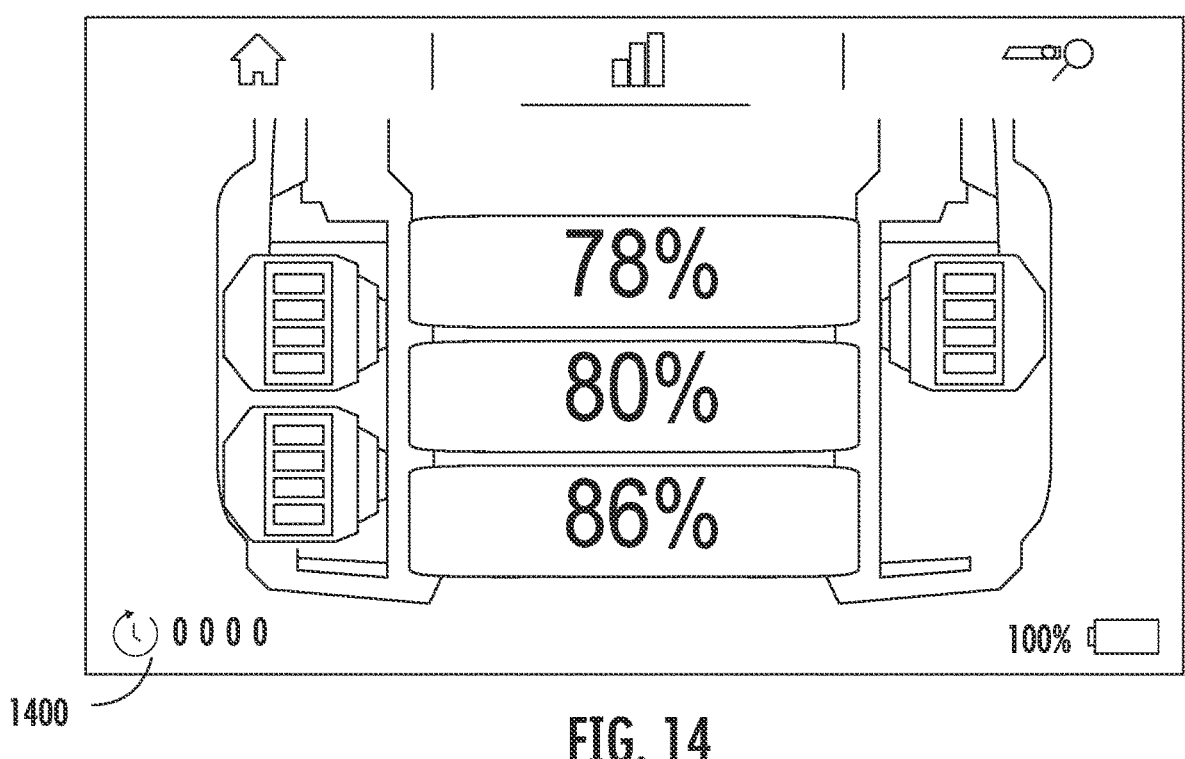
FIG. 14 is a screenshot of a window displayed by the human machine interface in accordance with embodiments of the present disclosure.
Figure 15:
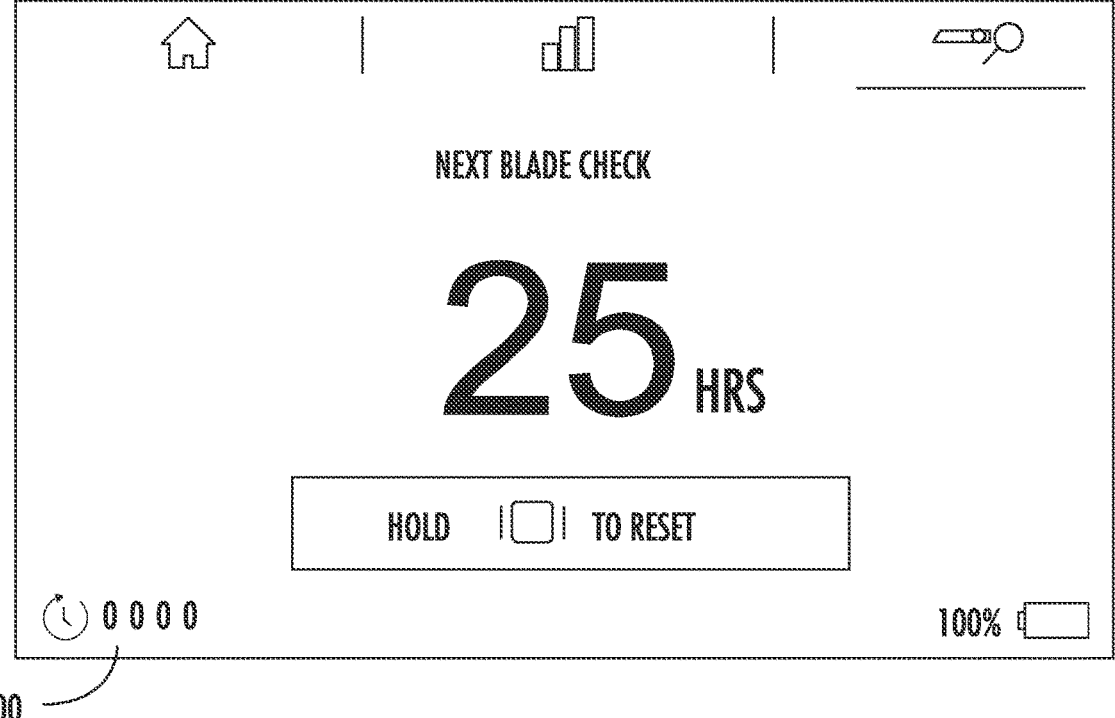
FIG. 15 is a screenshot of a window displayed by the human machine interface in accordance with embodiments of the present disclosure.

FIGS. 14 and 15 depict two exemplary screens 1400 and 1500 which may be shown on the display 294. The screen 1400 depicted in FIG. 14 shows the remaining level of charge (RLOC) of the lawnmower's batteries, described in greater detail below. RLOC may be displayed as a number (e.g., a percentage of remaining charge or a time remaining) or a graphic (e.g., a plurality of lit and unlit bars). The screen 1500 depicted in FIG. 15 shows a Next Blade Check indicator which counts down a number of run-time hours of time until the cutting implement, e.g., blade, should be checked for wear, damage, or the like. The screen 1500 further displays an instruction to the operator regarding how to reset the Next Blade Check indicator to, e.g., a factory default setting or a customizable amount of time.

Referring again to FIG. 12, in one or more embodiments, the HMI 292 can further include a plurality of buttons 308 disposed adjacent to the display 294. The buttons 308 may be configured to adjust one or more characteristics or attributes of the lawnmower 100. For instance, one of the buttons 308 can allow the operator to select between two or more ride modes (e.g., eco, light duty, and heavy duty). Another button 308 may activate or deactivate one or more lights (not illustrated) of the lawnmower 100. The lights may include any one or more of headlights, tail lights, underbody lights, accessory lights, backlights, or the like. Another button 308 can allow the operator to select between two or more mowing modes (e.g., eco, light duty, and heavy duty). Another button 308 can activate and deactivate a wireless communication transceiver, such as Bluetooth (which may, for example, permit the HMI 292 to communicate with a corresponding application on a handheld electronic device such as a smartphone, tablet, smartwatch, or the like). Another button 308 can activate and deactivate one or more auxiliary ports of the lawnmower 100, each auxiliary port being configured to be coupled with one or more accessories for use with the lawnmower 100. Yet further buttons 308 with additional functionality may be provided.

The HMI 292 can include one or more ergonomic features which position the operator in a better position when using the lawnmower 100. In the depicted embodiment, the ergonomic feature is a palm rest 310 disposed adjacent to the buttons 308. The palm rest 310 can support the operator's wrist when mowing. The palm rest 310 can include a non-slip material, a soft material, a water wicking material, or another material which provides an advantage to the operator. Other ergonomic features can include wrist pads, padded armrests, and the like.

In one or more embodiments, the HMI 292 can further include an interface area 314 having controls associated with one or more functional aspects of the lawnmower 100. The controls can include, for example, an emergency stop button 312, a key 316, and an accessory port 318 (e.g., a charging port).

In an embodiment, the interface area 314 can be disposed on one side of the seat 102 and the display 294 can be disposed on the opposite side of the seat 102. In this regard, the operator can utilize both hands to control different features of the lawnmower 100. In a particular instance, the features of the interface area 314 can relate to a first type of lawnmower 100 control while the features of the display 294 can relate to a second type of lawnmower 100 control different from the first type.

As previously described, the mower deck 114 may be adjustable, e.g., height adjustable. In this regard, the operator can selectively adjust the mower deck 114 to achieve a desired operating characteristic.

Figures 16, 17:
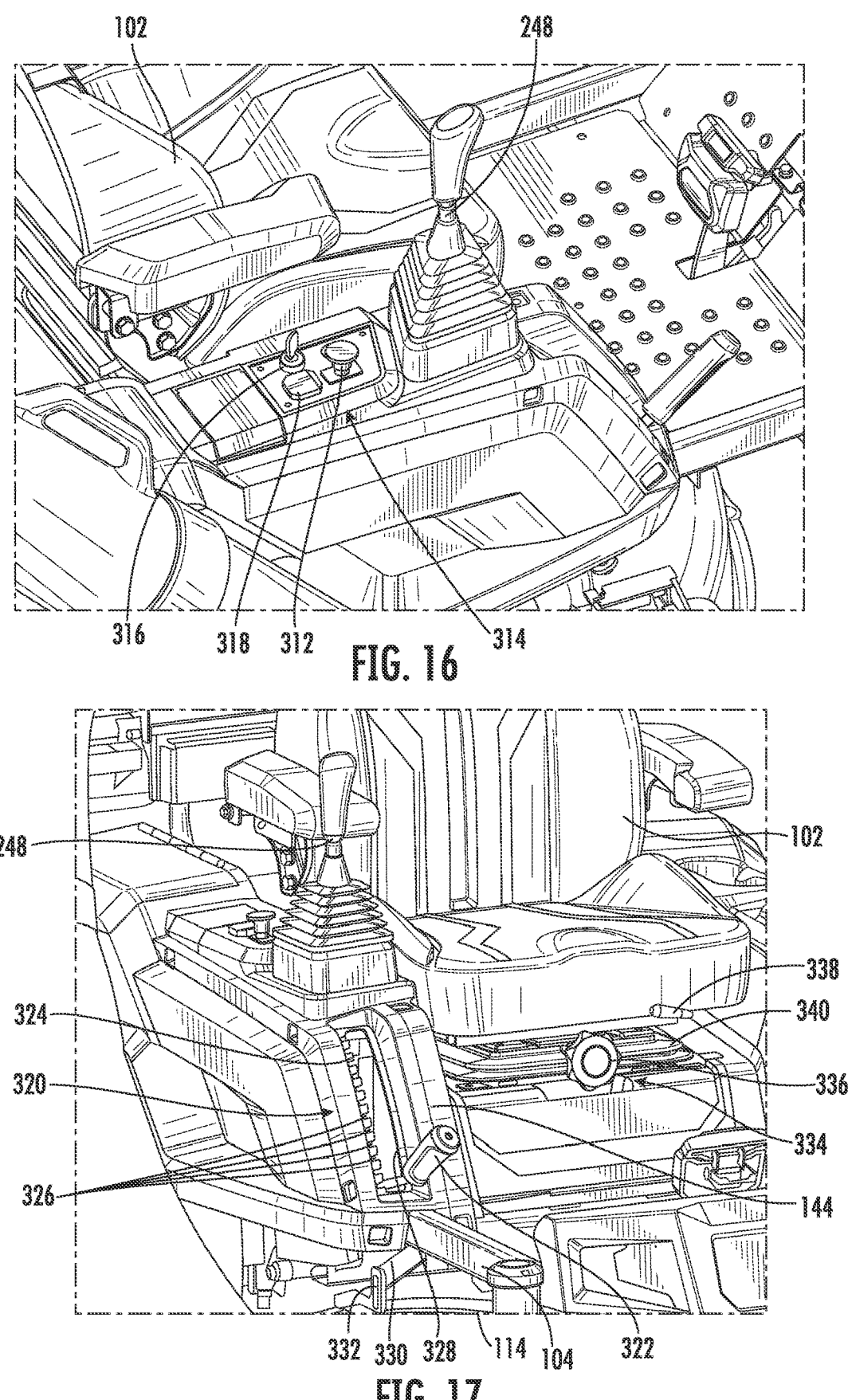
FIG. 16 is a perspective side view of a portion of the lawnmower in accordance with embodiments of the present disclosure.
FIG. 17 is a front perspective view of a portion of the lawnmower in accordance with embodiments of the present disclosure.

FIG. 17 illustrates an exemplary height adjustment mechanism 320 for adjusting the height of the mower deck 114. The height adjustment mechanism 320 can be operably coupled to the mower deck 114 such that adjusting the height adjustment mechanism 320 changes the operational height of the mower deck 114. The height adjustment mechanism 320 can include a handle 322 which is accessible to the operator. The handle 322 can extend through an interface 324 including a plurality of stop locations 326 each associated with a different operational height of the mower deck 114. As depicted, each stop location 326 can be in the form of a notch configured to selectively receive the handle 322 (or a portion thereof). A channel 328 can extend between two or more stop locations 326 to operationally connect the stop locations together. To adjust the operational height of the mower deck 114, the operator first removes the handle 322 from one of the stop locations 326 to the channel 328. Once in the channel 328 and clear of the previous stop location 326, the operator can translate the handle 322 to another stop location 326. Once the mower deck 114 is at a desired height, the operator can move the handle 322 into a corresponding stop location 326 associated with the desired height. The handle 322 can be coupled with the mower deck 114 through one or more components, such as component 330. The component 330 can dynamically couple the handle 322 to the mower deck 114, e.g., through a dynamic interface 332. The dynamic interface 332 depicted in FIG. 17 includes a pin and slot interface where the component 330 extends into a slot of the mower deck 114. The component 330 can translate within the slot, e.g., when the mower deck 114 contacts the underlying ground surface, to prevent the height adjustment mechanism 320 from becoming disengaged, e.g., the handle 322 disengaging from the selected stop location 326.

In an embodiment, the height adjustment mechanism 320 can be formed at least in part by the fairing 144. For instance, one or more (such as all) of the stop locations 326 can be defined at least in part by the fairing 144. In certain instances, the fairing 144 can support the height adjustment mechanism 320. In other instances, the fairing 144 may be bolstered by one or more support elements to prevent the fairing 144 from breaking under load.

As depicted in FIG. 17, the height adjustment mechanism 320 can be disposed on a same side of the seat 102 as the joystick 248. In another embodiment, the height adjustment mechanism 320 can be disposed at another location, such as on the opposite side of the seat 102 as compared to the joystick 248, at a central location of the lawnmower 100 (e.g., in front of the seat 102), or at another suitable location.

Still referring to FIG. 17, the seat 102 can be adjustably coupled to the frame 104 such that the seat 102 can be moved between a plurality of different positions. Exemplary adjustments include translating the seat 102 in at least one of a forward/back or lateral direction, raising and lowering the seat, tilting the seat about a laterally extending axis, or even twisting the seat about a vertically extending axis.

The seat 102 may be adjustable in the height direction. A seat height adjustment mechanism 334 can allow the operator to selectively adjust the height of the seat 102. By way of example, the seat height adjustment mechanism 334 can include a rotary knob 336 which the operator can selectively rotate to change seat height. Other seat height adjustment mechanisms 334 can include levers, buttons, cranks, or the like. In some instances, seat height adjustment may be made manually, i.e., the operator imparts force onto the knob 336. In other instances, seat height adjustment may be at least partially assisted, e.g., by a motor, actuator, or the like. In some instances, height adjustment of the seat height adjustment mechanism 334 can occur between a plurality of preset locations. In other instances, height adjustment can be infinitely adjustable over a range between the minimum height of the seat 102 and the maximum height of the seat 102.

The seat 102 may also be adjustable in a forward/back direction. In certain instances, the lawnmower 100 may include a seat translation adjustment mechanism 338. Using the seat translation adjustment mechanism 338, the operator may be able to translate the seat 102 in the forward and backward directions.

In one or more embodiments, at least one of the seat height adjustment mechanism 334 and seat translation adjustment mechanism 338 can be at least partially disposed within a protected, or semi-protected, portion of the lawnmower 100. For instance, a skirt 340 may extend over the at least one of the seat height adjustment mechanism 334 and seat translation adjustment mechanism 338. The skirt 340 may include an expandable or otherwise dynamic area, such as one or more pleats, which allow the skirt 340 to accept movement of the seat 102 relative to the frame 104 without damaging the skirt 340.

Figure 18:
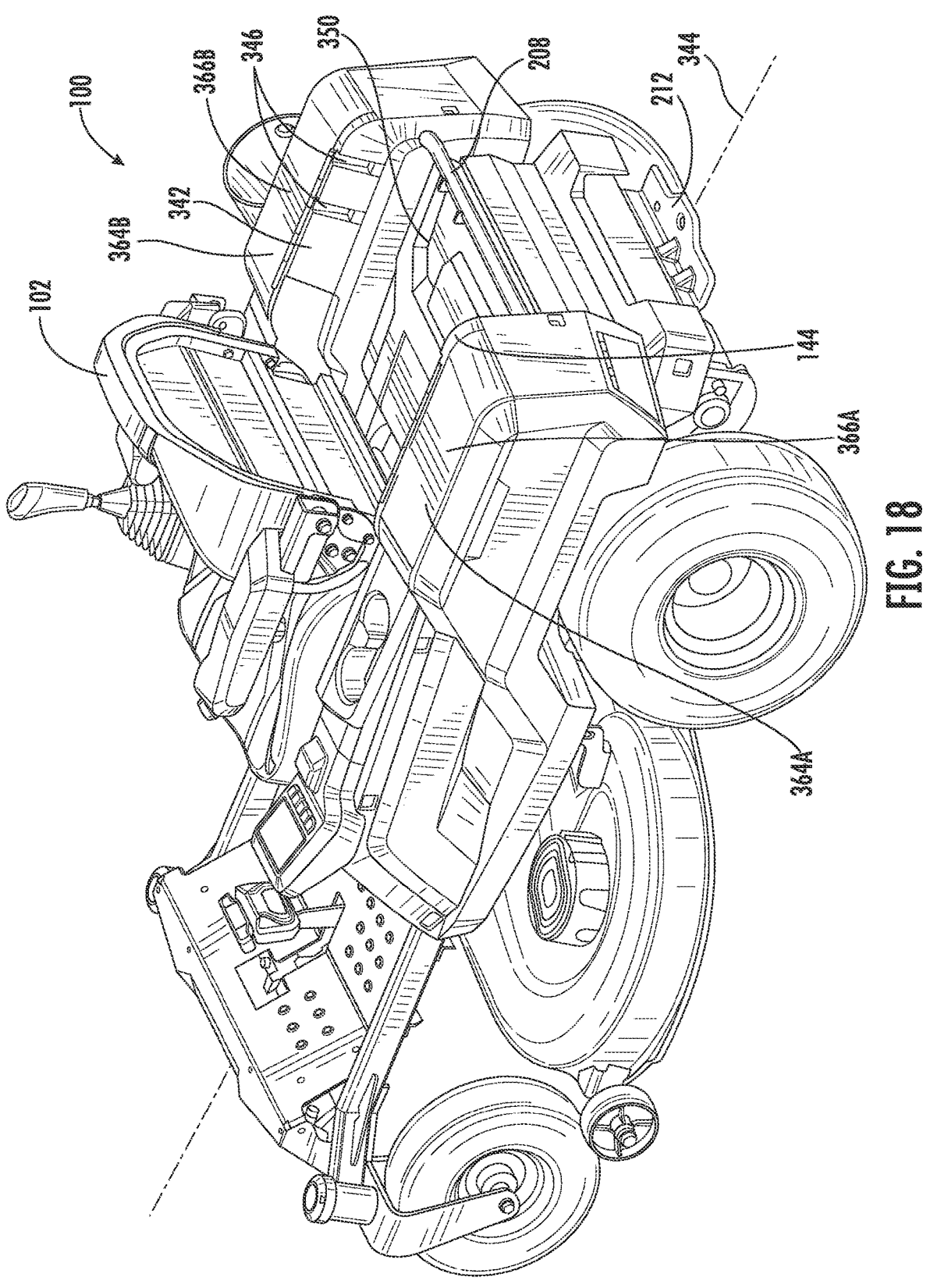
FIG. 18 is a rear perspective view of the lawnmower in accordance with embodiments of the present disclosure.

FIG. 18 illustrates a rear perspective view of the lawnmower 100 in accordance with an embodiment. The bagging system 150 (FIG. 1) is removed. Disposed behind the seat 102 is a storage area 342 defining a volume configured to receive accessories, other yard equipment, or the like. The storage area 342 can be disposed along a centerline 344 of the lawnmower 100.

In an embodiment, the storage area 342 can be defined at least in part by the fairing 144. The fairing 144 can define a structural portion of the storage area 342, e.g., a structural wall, which can include one or more integrated interfaces 346. It should be understood that the interfaces 346 may be formed separately from the fairing 144 rather than be integrated into the fairing 144.

The integrated interfaces 346 can provide connection points for receiving one or more objects.

Figures 19, 20:
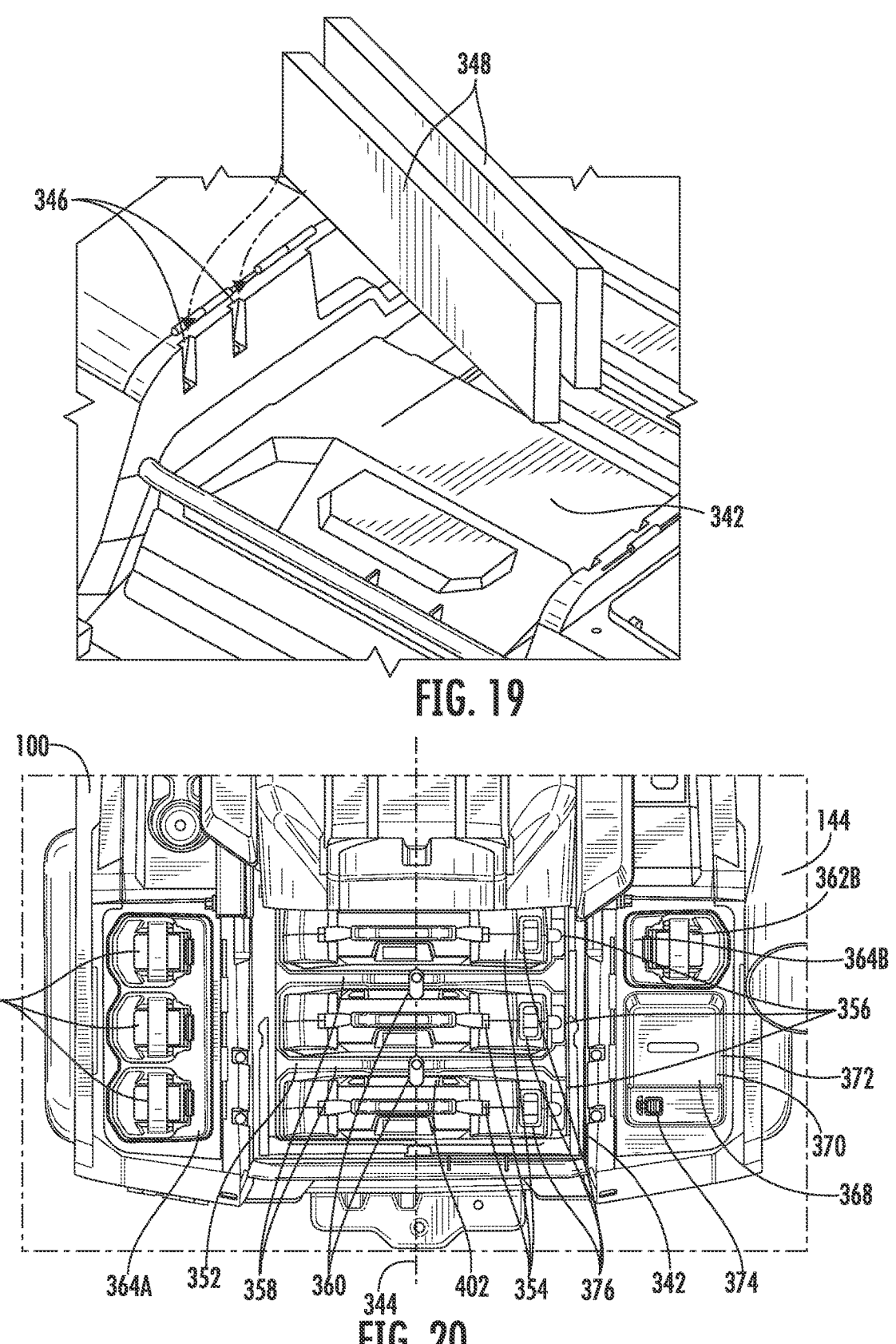
FIG. 19 is a rear perspective view of a storage area portion of the lawnmower with dividers in accordance with embodiments of the present disclosure.
FIG. 20 is a top view of a rear portion of the lawnmower in accordance with embodiments of the present disclosure.

An exemplary object is a divider 348, such as depicted in FIG. 19. The depicted dividers 348 are pieces of lumber (e.g., 2×4 lumbar). Other divider materials can include, for example, plastic, metal, alloy, or the like. The dividers 348 can be supported by the integrated interfaces 346. The operator can utilize one or more dividers 348 to subdivide the volume of the storage area 342 into two or more segments.

Another exemplary object is a bin or storage element (not shown) which the operator can selectively install in the storage area 342, e.g., using the integrated interfaces 346 for support.

Yet another exemplary object is the bagger 152 itself. In some instances, the bagger 152 can include an interface configured to engage with the integrated interfaces 346. The operator can thus install the bagger 152 on the lawnmower 100 by inserting the interface of the bagger 152 into the integrated interfaces 346. When not using the bagger 152, the operator can remove the interface of the bagger 152 from the integrated interfaces 346, which may optionally then be utilized for a different functionality (e.g., used with dividers 348).

In an embodiment, the storage area 342 can overlay one or more batteries of the lawnmower 100. A cover 350 can be disposed between the one or more batteries and the storage area 342. The cover 350 may form a waterproof interface with one or more other surfaces of the lawnmower 100 so as to seal a battery receiving area which houses the one or more batteries. The cover 350 may be moveable between an open position and a closed position (as shown in FIG. 18). In certain instances, the cover 350 can slide to move between the open and closed positions. In other instances, the cover 350 can rotate between the open and closed positions. For example, the cover 350 can be hingedly attached to the lawnmower 100 at a location behind the seat 102 and pivot about a horizontally extending axis. In an embodiment, the cover 350 automatically closes when released by the operator. In another embodiment, the cover 350 can remain open when released by the operator. With the cover 350 in the open position, the operator can access the one or more batteries described below.

FIG. 20 illustrates a top view of a rear portion of the lawnmower 100 with the cover 350 removed to show a first battery receiving area 352 which is at least partially disposed below at least a portion of the storage area 342. The first battery receiving area 352 can overlap the centerline 344 of the lawnmower 100. In an embodiment, the first battery receiving area 352 can be configured to receive a plurality of first batteries 354, such as at least two first batteries 354, such as at least three first batteries 354, such as at least four first batteries 354. Each one of the first batteries 354 can be received in a separate compartment 356 of the first battery receiving area 352. The compartments 356 can be stacked adjacent to one another in a direction along the centerline 344 with major surfaces of the first batteries 354 disposed adjacent to one another. Adjacent compartments 356 can be spaced apart by one or more walls 358 extending through the first battery receiving area 352.

In an embodiment, the first battery receiving area 352 can include a lock 360 which can be selectively moved between a locked state and an unlocked state. For instance, the lock 360 can include a rotatable knob which selectively rotates to permit one or more of the first batteries 354 to move relative to the compartments 356. In accordance with an embodiment, each of the first batteries 354 can include a discrete lock 360. In accordance with another embodiment, at least one of the locks 360 can selectively lock and unlock two or more of the first batteries 354.

Figure 21:
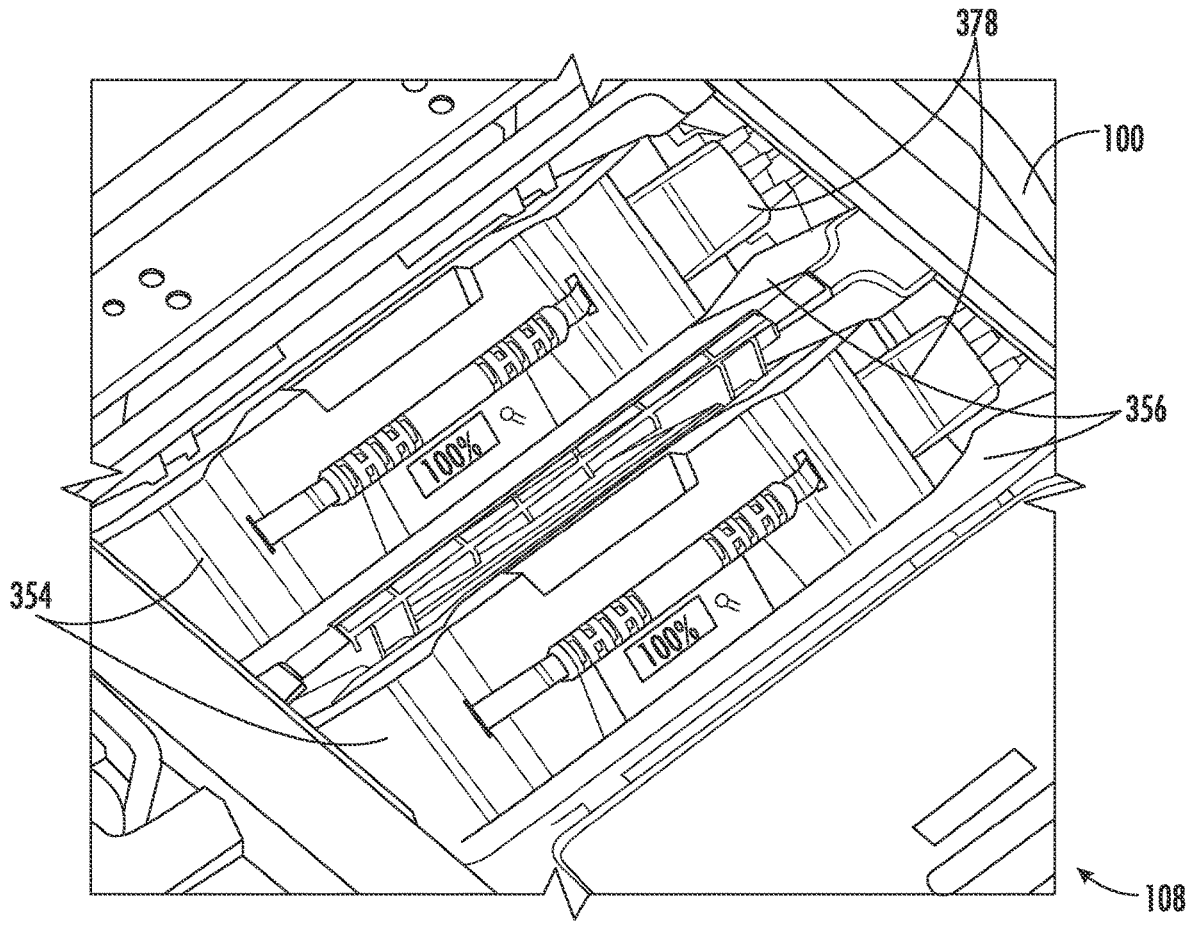
FIG. 21 is a rear perspective view of a rear portion of the lawnmower in accordance with embodiments of the present disclosure.

In the embodiment depicted in FIG. 20, the compartments 356 extend downward into the lawnmower 100 along a vertical axis. That is, the compartments 356 have vertical centerlines that are parallel with the vertical axis. In another embodiment, depicted in FIG. 21, the compartments 356 are angularly offset, i.e., canted, relative to the vertical axis by an angular displacement. The angular displacement can be at least 10° relative to the vertical axis, such as at least 20° relative to the vertical axis, such as at least 30° relative to the vertical axis, such as at least 40° relative to the vertical axis. In a particular embodiment, the compartments 356 can cant away from the seat 102 or to either lateral side of the lawnmower 100. With the first batteries 354 canted away from the seat 102, i.e., toward the rear end 108 of the lawnmower 100, or to either side of the lawnmower 100, information provided by the first batteries 354 (e.g., on one or more displays of the first batteries) may be more easily viewed by the operator when standing next to the lawnmower 100.

Referring again to FIG. 20, the lawnmower 100 can further include a plurality of second batteries 362 disposed in one or more second battery receiving areas 364. In the depicted embodiment, the second battery receiving area 364 includes a first portion 364A and a second portion 364B. The first portion 364A is disposed on a first side of the seat 102 and the second portion 364B is disposed on a second side of the seat 102 opposite the first side. In one or more embodiments, the number of second batteries 362 in the first portion 364A can be different from the number of second batteries 362 in the second portion 364B. For example, the first portion 364A can include three second batteries 362A and the second portion 364B can include one second battery 362B.

In certain instances, the cockpit may be more easily accessed by way of a particular side of the lawnmower 100. For example, referring to FIG. 1, the operator may more easily access the cockpit from the left side 110 of the lawnmower 100. Accordingly, it may be advantageous for the number of second batteries 362 in the first and second portions 364A and 364B to be different from one another. By way of example, the number of second batteries 362A can be greater than the number of second batteries 362A. In this regard, more of the second batteries 362 can be easily accessed by the operator when entering and exiting the lawnmower 100 from the left side 110. Additionally, the bagging system 150 occupies a large area of the right side 112 of the lawnmower 100 which may reduce access to the second batteries 362B.

In an embodiment, one or more of the second batteries 362A can be asymmetrically arranged with one or more of the second batteries 362B about the centerline 344. For instance, the forwardmost second battery 362A can be displaced along the centerline 344 forward of the second battery 362B and the middle second battery 362B can be displaced along the centerline 344 rearward of the second battery 362B. In this regard, the second battery 362B may not be symmetrical with any one of the second batteries 362A about the centerline 344.

Number differences, symmetrical alignments, or both between the second batteries 362A and 362B can allow for various configurations of the lawnmower 100 that are not possible with balanced, symmetrical alignments. By way of example, the bagging system 150 (FIG. 1) can cause a greater amount of weight one side of the lawnmower 100, e.g., the right side 112 (FIG. 1), with the second batteries 362A disposed on the opposite side, e.g., on the left side 110, to provide counterbalance over the centerline 344. Thus, the number of second batteries 362A may be greater than the number of second batteries 362B.

The second battery receiving area(s) 364 can be water resistant, or even waterproof. The lawnmower 100 depicted in FIG. 18 has two second battery receiving areas 364A and 364B each having a cover 366A and 366B, respectively. The covers 366A and 366B are selectively moveable to permit access to the second battery receiving areas 364A and 364B. In some instances, at least one of the covers 366A or 364B can include a window (not illustrated) to view the second battery receiving area(s) 364A or 364B.

Referring again to FIG. 20, in one or more embodiments, the lawnmower 100 can further include a storage receptacle 368. The storage receptacle 368 can be formed, e.g., by a recess 370 formed in the fairing 144. The recess 370 can define a cavity 372. The cavity 372 can be used by the operator to store various items such as personal items, mobile devices, tools, or the like. An interface, e.g., an adapter 374 can be disposed at least partially within the cavity 372. The adapter 374 can be used to electrically charge a device positioned with the cavity 372. In an embodiment, the adapter 374 includes at least one of a USB outlet, a power outlet, or the like. In another embodiment, the adapter 374 can include a wireless charging platform, including, e.g., a capacitance-type charger.

The recess 370 can be spaced apart from the centerline 344 of the lawnmower 100. In one or more embodiments, the recess 370 can be disposed adjacent to the second battery 362B. For instance, the recess 370 can be in line with the second battery 362B.

In some embodiments, the cavity 372 can be selectively covered by a cover (not illustrated). In certain instances, the cover for the cavity 372 can be the cover 366B described with respect to FIG. 18. That is, the cover 366B can cover both the second batteries 362B and the cavity 372. In other instances, the cover for the cavity 372 can include a discrete cover separate from the cover 366B.

The batteries 354 and 362 can be electrically coupled to the lawnmower 100 via electrical interfaces. For example, as illustrated in FIG. 20, the first batteries 354 can each include a terminal 376 configured to electrically interface with the lawnmower 100. Each terminal 376 can be electrically coupled with a connector 378 (FIG. 21) to electrically interface the first batteries 354 with the lawnmower 100. In a particular embodiment, each of the connectors 378 can be associated with a different compartment 356 of the first battery receiving area 352. The lawnmower 100 can have a separate connector 378 for each one of the first batteries 354, The connectors 378 can each include a complementary interface configured to be electrically coupled with terminals 376 of the first batteries 354. The complementary interface of each connector 378 can be protected, e.g., by a boot which is disposed at least partially around the connector 378 to increase weather-resistance (e.g., water resistance) of the electrical interface.

Figure 22A:
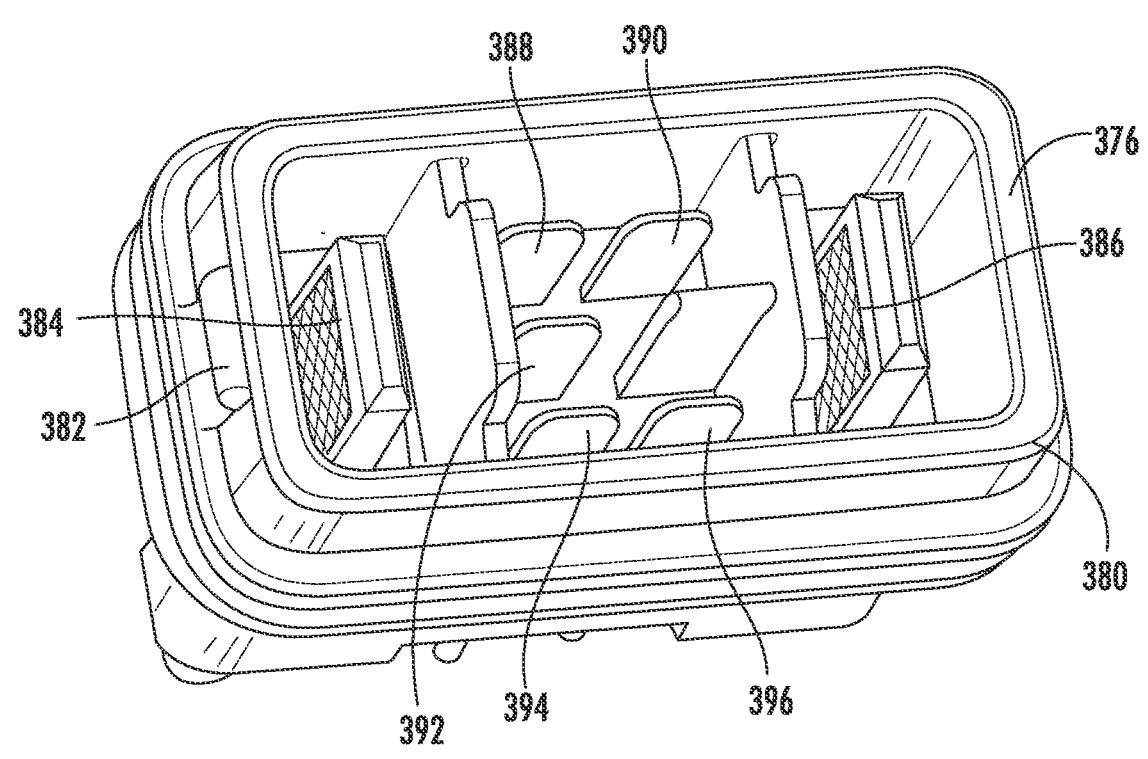
FIG. 22A is an enlarged perspective view of a terminal of a battery of the lawnmower in accordance with embodiments of the present disclosure.

FIG. 22A depicts a terminal 376 in accordance with an exemplary embodiment. The terminal 376 includes a body 380 including one or more features 382 configured to interface with the connector 378. By way of example, the connector 378 can be coupled to the terminal 376 through an interference fit, a bayonet connection, a fastened connection, a threaded connection, or the like.

The terminal 376 can include a plurality of interfaces, e.g., pins, including, e.g., a positive pin 384, a negative pin 386, a positive communication pin 388, a negative communication pin 390, a presence-detecting pin 392, a low voltage supply pin 394, and a non-specified pin 396. In certain instances, the non-specified pin 396 is omitted from the terminal 376. The positive and negative pins 384 and 386 can transmit energy from the first battery 354 to the lawnmower 100. The positive and negative communication pins 388 and 390 can communicate with a control unit of the lawnmower 100, such as through a CANbus protocol. The presence-detecting pin 392 can be configured to detect insertion of a charger (not illustrated) to the terminal 376 or detect insertion of a connector of another tool (not illustrated) to the terminal 376. The low voltage supply pin 394 can supply power for electronics of the lawnmower 100. In certain instances, the low voltage supply pin 394 can be active when operating above a prescribed voltage threshold. The non-specified pin 396 can be reserved for one or more auxiliary functionalities. The above-described terminal 376 is exemplary only. Other possible arrangements of the interfaces, e.g., pins, are contemplated herein.

Each of the first batteries 354 can be coupled to the lawnmower 100 through the terminals 376 and connectors 378 such that the same interfaces, e.g., pins, of each one of the first batteries 354 are connected together to form a single bus connection.

In an embodiment, the terminal 376 and connector 378 can be configured such that the positive and negative pins 384 and 386 contact and electrically couple with one another before any of the other interfaces, e.g., pins, of the terminal 376 are electrically coupled with the connector 378. For instance, the positive and negative pins 384 and 386 can be taller, i.e., extend further, than the other interfaces, e.g., pins, so as to interface with the connector 378 first.

Figure 22B:
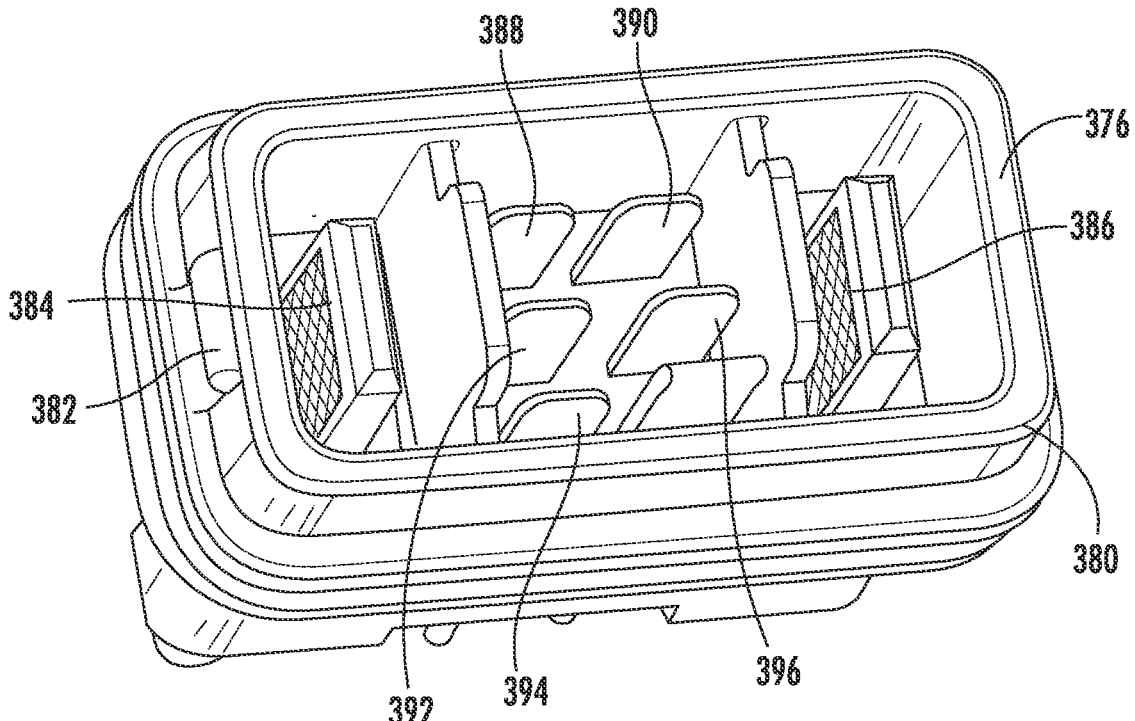
FIG. 22B is an enlarged perspective view of a terminal of a battery of the lawnmower in accordance with other embodiments of the present disclosure.

FIG. 22B depicts a terminal 376 in accordance with another exemplary embodiment of the present disclosure. In certain instances, the different terminals 376 depicted in FIGS. 22A and 22B may be used interchangeably with the lawnmower 100. For example, the lawnmower 100 can be configured to detect which terminal 376 is attached to the connector 378. The lawnmower 100 can then adjust an operating protocol in response thereto. Alternatively, or in addition, the lawnmower 100 can include different connectors 378 for the different terminals 376.

Similar to the terminal 376 depicted in FIG. 22A, the terminal 376 depicted in FIG. 22B includes a body 380 having one or more features 382 configured to interface with the connector 378. By way of example, the connector 378 can be coupled to the terminal 376 through an interference fit, a bayonet connection, a fastened connection, a threaded connection, or the like.

The terminal 376 can include a plurality of interfaces, e.g., pins, including, e.g., a positive pin 384, a negative pin 386, a positive communication pin 388, a negative communication pin 390, a presence-detecting pin 392, a low voltage supply pin 394, and a non-specified pin 396. In certain instances, the non-specified pin 396 is omitted from the terminal 376. The positive and negative pins 384 and 386 can transmit energy from the first battery 354 to the lawnmower 100. The positive and negative communication pins 388 and 390 can communicate with a control unit of the lawnmower 100, such as through a CANbus protocol. The presence-detecting pin 392 can be configured to detect insertion of a charger (not illustrated) to the terminal 376 or detect insertion of a connector of another tool (not illustrated) to the terminal 376. The low voltage supply pin 394 can supply power for electronics of the lawnmower 100. In certain instances, the low voltage supply pin 394 can be active when operating above a prescribed voltage threshold. The non-specified pin 396 can be reserved for one or more auxiliary functionalities. The above-described terminal 376 is exemplary only. Other possible arrangements of the interfaces, e.g., pins, are contemplated herein.

Each of the first batteries 354 can be coupled to the lawnmower 100 through the terminals 376 and connectors 378 such that the same interfaces, e.g., pins, of each one of the first batteries 354 are connected together to form a single bus connection.

In an embodiment, the terminal 376 and connector 378 can be configured such that the positive and negative pins 384 and 386 contact and electrically couple with one another before any of the other interfaces, e.g., pins, of the terminal 376 are electrically coupled with the connector 378. For instance, the positive and negative pins 384 and 386 can be taller, i.e., extend further, than the other interfaces, e.g., pins, so as to interface with the connector 378 first.

Figure 22C:
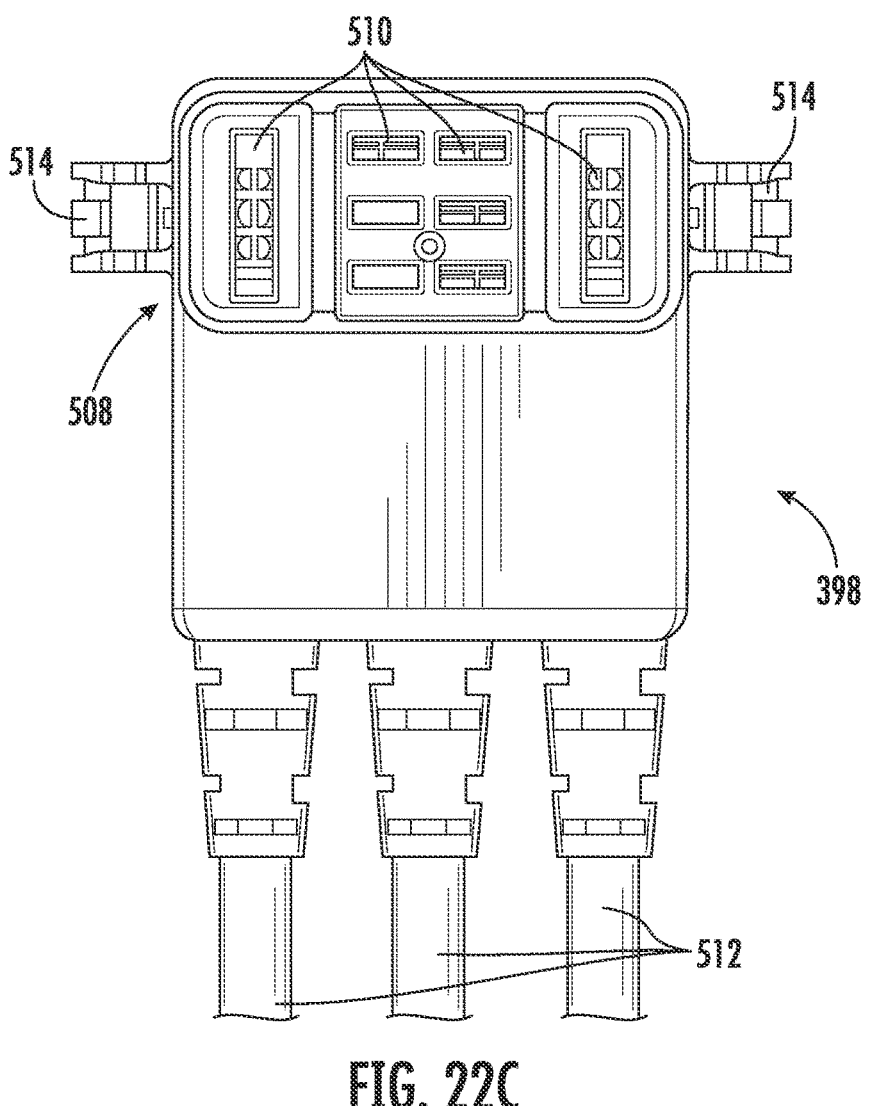
FIG. 22C is a normal view of a connector for interfacing with the lawnmower in accordance with embodiments of the present disclosure.

FIG. 22C depicts a view of a complementary interface 508 of the connector 378 which is configured to interface with the terminal 376. The interface 508 includes ports 510 configured to interface with any one or more of the pins 384, 386, 388, 390, 392, 394 and 396. The ports 510 can be in electrical communication with the lawnmower 100, e.g., a processor of the lawnmower 100, through one or more wired interfaces 512. The aforementioned one or more features 382 of the terminal 376 can be configured to interface with one or more complementary features 514 of the connector 378.

Figure 22D:
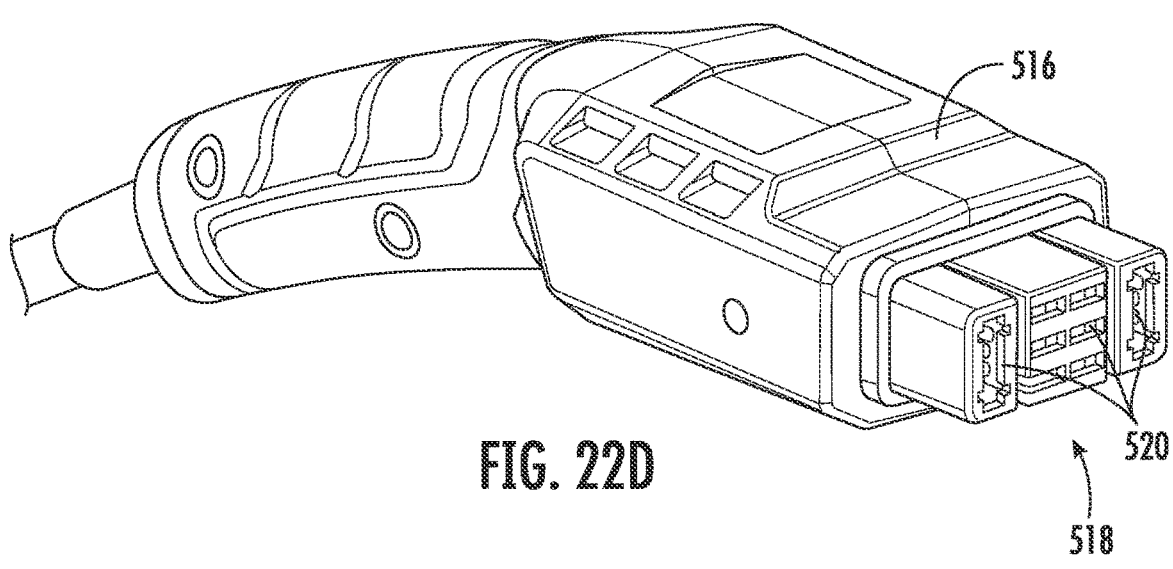
FIG. 22D is a perspective view of a connector for a charger for interfacing with a battery of the lawnmower in accordance with embodiments of the present disclosure.

FIG. 22D depicts a view of a connector 516 for a charger that may be used with the terminal 376 to provide electrical power to the battery 354. The connector 516 can include an interface 518 with an arrangement similar to the aforementioned complementary interface 508. For instance, the interface 518 of the connector 516 can include ports 520 which interface with any one or more of the pins 384, 386, 388, 390, 392, 394 and 396. In certain instances, the connector 516 may be used when the lawnmower 100 is to be charged while the connector 378 can be used when the lawnmower 100 is being actively used, i.e., the energy contained in the battery 354 is being used to power the lawnmower 100.

In one or more embodiments, the batteries may be coupled to a power source, e.g., charged, through a charge connector of the lawnmower. For instance, the lawnmower can include a terminal for receiving the connector from the charger. The terminal can be electrically coupled with the batteries. In this regard, the batteries can be charged without being removed from the lawnmower. In one or more embodiments, the batteries may be additionally or alternatively charged outside of the lawnmower, e.g., at their individual terminals. In this regard, the connector can have an interface configured to interface with either/both of the charge connector of the lawnmower and the terminal of the battery.

Figure 23:
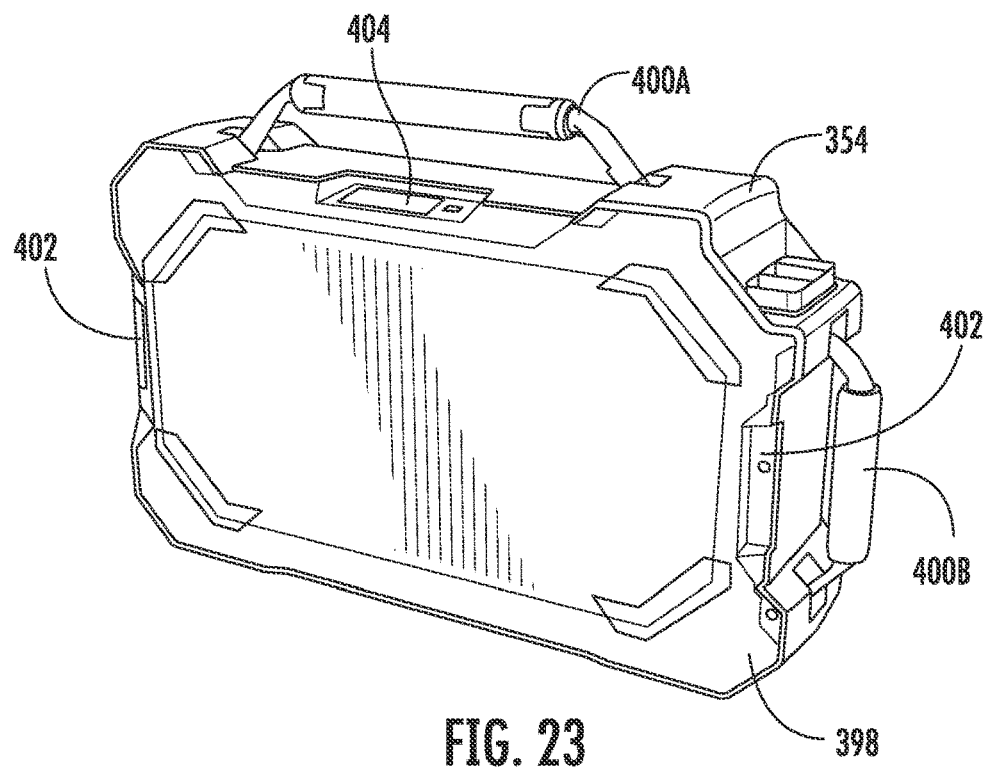
FIG. 23 is a perspective view of the battery in accordance with embodiments of the present disclosure.

FIG. 23 illustrates a perspective view of an exemplary first battery 354. The first battery 354 can generally include a body 398 and one or more handles 400, such as a first handle 400A and a second handle 400B, coupled to the body 398. In an embodiment, the first and second handles 400A and 400B can be disposed on different sides of the first battery 354. The first and second handles 400A and 400B can be disposed at locations which allow the operator to grip the first battery 354 in a plurality of different orientations. In certain instances, the first battery 354 may be installable in a plurality of different orientations relative to the compartment 356 or a receiving area of a different piece of equipment. In certain instances, the handles 400 can be deformable such that the handles 400 do not interfere with the compartment 356, e.g., when inserting the first batteries 354 into the compartments 356.

As described with respect to FIG. 20, the lawnmower 100 can include one or more locks 360 which are engageable with the first battery 354 to secure the first battery 354 within the compartment 356 of the lawnmower 100. The first battery 354 can include a lock receiving area 402 which is configured to interface with the lock 360 to lock the first battery 354 in the compartment 356. In accordance with an embodiment, the lock receiving area 402 can include a notch or surface which forms an interference fit with the lock 360. When the lock 360 is in the closed position, the notch or surface can interact with the lock 360 to prevent the first battery 354 from translating out of the compartment 356.

In one or more embodiments, the first battery 354 can include a plurality of lock receiving areas 402. For instance, the plurality of lock receiving areas 402 can include the lock receiving area 402 illustrated in FIG. 20 and one or more additional lock receiving areas 402, e.g., as depicted in FIG. 23. In such a manner, the lock receiving areas 402 (depicted in FIGS. 20 and 23) can be used with the first battery 354 at a plurality of different orientations relative to the compartment 356. Moreover, the first battery 354 may also be used with additional types of equipment having different compartment shapes which require different installation orientations of the first battery 354.

The first battery 354 can include a display 404. The display 404 can include, e.g., a light-emitting diode (LED) display, an organic light-emitting diode (OLED) display, an electroluminescent display (ELD), a plasma display panel (PDP), a liquid crystal display (LCD), a digital light processing (DLP) display, or the like. The display 404 can receive electrical power from the first battery 354. In an embodiment, the display 404 may automatically turn on when the first battery 354 is moved, e.g., the display 404 may initiate upon detection of movement. In another embodiment, the display 404 may automatically turn on when the first battery 354 is electrically coupled to the lawnmower 100 (or another piece of equipment). In yet another embodiment, the display 404 can be manually turned on by the operator. In certain instances, the display 404 is configured to remain on for a prescribed duration of time after which the display 404 can turn off The display 404 can display information to the operator. The information can include, for example, a status of the first battery 354 or the like. In some instances, the display 404 can be toggled between a plurality of screens, with each screen depicted a different type of information or a different arrangement of information.

Figure 24:
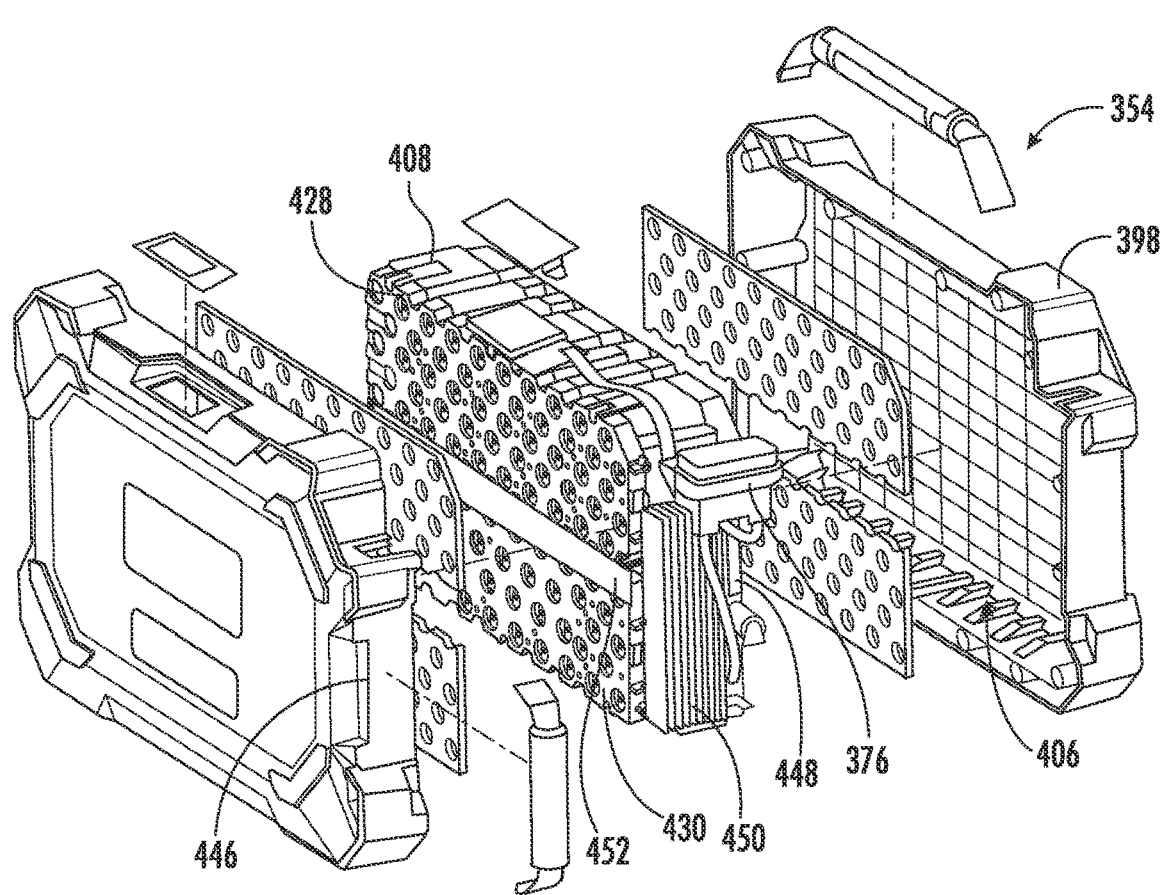
FIG. 24 is an exploded view of the battery in accordance with embodiments of the present disclosure.
Figures 25, 26:
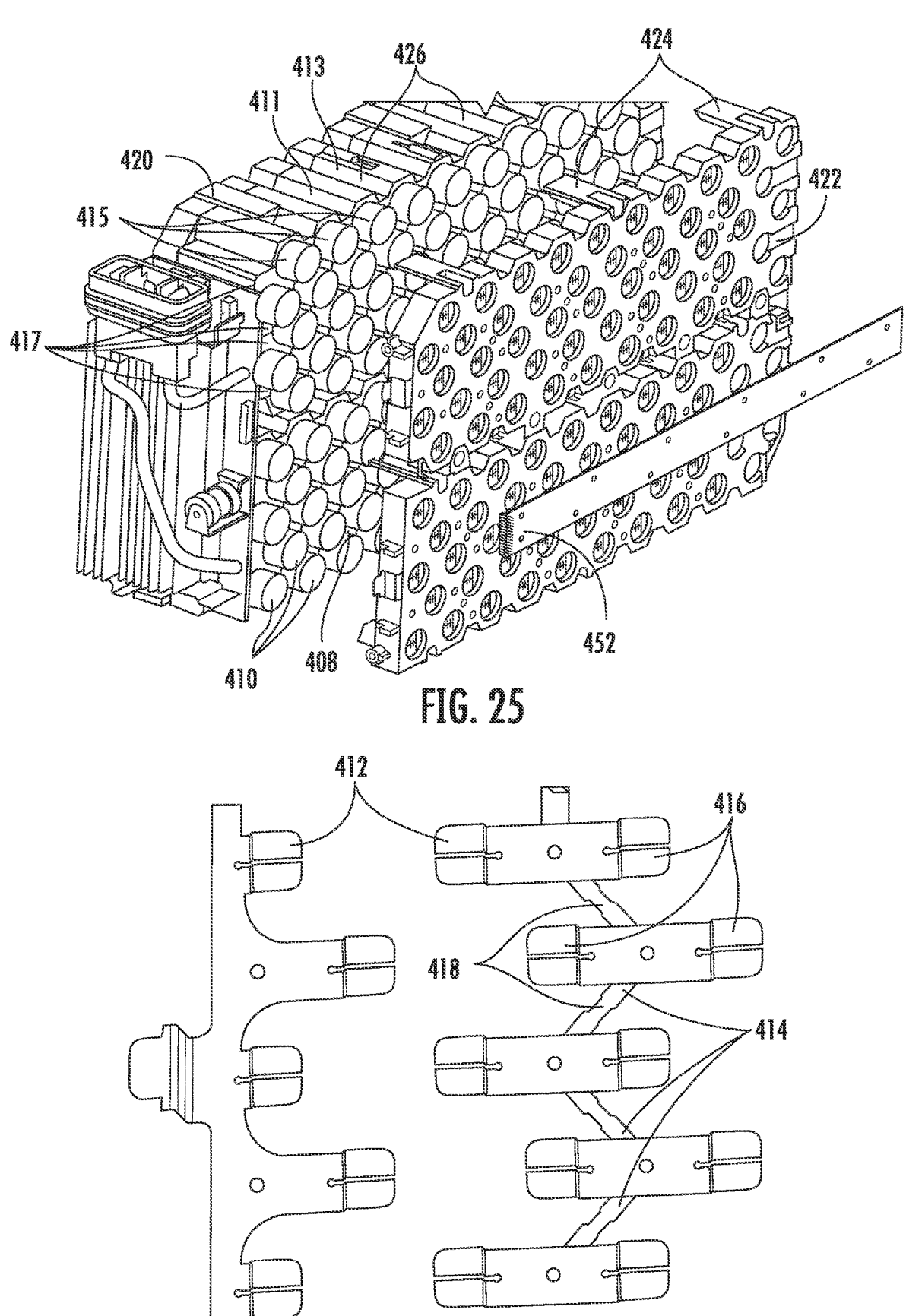
FIG. 25 is a partially exploded view of a portion of the battery in accordance with embodiments of the present disclosure.
FIG. 26 is a perspective view of strap links used to electrically couple individual battery cells of the battery together in accordance with embodiments of the present disclosure.

FIG. 24 illustrates an exploded view of the first battery 354 in accordance with an exemplary embodiment. FIG. 25 illustrates a partially exploded view of a portion of the first battery 354. As depicted in FIG. 24, the body 398 of the first battery 354 defines an internal cavity 406. The body 398 can have a split shell construction including first and second shells that are coupled together at one or more fluidly resistant interfaces, e.g., waterproof interfaces. There are many possible configurations of the first battery 354. Features described below are exemplary of the features included, but not required, for the first battery 354.

The first battery 354 can include a battery core 408 with a plurality of individual battery cells 410 (FIG. 25) connected together. In an embodiment, the battery core 408 can include 100 cells arranged in 20 groups of 5 cells connected in series (20s5p). The individual battery cells 410 of the battery core 408 may be electrically coupled together The individual battery cells 410 can be electrically coupled together through strap links 412 shown in FIG. 26. In an embodiment, the strap links 412 can be fused to the individual battery cells 410. The strap links 412 can be formed from a conductive material. The strap links 412 can include channels 414 and landings 416. The landings 416 can be fused to the individual battery cells 410. The channels 414 can extend between and connect the landings 416. Once installed on the individual battery cells 410, the strap links 412 can enable the first battery 354 to power the lawnmower 100 using power from each individual battery cell 410.

In an embodiment, the strap links 412 can include frangible portions 418 which are configured to fail if one or more operating parameters (e.g., current) exceeds a threshold value. The frangible portions 418 can be disposed on the channels 414. In certain instances, the frangible portions 418 can include narrowed portions of the channel 414. The narrowed portions can be configured to blow if the threshold value of the one or more operating parameters, e.g., current, is exceeded. In this regard, the individual battery cells 410 can operate in parallel while mitigating safety and operational concerns.

In one or more embodiments, strap links 412 can be integrated into support structure 411. For instance, the strap links 412 can be coupled to the support structure 411 using any one or more of tabs, overmolding, adhesive, or the like.

Referring again to FIG. 25, the individual battery cells 410 can be at least partially contained in a support structure 411. In a particular embodiment, the individual battery cells 410 can extend from, i.e., emerge from, the support structure 411 at a location whereby the individual battery cells can be electrically connected together using one or more of the aforementioned strap links 412.

The support structure 411 can include a body 413 which defines a plurality of openings 415 in which the individual battery cells 410 can be disposed. In an embodiment, the body 413 can be formed from a soft- or medium-hardness material, such as a soft- or medium-hardness ethylene propylene diene monomer (EPDM). The material can include one or more additives, such as a flame retardant. The body 413 can be shaped such that the material of the support structure 411 has good surface contact with the individual battery cells 410. As used herein, good surface contact is intended to refer to a condition when at least 95% of the contactable surface area of each individual battery cell 410 (i.e., the portion of each battery cell 410 which does not extend from the support structure 412) is contacted by the support structure 411, such as at least 97% of the contactable surface area is contacted, such as at least 99% of the contactable surface area is contacted, such as at least 99.9% of the contactable surface area is contacted. Good surface contact can increase thermal conduction which can in turn help cool the individual battery cells 410. In an embodiment, the support structure 411 includes a single body. In another embodiment, the support structure 411 can include a plurality of discrete components, such as a plurality of elongated, rippled structures 417 that can be stacked together to form the body 413.

The support structure 411 can be coupled with other supporting elements. For instance, FIG. 25 depicts end caps 420 and 422 which can be coupled to the support structure 411. In an embodiment, the end caps 420 and 422 can include posts 424 which are received in channels 426 of the supsport structure 411. In another embodiment, the support structure 411 can include the posts 424 which can be received in channels 426 on one or both of the end caps 420 and 422. The end caps 420 and 422 can form a snug fit with the support structure 411, the individual battery cells 410, the links 412, or any combination thereof In an embodiment, the core 408 can include a split core, including a plurality of core segments, e.g., segments 428 and 430 depicted in FIG. 24. The segments 428 and 430 can be discrete and separate from one another. That is, for instance, the segments 428 and 430 can be individually assembled. In this regard, detected issues which each segment 428 and 430 can be handled without requiring the entire core 408 be assembled or connected together. This can reduce manufacturing time and costs.

The segments 428 and 430 can be disposed adjacent to one another within the internal cavity 406. For instance, as depicted, the segment 428 is disposed above the segment 430. In an embodiment, the segments 428 and 430 can be joined together prior to installation within the internal cavity 406.

Figure 27:
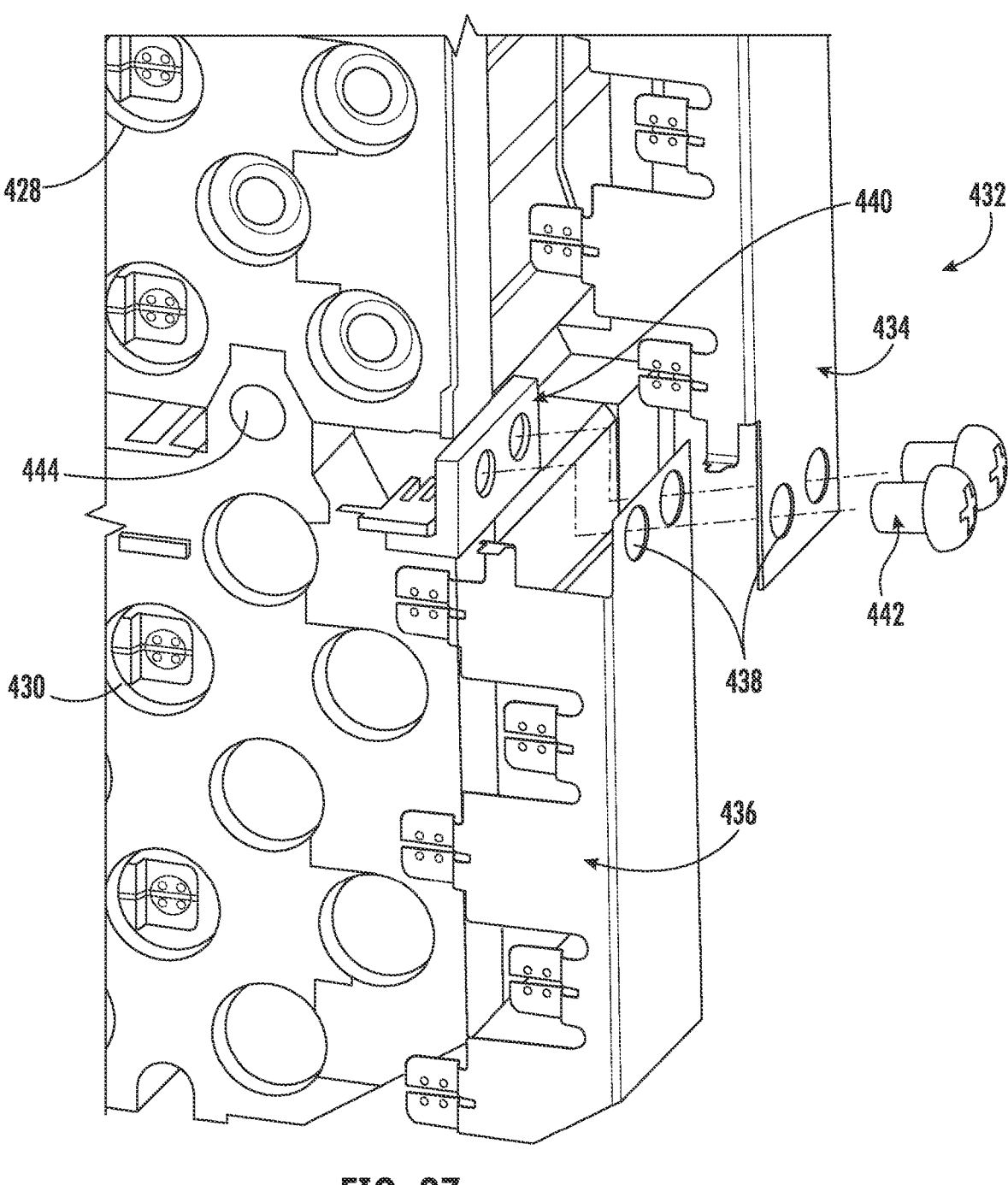
FIG. 27 is a perspective view of a quick connect portion between segments of a core of the battery in accordance with embodiments of the present disclosure.

The segments 428 and 430 can be electrically coupled together, e.g., using a quick connect interface. FIG. 27 illustrates a view of an exemplary quick connect interface 432 for coupling the segments 428 and 430. As depicted, the quick connect interface 432 includes a first link 434 associated with the segment 428 and a second link 436 associated with segment 430. By way of example, the first and second links 434 and 436 can be electrically coupled, e.g., fused, to strap links 412 of each segment 428 and 430 of the core 408. In one or more embodiments, the strap links 412 can be molded into the end caps 420 and 422 and the first and second links 434 and 436 can be separately attached and electrically connected to the segments 428 and 430, respectively, during manufacturing.

The first and second links 434 and 436 can each include an interface, e.g., one or more openings 438, which are alignable with one another. A nut 440 can be further aligned with the one or more openings 438 such that a fastener 442 can extend through the one or more openings 438 in both of the first and second links 434 and 436 and engage with the nut 440. The nut 440 may be coupled to one of the segments 428 or 430, e.g., by a flange installed within a groove of the coupled segment 428 or 430.

The fastener 442 can be formed from a conductive material. Thus, engaging the fastener 442 with the nut 440 can electrically connect the first and second links 434 and 436 together. The quick connect interface 432 can be duplicated on one or more other sides of the core 408. In one or more embodiments, the quick connect interface 432 can form a structural interface between the segments 428 and 430 in addition to the aforementioned electrical interface. In another embodiment, the segments 428 and 430 can include other structural connectors, such as, e.g., complementary mating components 444 that receive a fastener therebetween to secure the segments 428 and 430 together.

Referring again to FIG. 24, the first battery 354 can further include an anchor point 446 configured to receive and anchor an accessory (not illustrated) to the first battery 354. By way of non-limiting example, the anchor point 446 can include an opening extending into the body 398 and having a mating interface (e.g., threads, bayonet fitting, interference feature, snap fit features, or the like) configured to be coupled with a complementary mating interface of the accessory. In a particular embodiment, the anchor point can include an in-molded nut. By way of example, the accessory can include a spotlight, a speaker, a charging adapter, a tool, or even a solar panel. The accessory can include an electrical coupler which can be electrically coupled with the terminal 376 to receive power from (or even charge) the first battery 354.

The first battery 354 can further include a circuit board 448. The circuit board 448 can include elements which perform one or more electrical processes. A heat sink 450 can be coupled with the circuit board 448 for cooling. In an embodiment, the circuit board 448 can span the segments 428 and 430 of the core 408. For instance, one side of the circuit board 448 can be coupled to segment 428 by one or more fasteners and the other side of the circuit board 448 can be coupled to segment 430 by one or more fasteners. In certain instances, the circuit board 448 can act as a support to keep the segments 428 and 430 of the core 408 physically coupled together.

In an embodiment, the core 408 can have one or more sensors, such as one or more current sensing elements 452. The current sensing element(s) 452 can sense current at one or more of the segments 428 and 430 of the core 408. For instance, each of the segments 428 and 430 can have its own current sensing element 452. Each current sensing element 452 can provide specific information about its respective segment 428 and 430. The information can be used by the lawnmower 100, e.g., a processor of the lawnmower 100, or by an operator or technician to monitor and even adjust the first battery 354, the lawnmower 100, or the like.

A surface coating can be applied along one or more features of the first battery 354, such as along the circuit board 448, the core 408 (or portions thereof), the terminal 376, or the like. The surface coating can form a protective surface against weathering. In an embodiment, the surface coating can be applied using a vapor deposition process, such as vacuum vapor deposition. The surface coating can have a thickness in a range between 1 nanometer (nm) and 10 nm, such as in a range between 3 nm and 5 nm.

Referring again to FIG. 20, the second batteries 362 can be used in combination with the first batteries 354 to power the lawnmower 100. In an embodiment, the first batteries 354 have higher operating voltages than the second batteries 362. For instance, the first batteries 354 can be 80V and the second batteries 362 can be 40V batteries.

The first batteries 354 can operate as primary batteries for powering one or more aspects of the lawnmower 100. For instance, the first batteries 354 can power the walking element, the motors 140, or a combination thereof. The second batteries 362 can operate as secondary batteries which support the first batteries 354. For instance, the second batteries 362 can power one or more auxiliary aspects of the lawnmower, e.g., the boost system 168, or provide supplemental power when a detected level of charge of the first batteries 354 is below a threshold amount.

In one or more embodiments, the lawnmower 100 is operable only when at least one of the first batteries 354 is present and electrically coupled to the lawnmower 100. In certain instances, the second batteries 362 may not be sufficient to power the lawnmower 100 without the first batteries 354 present. In an embodiment, the second batteries 362 may initiate discharge, i.e., power the lawnmower 100, only when the lawnmower 100 or a component thereof reaches a prescribed threshold, e.g., at such time when the first batteries 354 are at or below a threshold charge level. By way of non-limiting example, the threshold charge level can be 30% charge. When the first batteries 354 are below this threshold charge, the second batteries 362 can begin to provide supplemental power to the lawnmower 100. In certain instances, the lawnmower 100 may operate at a reduced capacity when the second batteries 362 are in use. For instance, the lawnmower 100 may operate at a reduced speed or prevent certain auxiliary functions (e.g., operator cooling) when the second batteries 362 are in use. This may be referred to as a limp home mode. In limp home mode, the lawnmower 100 may automatically disengage use of the cutting implement(s) 132 or reduce operating speed thereof or shutoff/prevent certain auxiliary function in order to reduce energy consumption. Such reduced energy consumption may, for example, permit lawnmower 100 to return to a storage location or a location where first batteries 354 can be charged.

Figures 28, 29:
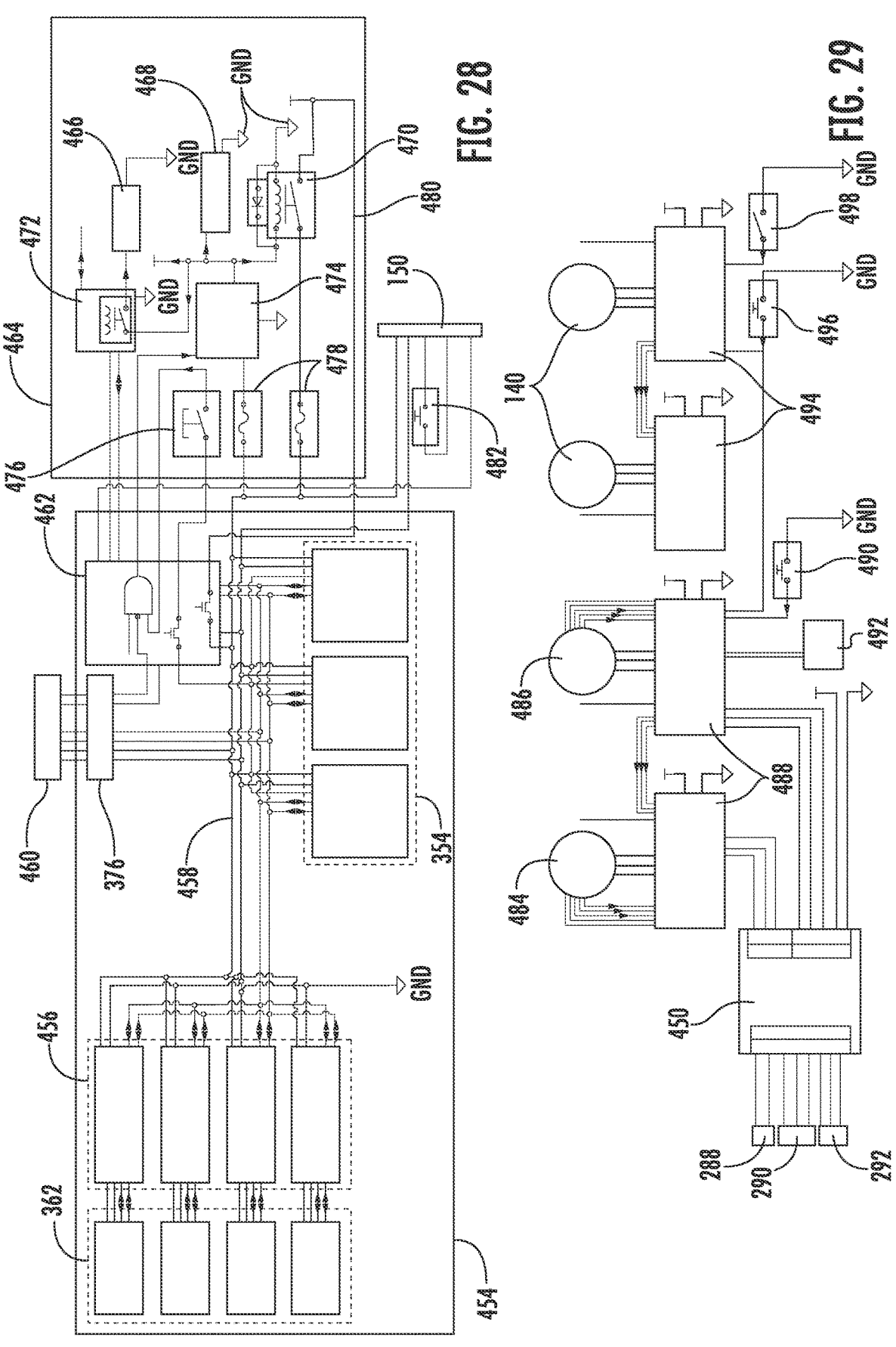
FIG. 28 is a schematic of components of the lawnmower in accordance with embodiments of the present disclosure.
FIG. 29 is a schematic of components of the lawnmower in accordance with embodiments of the present disclosure.

FIG. 28 illustrates a schematic of a power section 454 and one or more accessories 464 of the lawnmower 100. The power section 454 includes four second batteries 362 coupled with boosters 456. The boosters 456 are coupled to the first batteries 354 along a common rail 458. In the depicted embodiment, the boosters 456 can boost the voltage supplied by the second batteries 362 to the voltage of the first batteries 354. For instance, the common rail 458 can be an 80V rail, the first batteries 354 can be 80V batteries, and the second batteries 362 can be 40V batteries which are boosted to 80V by the boosters 456. As another example, the first batteries can be batteries with an operating voltage greater than 50V, including, 56V, 72V and 80V, and the second batteries can be batteries with an operating voltage less than 50V, including 1.2V, 1.5V, 3.6V, 4V, 4.2V, 10.8V, 12V, 12.6V 14.4V, 18V, 20V, 28V, 40V, and 48V.

The common rail 458 can be electrically coupled with the terminal 376 which can receive charge from a charger 460. A tool interface controller (TIC) 462 can be in communication with the terminal 376 and one or more accessories 464 of the lawnmower 100. Exemplary accessories 464 include a headlight 466, a charging port 468 (e.g., adapter 374), a power relay 470, a human machine interface 472 (e.g., a display), and the like. In the depicted embodiment, other components include a DC/DC buck converter 474, a key switch 476, and fuses 478. In certain instances, the accessories 464 can include a solar panel.

The accessories 464 can be coupled to the power section 454 through a pre-charge circuit 480. The pre-charge circuit 480 can limit current spikes, e.g., when the lawnmower 100 is initially activated and the capacitors of the accessories 464 are not yet up to full charge.

In an embodiment, the pre-charge circuit 480 can be associated with the lawnmower 100 itself. That is, the pre-charge circuit 480 can be part of the lawnmower 100 and remain with the lawnmower 100 even when one or more of the batteries are removed therefrom. In this regard, the pre-charge circuit 480 may not be part of a battery management system (BMS) associated with each one of the batteries. In another embodiment, the pre-charge circuit 480 can be partly disposed on the lawnmower 100 and be part of the BMS.

The pre-charge circuit 480 may be activated when a power bus of the lawnmower 100 is turned on. This may result from the BMS of one or more of the batteries executing the pre-charge circuit 480. In certain instances, a tool interface controller (TIC) board can execute the pre-charge circuit 480 based on a discharge state request of the operator.

The pre-charge circuit 480 may reduce electronic wear (e-cap) by reducing in-rush current. Additionally, the pre-charge circuit 480 can reduce relay wear through arc suppression. The pre-charge circuit 480 can allow for more conservative short-circuiting and current overloading thresholds which can enhance hardware protection behaviors. The pre-charge circuit 480 can act as a short-circuit detection at start-up, e.g., at lower currents.

In an embodiment, the bagging system 150 (FIG. 1) can include a bagger switch 482. The bagger switch 482 can detect when the bagger 152 is present or not present. In certain instances, the bagger switch 482 can be in communication with the TIC 462. The TIC 462 may perform a function when the bagger switch 482 detects no bagger 152 is present. For instance, the TIC 462 may disable a tool (e.g., the cutting implements 134) of the lawnmower 100 when the bagger 152 is not present.

FIG. 29 illustrates a motor control schematic in accordance with an exemplary embodiment. The motor control schematic depicts left and right wheel motors 484 and 486, and motors 140 for the left and right cutting implements 134. Each of left and right wheel motors 484 and 486 can be in communication with a drive controller 488. The controllers 488 may be in communication with a mixing board 450 which is configured to execute the aforementioned mixing algorithm(s) in response to input received from the joystick 248 in the pitch axis 288, the roll axis 290, and the yaw axis 286. The controllers 488 may be in further communication with a brake switch 490 and an audible generator 492. The motors 140 can be in communication with deck controllers 494. The deck controllers 494 can be in communication, e.g., with a seat switch 496 and a power turn off (PTO) 498. The deck controllers 494 can control the cutting implements 134 in response to the status of the lawnmower 100.

FIG. 30 illustrates a bottom view of the lawnmower 100 including one or more cutting implements 134 disposed below the mower deck 114. The cutting implements 134 can be mowing blades. In an embodiment, the cutting implements 134 can each include a crosscut blade. Dual blade designs may increase performance. The crosscut blades can each include a coating configured to disrupt air flow across the blade and a sweep feature configured to minimize air vortices generated by the rotating blades.

In certain instances, the lawnmower 100 can further include a cooling circuit 500 depicted in FIG. 31. The cooling circuit 500 can be configured to cool the batteries (e.g., the first or second batteries 354 or 362), the operator disposed on the seat 102, or both. The cooling circuit 500 can include, e.g., a fan 502 configured to bias cooling fluid, e.g., air, to the operator, the batteries, or both.

In an embodiment, the fan 502 can be operably coupled to the batteries through a first conduit 504 and coupled to the cockpit where the operator resides through a second conduit 506. When active, the fan 502 can selectively bias cooling fluid through the first or second conduits 504 or 506 to the batteries or operator, respectively. The conduits 504 and 506 can be selectively closed to direct cooling fluid in a desired manner. For instance, the operator can select to close the second conduit 506 when operator cooling is not desired and utilize only the first conduit 504 to cool the batteries. Conversely, the operator can close the first conduit 504 when battery cooling is not desired and utilize only the second conduit 506 to cool the operator. Similarly, the first and second conduits 504 and 506 can both be opened or closed at the same time to allow for cooling of both the batteries and the operator simultaneously.

Figure 32:
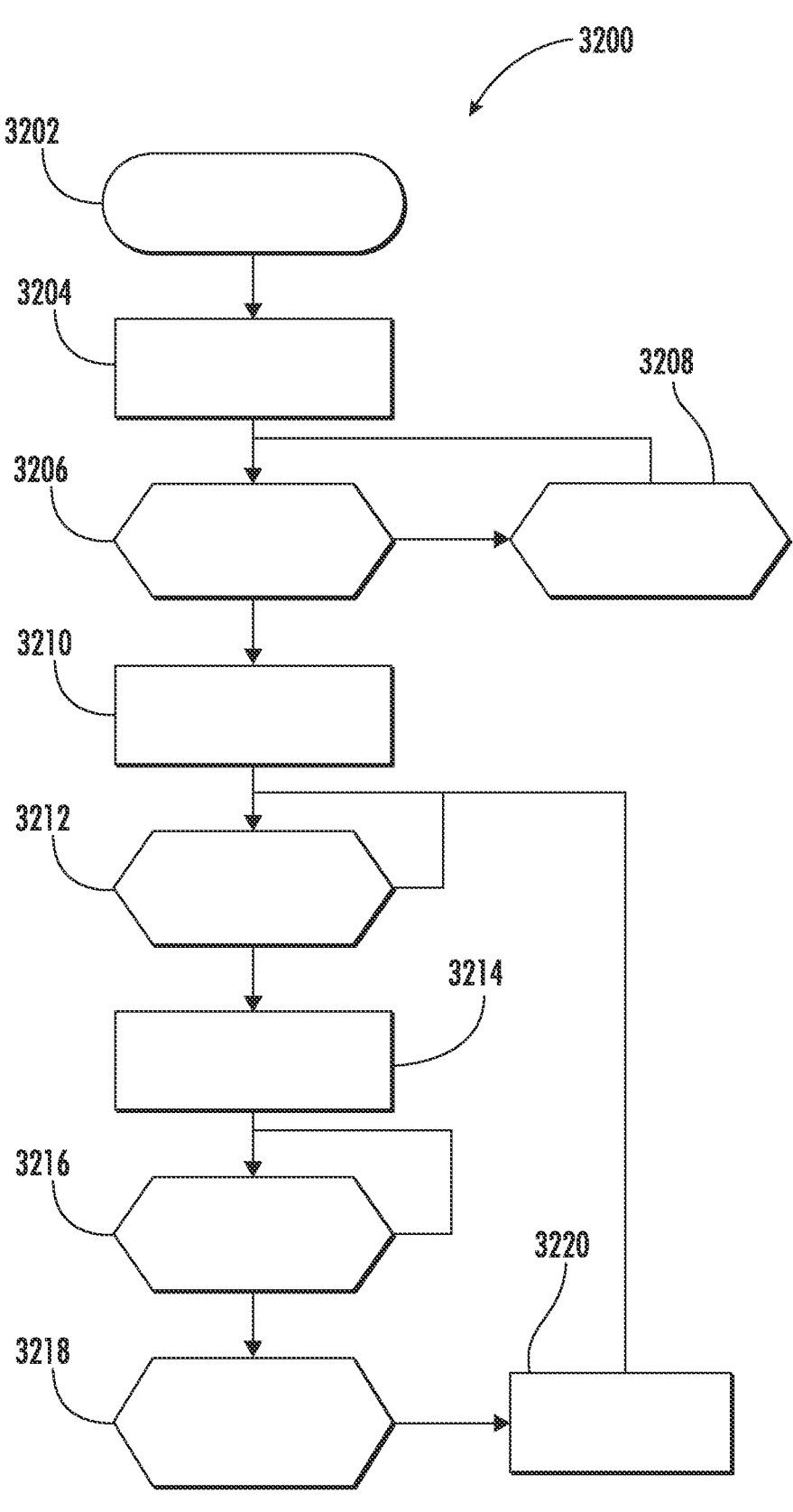
FIG. 32 is a flow chart of a method of flow of current path control in accordance with embodiments of the present disclosure.

FIG. 32 depicts a flowchart 3200 of a flow of current path control. The flowchart 3200 includes a step 3202 where the lawnmower initiates a discharge of power from the batteries. In response to step 3202, one or more of the batteries can enable a pre-discharge circuit at step 3204. If terminal voltage is above a threshold at step 3206, the battery enables the discharge FETs. If terminal voltage is not above the threshold at step 3206 for a duration of time, a fault is generated at 3208. If discharge of current is above a threshold at step 3206, the battery enables the discharge FETs at step 3210. If discharge charge current at step 3212 is above a threshold amount the pack enables the charge FETSs at step 3214. If the charge current is greater than a prescribed threshold at step 3216 and the individual battery cells are not able to accept the charge at step 3218, then the battery disables the charge FETs at step 3220.

FIG. 33 depicts a method 3300 of operating a lawnmower in accordance with an exemplary embodiment. The method 3300 can generally include a step 3302 of installing a tube of a bagging system on the lawnmower. In certain instances, the step 3302 can be performed by first removing a fairing of the lawnmower to allow access to an area for the tube. Prior to step 3302, the lawnmower may include a fairing which may at least partially define an outer surface of the lawnmower. The operator can remove the fairing to expose a volume of space in which the tube can at least partially be disposed within. In certain instances, the step 3302 of installing the tube can be performed by coupling one or more attachment points of the tube to an attachment point used to attach the fairing to the lawnmower.

The lawnmower can define a first lateral width in a lateral direction, as measured at a maximum width of the lawnmower prior to removing the fairing, and a second lateral width, as measured at a maximum width of the lawnmower after installing the tube on the lawnmower. In an embodiment, the first and second lateral widths can be within 20% of one another, such as within 15% of one another, such as within 10% of one another, such as within 5% of one another, such as within 4% of one another, such as within 3% of one another, such as within 2% of one another, such as within 1% of one another. In a particular embodiment, the first and second lateral widths can be the same as one another. By way of non-limiting example, the first lateral width may be 36 inches and the second lateral width may be 35 inches (an approximately 3% difference).

The method 3300 can further include a step 3304 of operating one or more cutting implements of the lawnmower, wherein debris generated by the one or more cutting implements is discharged from a mowing deck of the lawnmower to a bagger through the tube. The step 3304 may occur, for example, when the operator is actively performing mowing operations. The debris generated at step 3304 can move through the tube at a first flow rate. In certain instances, the first flow rate can be associated with a force generated by the one or more cutting implements, e.g., the one or more cutting implements can act like a fan to propel the debris through the tube to the bagger.

The method 3300 can further include a step 3306 of activating a boost system to increase airflow through the tube. In one or more embodiments, the step 3306 of activating the boost system may be performed manually by the operator. For instance, the operator can manually activate a user interface, e.g., a switch, to engage the boost system. In other embodiments, the step 3306 of activating the boost system may be performed at least partially automatically, e.g., by a processor of the lawnmower. Automatic activation may occur, for example, in response to a detected condition. By way of non-limiting example, the lawnmower (or a portion thereof) may detect low flow rate through the tube, a relative condition at the mower deck, e.g., a higher load on the motors driving the cutting implements, or the like. In response to the detected condition, the lawnmower can automatically activate the boost system. In certain instances, the operator may be able to override such activation or initiate automatic detection by the lawnmower with a master control.

Activating the boost system at step 3306 can increase the flow rate of debris within the tube from the aforementioned first flow rate to a second flow rate. The second flow rate may be higher than the first flow rate, as measured when operating at the same operating conditions. For instance, when mowing wet grass, it may be common for the grass to become lodged in the tube when moving at the first flow rate. This may be caused by the increased weight of the grass clippings and the relative stickiness of the grass moving through the tube. With the boost system activated, the grass clippings can be biased by greater force such that the grass clippings move through the tube at a second (faster) flow rate and thus do not become stuck in the tube.

In an embodiment, the method 3300 can further include a step 3308 of emptying the bagger using a release lever, wherein the release lever is accessible from a seat of the lawnmower. The step 3308 may be performed, for example, when the bagger reaches a threshold condition, e.g., the bagger becomes full of debris. In certain instances, the operator may receive an indication from the lawnmower that the bagger has reached the threshold condition. For example, the lawnmower can display a relative fullness of the bagger. Upon reaching the threshold condition, the operator can activate the release lever at step 3308 to empty the bagger.

In some instances, emptying the bagger may require the operator to leave the seat and walk around the lawnmower to the bagger. In other instances, emptying the bagger may be performed entirely from the seated position. That is, for example, activating the release lever may cause the debris to empty from the bagger.

In some instances, the method 3300 can further include a step of closing the bagger after emptying operations are complete. In this regard, the lawnmower can again be used to collect debris, e.g., during further operation at step 3304. This process of step 3304 to step 3308 can be repeated until the mowing operation is completed. After mowing is completed, the operator may perform an additional step (not illustrated) of removing the tube from the bagging system. The mower can then be used for different operations. With the tube removed, the lawnmower may have reduced weight. The operator may further remove the bagger to save additional weight and increase operational lifespan of the batteries during future operations.

Further aspects of the invention are provided by one or more of the following embodiments:

Embodiment 1. A lawnmower comprising: a frame; a walking element coupled to the frame; a motor coupled to the frame, the motor selectively powering the walking element; a user interface comprising: a lever having a home position and being moveable from the home position; a base having a relatively fixed position with respect to the frame, the base defining an area configured to receive the lever such that the lever is accessible by an operator of the lawnmower; and a detection system configured to detect relative movement of the lever and communicate the detected movement to a processor which controls a direction of travel of the lawnmower in response to the detected relative movement of the lever, wherein the lever is moveable from the home position in at least two directions, the two directions being selected from of a group consisting of an X-directional translation, a Y-directional translation, a clockwise rotation, and a counter-clockwise rotation.

Embodiment 2. The lawnmower of any one or more of the embodiments, wherein the lever is coupled with one or more dampeners configured to dampen movement of the lever.

Embodiment 3. The lawnmower of any one or more of the embodiments, wherein the lever is configured to self-return to the home position.

Embodiment 4. The lawnmower of any one or more of the embodiments, wherein the user interface further comprises a handle coupled with the lever, and wherein the handle is keyed relative to the lever such that the handle is countable to the lever in only a discrete number of orientations with respect to the lever.

Embodiment 5. The lawnmower of any one or more of the embodiments, wherein the lawnmower does not include a lap bar, and wherein the lawnmower further comprises a foot pedal configured to control an aspect of movement of the lawnmower.

Embodiment 6. The lawnmower of any one or more of the embodiments, wherein the lawnmower further comprises a seat having a first arm rest and a second arm rest, wherein the first arm rest is disposed on a same side of the seat as the user interface, wherein the first arm rest has a first relative range of movement, wherein the second arm rest has a second relative range of movement, and wherein the second relative range of movement is different than the first relative range of movement.

Embodiment 7. A user interface for a lawnmower, the user interface comprising: a lever having a home position and being moveable from the home position; a base having a relatively fixed position with respect to a frame of the lawnmower, the base defining an area configured to receive the lever such that the lever is accessible by an operator of the lawnmower; and a detection system configured to detect relative movement of the lever and communicate the detected movement to a processor which controls a direction of travel of the lawnmower in response to the detected relative movement of the lever, wherein the lever is moveable from the home position in at least two directions, the two directions being selected from of a group consisting of an X-directional translation, a Y-directional translation, a clockwise rotation, and a counter-clockwise rotation.

Embodiment 8. The user interface of any one or more of the embodiments, further comprising a handle coupled to the lever, wherein the handle comprises a rod and a grip, wherein the rod is interfaceable with the lever, and wherein the rod is rotationally keyed relative to the lever.

Embodiment 9. The user interface of any one or more of the embodiments, wherein the lever is calibrated when the lever is in the home position, not in the home position, or both.

Embodiment 10. The user interface of any one or more of the embodiments, wherein the lever is coupled with one or more dampeners configured to dampen movement of the lever, and wherein the one or more dampeners are indirectly coupled to the lever through an intermediary component.

Embodiment 11. A lawnmower comprising: a frame; a walking element coupled to the frame; a motor selectively powering the walking element; and a user interface configured to control a direction of travel, a speed of travel, or both of the lawnmower.

Embodiment 12. The lawnmower of any one or more of the embodiments, wherein the user interface comprises a joystick that is moveable from a home position in at least two directions, the two directions being selected from of a group consisting of an X-directional translation, a Y-directional translation, a clockwise rotation about a yaw axis, and a counter-clockwise rotation about a yaw axis.

Embodiment 13. The lawnmower of any one or more of the embodiments, wherein the joystick is further moveable in a Z-direction, and wherein moving the joystick in the Z-direction controls at least one aspect of the lawnmower, the at least one aspect being selected from a group consisting of enabling the motor, disabling the motor, engaging a parking brake of the lawnmower, and disengaging the parking brake.

Embodiment 14. The lawnmower of any one or more of the embodiments, wherein rotating the joystick controls the direction of travel of the lawnmower, and wherein translating the joystick controls a speed of the lawnmower in the direction of travel.

Embodiment 15. The lawnmower of any one or more of the embodiments, wherein translating the joystick in the X-direction controls the direction of travel of the lawnmower, and wherein translating the joystick in the Y-direction controls a speed of the lawnmower in the direction of travel.

Embodiment 16. The lawnmower of any one or more of the embodiments, wherein the user interface comprises a joystick, and wherein movement of the joystick is dampened by one or more dampeners.

Embodiment 17. The lawnmower of any one or more of the embodiments, wherein the one or more dampeners comprises a plurality of dampeners equally spaced apart from one another.

Embodiment 18. The lawnmower of any one or more of the embodiments, wherein the lawnmower further comprises a seat, and wherein the user interface is repositionable between a left position and a right position with respect to the seat.

Embodiment 19. The lawnmower of any one or more of the embodiments, wherein the lawnmower further comprises a display configured to show at least one of a current mower status, a change in mower settings, a headlight status, an accessory status, a wireless connection status, a battery status, and a blade status, and wherein the display and/or one or more buttons disposed adjacent to the display are configured to receive inputs from a lawnmower operator.

Embodiment 20. The lawnmower of any one or more of the embodiments, wherein the lawnmower comprises a wireless communication device configured to communicate information between the lawnmower and one or more wireless devices.

Embodiment 21. A lawnmower comprising: a frame; a fairing coupled with the frame, the fairing comprising a recess defining a cavity; and an adapter disposed within the cavity, wherein the adapter is configured to electrically charge a device positioned within the cavity.

Embodiment 22. The lawnmower of any one or more of the embodiments, wherein the recess is defined by the fairing, and wherein the recess is within a vicinity of one or more battery receiving areas of the lawnmower.

Embodiment 23. The lawnmower of any one or more of the embodiments, further comprising: a storage area defining a volume; and one or more dividers configured to selectively divide the volume into segments.

Embodiment 24. The lawnmower of any one or more of the embodiments, wherein the lawnmower defines a centerline, wherein the storage area is disposed along the centerline, and wherein the recess is spaced apart from the centerline.

Embodiment 25. The lawnmower of any one or more of the embodiments, wherein the storage area is at least partially defined by the fairing, and wherein the fairing comprises integrated interfaces each configured to interface with the one or more dividers.

Embodiment 26. The lawnmower of any one or more of the embodiments, wherein the integrated interfaces are configured to further interface with an accessory to retain the accessory at the lawnmower.

Embodiment 27. The lawnmower of any one or more of the embodiments, wherein the storage area is disposed above at least one battery of the lawnmower, the at least one battery providing energy to power a motor to drive a walking element of the lawnmower, and wherein a floor of the storage area is defined at least in part by a moveable cover for the at least one battery.

Embodiment 28. A lawnmower comprising: a first battery receiving area configured to receive a plurality of first batteries; and a second battery receiving area configured to receive a plurality of second batteries, wherein a direction of inserting the second batteries into the second battery receiving area is in a vertical direction, and wherein a direction of inserting the second batteries into the second battery receiving area is angularly offset from the vertical direction.

Embodiment 29. The lawnmower of any one or more of the embodiments, wherein the first batteries each comprise a plurality of handles including a first handle and a second handle, and wherein the first and second handles are disposed on different sides of at least one of the plurality of first batteries.

Embodiment 30. The lawnmower of any one or more of the embodiments, wherein the first battery receiving area comprises a plurality of slots each housing one of the plurality of first batteries.

Embodiment 31. The lawnmower of any one or more of the embodiments, wherein each slot comprises a separate connector plug, and wherein each connector plug is engageable with one of the plurality of first batteries.

Embodiment 32. The lawnmower of any one or more of the embodiments, wherein each one of the plurality of first batteries is selectively lockable within one of the slots by a rotating clamp.

Embodiment 33. The lawnmower of any one or more of the embodiments, wherein the first battery receiving area is disposed along a centerline of the lawnmower, wherein the second battery receiving area is disposed on both sides of the centerline, and wherein a number of second battery receiving areas on a first side of the centerline is different than a number of second battery receiving areas on a second side of the centerline.

Embodiment 34. The lawnmower of any one or more of the embodiments, wherein the lawnmower comprises a cavity and a cover configured to selectively close the cavity, and wherein the cavity is disposed on the second side of the centerline.

Embodiment 35. The lawnmower of any one or more of the embodiments, further comprising a photovoltaic panel.

Embodiment 36. The lawnmower of any one or more of the embodiments, wherein the lawnmower further comprises an accessory port configured to provide electrical power to one or more powered accessories.

Embodiment 37. A lawnmower comprising: a frame; a walking element; a motor configured to drive the walking element; one or more batteries configured to power the motor; a seat configured to support a lawnmower operator; and a fan configured to generate airflow to a first area with at least one of the one or more batteries and to a second area where the lawnmower operator is disposed.

Embodiment 38. The lawnmower of any one or more of the embodiments, wherein the fan is selectively operable between two or more of an OFF state, an ON state, and a variable state.

Embodiment 39. The lawnmower of any one or more of the embodiments, wherein a path of the airflow is selectively adjustable to prevent airflow to one or both of the first or second areas.

Embodiment 40. The lawnmower of any one or more of the embodiments, wherein the lawnmower further comprises an accessory port configured to provide electrical power to one or more powered accessories.

Embodiment 41. A lawnmower comprising: a plurality of first batteries each having a first voltage; a plurality of second batteries each having a second voltage different than the first voltage; and one or more boosters configured to boost the second voltage to the first voltage, wherein the one or more boosters are connected in parallel to a common rail operating at the first voltage.

Embodiment 42. The lawnmower of any one or more of the embodiments, further comprising an interface configured to be coupled with a charger to receive charge, wherein the interface is coupled to the common rail and coupled to a tool interface controller (TIC).

Embodiment 43. The lawnmower of any one or more of the embodiments, wherein the TIC is coupled to one or more accessories, and wherein the TIC is configured to control the one or more accessories in view of a status of the interface.

Embodiment 44. The lawnmower of any one or more of the embodiments, wherein the TIC comprises a pre-discharge circuit configured to limit inrush current to the one or more accessories or motor controllers.

Embodiment 45. The lawnmower of any one or more of the embodiments, wherein the first voltage is approximately 80V, and wherein the second voltage is less than 50V.

Embodiment 46. The lawnmower of any one or more of the embodiments, wherein each the first batteries comprises a shell and a plurality of handles coupled to the shell, wherein the plurality of handles comprises a first handle disposed on a first side of the shell and a second handle disposed on a second side of the shell.

Embodiment 47. The lawnmower of any one or more of the embodiments, wherein at least one of the plurality of first batteries comprises an anchor point configured to couple an accessory to the at least of the first batteries.

Embodiment 48. A battery for a power equipment such as a lawnmower, the battery comprising: a core, wherein the core comprises: a first segment having a plurality of battery cells; and a second segment having a plurality of battery cells; and a quick connect interface configured to electrically and structurally connect together the first and second segments of the core.

Embodiment 49. The battery of any one or more of the embodiments, wherein the quick connect interface comprises: a first link electrically coupled to the first segment, wherein the first link includes a mating interface; a second link electrically coupled to the second segment, wherein the second link includes a mating interface; and one or more fasteners configured to fasten the mating interfaces of the first and second links together to electrically connect the first and second segments together.

Embodiment 50. The battery of any one or more of the embodiments, wherein the one or more fasteners are engageable with a nut, and wherein the nut is coupled to the first segment.

Embodiment 51. The battery of any one or more of the embodiments, wherein the first segment comprises a first current sensing element configured to sense current in the first segment, and wherein the second segment comprises a second current sensing element configured to sense current in the second segment.

Embodiment 52. The battery of any one or more of the embodiments, wherein the first segment comprises a support structure configured to support the plurality of battery cells of the first segment, and wherein the support structure is in close contact with each one of the battery cells.

Embodiment 53. The battery of any one or more of the embodiments, wherein the support structure comprises ethylene propylene diene monomer (EPDM).

Embodiment 54. The battery of any one or more of the embodiments, wherein the battery cells of at least the first segment are coupled together through strap links fused to each of the battery cells, and wherein the strap links comprise frangible portions configured to break upon exceeding a desired operating parameter.

Embodiment 55. The battery of any one or more of the embodiments, wherein the first and second segments are stacked on top of one another, and wherein a circuit board is connected to both the first and second segments.

Embodiment 56. The battery of any one or more of the embodiments, wherein the battery is in a range of a 60V and 80V battery.

Embodiment 57. The battery of any one or more of the embodiments, wherein the battery comprises a terminal configured to interface with a connector of the lawnmower, and wherein the battery is configured to be electrically coupled to a common rail of the lawnmower through the connector.

Embodiment 58. A lawnmower comprising: a power system comprising one or more batteries; an accessory electrically coupled to the power system; and a pre-discharge bypass circuit coupling the accessory to the power system, wherein the pre-discharge bypass circuit is configured to limit current spike to the accessory or motor controllers until one or more capacitors of the accessory are fully charged upon starting the lawnmower.

Embodiment 59. The lawnmower of any one or more of the embodiments, wherein the accessory is selected from a group consisting of one or more of a headlight, a charging port, a power relay, or a human machine interface.

Embodiment 60. The lawnmower of any one or more of the embodiments, wherein the one or more batteries comprise a first plurality of batteries and a second plurality of batteries, and wherein the second plurality of batteries are coupled to a common rail with the first plurality of batteries through one or more boosters, buck converters, buck-boost converters, or the like.

Embodiment 61. A lawnmower comprising: a seat configured to receive a lawnmower operator; a mowing deck having one or more cutting implements and a discharge chute; and a bagging system in fluid communication with the discharge chute through a tube, wherein the lawnmower has a first configuration when the tube is coupled to the lawnmower, wherein the lawnmower has a second configuration when the tube is not coupled to the lawnmower, wherein the tube is disposed at a lateral side of the lawnmower in the first configuration, wherein the lawnmower defines a maximum lateral width in a lateral direction, and wherein the lateral width is less than 38 inches in both the first configuration and the second configuration.

Embodiment 62. The lawnmower of any one or more of the embodiments, wherein the tube is disposed at a location corresponding with a fairing of the lawnmower when the lawnmower is in the second configuration.

Embodiment 63. The lawnmower of any one or more of the embodiments, wherein the bagging system comprises a bagger defining a volume configured to receive debris discharged from the mowing deck through the discharge chute, wherein the bagger has a door, wherein the door of the bagger is configured to be operated by the lawnmower operator using a release accessible from the seat, and wherein the door is angled relative to a horizontal plane when the door is in a closed position.

Embodiment 64. The lawnmower of any one or more of the embodiments, wherein the bagger comprises a bagger frame and a deformable material, wherein the frame, deformable material, and door together define the volume of the bagger, and wherein the bagger frame is removably coupled to a frame of the lawnmower.

Embodiment 65. The lawnmower of any one or more of the embodiments, wherein the bagger frame is collapsible from an in-use configuration to a stored configuration.

Embodiment 66. The lawnmower of any one or more of the embodiments, wherein the bagging system comprises a boost system configured to increase a rate of airflow through the tube, and wherein the boost system is selectively operable.

Embodiment 67. The lawnmower of any one or more of the embodiments, wherein the boost system has one or more operating modes selected from a group consisting of an ON mode, an OFF mode, a variable speed mode, a time limited mode, and a motor load feedback mode.

Embodiment 68. The lawnmower of any one or more of the embodiments, wherein the boost system is coupled to the tube downstream of the discharge chute.

Embodiment 69. The lawnmower of any one or more of the embodiments, wherein the boost system is powered by a battery of the lawnmower, and wherein control of one or more operating modes of the boost system is performed by a control integrated into the lawnmower.

Embodiment 70. The lawnmower of any one or more of the embodiments, wherein the lawnmower detects a presence of the boost system, and wherein the control is configured to permit control of the boost system when the boost system is present.

Embodiment 71. The lawnmower of any one or more of the embodiments, wherein the one or more cutting implements each comprises a cross cut blade, the cross cut blades each comprising a coating configured to disrupt air flow across the blade and a sweep feature configured to minimize air vortices.

Embodiment 72. The lawnmower of any one or more of the embodiments, wherein the mowing deck defines an upper surface and a lower surface, and wherein a sound dampener is disposed along at least a portion of at least one of the upper and lower surfaces.

Embodiment 73. The lawnmower of any one or more of the embodiments, wherein the lawnmower comprises a maximum width of less than 36 inches.

Embodiment 74. A lawnmower comprising: a seat configured to receive a lawnmower operator; a mowing deck having one or more cutting implements and a discharge chute; a bagging system in fluid communication with the discharge chute through a tube, the bagging system comprising: a bagger defining a volume configured to receive debris discharged from the mowing deck through the discharge chute, wherein the bagger has a door, the door configured to be operated by the lawnmower operator using a release; and a boost system.

Embodiment 75. The lawnmower of any one or more of the embodiments, wherein the boost system comprises a user interface integrated into the lawnmower, and wherein at least a portion of the bagging system is removable from the lawnmower.

Embodiment 76. The lawnmower of any one or more of the embodiments, wherein the mowing deck defines an upper surface and a lower surface, and wherein a sound dampener is disposed along at least a portion of at least one of the upper and lower surfaces.

Embodiment 77. The lawnmower of any one or more of the embodiments, wherein the mowing deck defines an upper surface and a lower surface, and wherein a sound dampener is disposed along at least a portion of at least one of the upper and lower surfaces.

Embodiment 78. A method of operating a lawnmower, the method comprising: installing a tube of a bagging system on the lawnmower; operating one or more cutting implements of the lawnmower, wherein debris generated by the one or more cutting implements is discharged from a mowing deck of the lawnmower to a bagger through the tube; activating a boost system to increase airflow through the tube; and emptying the bagger using a release, wherein the release is accessible from a seat of the lawnmower.

Embodiment 79. The method of any one or more of the embodiments, wherein activating the boost system is performed using a control integrated into the lawnmower.

Embodiment 80. The method of any one or more of the embodiments, wherein the bagger comprises a door disposed at a relative angle with respect to a horizontal plane when the door is in the closed position, and wherein using the release moves the door from the closed position to an open position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A lawnmower comprising:
a frame;
a walking element coupled to the frame;
a motor coupled to the frame, the motor selectively powering the walking element;
a user interface comprising:
a lever having a home position and being moveable from the home position;

a base having a relatively fixed position with respect to the frame, the base defining an area configured to receive the lever such that the lever is accessible by an operator of the lawnmower; and
a detection system configured to detect relative movement of the lever and communicate the detected movement to a processor which controls a direction of travel of the lawnmower in response to the detected relative movement of the lever,
wherein the lever is moveable from the home position in an X-direction, a Y-direction, a clockwise rotational direction, and a counter-clockwise rotational direction.

2. The lawnmower of claim 1, wherein the lever is coupled with one or more dampeners configured to dampen movement of the lever.

3. The lawnmower of claim 1, wherein moving the lever in a Z-direction controls at least one aspect of the lawnmower, the at least one aspect being selected from a group consisting of enabling the motor, disabling the motor, engaging a parking brake of the lawnmower, and disengaging the parking brake, and wherein the Z-direction is oriented parallel to a length of the lever.

4. The lawnmower of claim 1, wherein the user interface further comprises a handle coupled with the lever, and wherein the handle is keyed relative to the lever such that the handle is couplable to the lever in only a discrete number of orientations with respect to the lever.

5. The lawnmower of claim 1, wherein the lawnmower does not include a lap bar, and wherein the lawnmower further comprises a foot pedal configured to control an aspect of movement of the lawnmower.

6. The lawnmower of claim 1, wherein the lawnmower further comprises a seat having a first arm rest and a second arm rest, wherein the first arm rest is disposed on a same side of the seat as the user interface, wherein the first arm rest has a first relative range of movement, wherein the second arm rest has a second relative range of movement, and wherein the second relative range of movement is different than the first relative range of movement.

7. A user interface for a lawnmower, the user interface comprising:
a lever having a home position and being moveable from the home position;
a base having a relatively fixed position with respect to a frame of the lawnmower, the base defining an area configured to receive the lever such that the lever is accessible by an operator of the lawnmower; and
a detection system configured to detect relative movement of the lever and communicate the detected movement to a processor which controls a direction of travel of the lawnmower in response to the detected relative movement of the lever,
wherein the lever is moveable from the home position in at least two directions, the two directions being selected from of a group consisting of an X-direction, a Y-direction, a clockwise rotational direction, and a counter-clockwise rotational direction,
wherein moving the lever in a Z-direction controls at least one aspect of the lawnmower, the at least one aspect being selected from a group consisting of enabling the motor, disabling the motor, engaging a parking brake of the lawnmower, and disengaging the parking brake, and wherein the Z-direction is oriented parallel to a length of the lever.

8. The user interface of claim 7, further comprising a handle coupled to the lever, wherein the handle comprises a rod and a grip, wherein the rod is interfaceable with the lever, and wherein the rod is rotationally keyed relative to the lever.

9. The user interface of claim 7, wherein the lever is calibrated when the lever is in the home position, not in the home position, or both.

10. The user interface of claim 7, wherein the lever is coupled with one or more dampeners configured to dampen movement of the lever, and wherein the one or more dampeners are indirectly coupled to the lever through an intermediary component.

11. A lawnmower comprising:
a frame;
a walking element coupled to the frame;
a motor selectively powering the walking element;
a user interface comprising a joystick configured to control a direction of travel, a speed of travel, or both of the lawnmower, wherein movement of the joystick is dampened by one or more dampeners; and
a foot pedal configured to control an aspect of movement of the lawnmower.

12. The lawnmower of claim 11, wherein the joystick is moveable from a home position in X-directional translation, Y-directional translation, clockwise rotation about a yaw axis, and counter-clockwise rotation about a yaw axis.

13. The lawnmower of claim 12, wherein the joystick is further moveable in a Z-direction, wherein moving the joystick in the Z-direction controls at least one aspect of the lawnmower, the at least one aspect being selected from a group consisting of enabling the motor, disabling the motor, engaging a parking brake of the lawnmower, and disengaging the parking brake, and wherein the Z-direction is oriented parallel to a length of the joystick.

14. The lawnmower of claim 11, wherein rotating the joystick controls the direction of travel of the lawnmower, and wherein translating the joystick controls speed of travel of the lawnmower.

15. The lawnmower of claim 12, wherein translating the joystick in the X-direction controls the direction of travel of the lawnmower, and wherein translating the joystick in the Y-direction controls a speed of the lawnmower in the direction of travel.

16. The lawnmower of claim 11, wherein the one or more dampeners is selected from a hydraulic dampener, an electrical dampener, a magnetic dampener, or a mechanical dampener.

17. The lawnmower of claim 11, wherein the one or more dampeners comprises a plurality of dampeners equally spaced apart from one another.

18. The lawnmower of claim 11, wherein the lawnmower further comprises a seat, and wherein the user interface is repositionable between a left position and a right position with respect to the seat.

19. The lawnmower of claim 11, wherein the lawnmower further comprises a display configured to show at least one of a current mower status, a change in mower settings, a headlight status, an accessory status, a wireless connection status, a battery status, and a blade status, and wherein the display and/or one or more buttons disposed adjacent to the display are configured to receive inputs from a lawnmower operator.

20. The lawnmower of claim 11, wherein the lawnmower comprises a wireless communication device configured to communicate information between the lawnmower and one or more wireless devices.

* * * * *